(12) United States Patent
Reich et al.

(10) Patent No.: US 10,321,624 B2
(45) Date of Patent: Jun. 18, 2019

(54) AIR SEEDER MANIFOLD SYSTEM

(71) Applicant: Intelligent Agricultural Solutions, LLC, Fargo, ND (US)

(72) Inventors: Adam A. Reich, Medina, ND (US); Joshua N. Gelinske, Fargo, ND (US); Barry D. Batcheller, West Fargo, ND (US)

(73) Assignee: Intelligent Agriculture Solutions LLC, Fargo, ND (US)

( * ) Notice: Subject to any disclaimer, the term of this patent is extended or adjusted under 35 U.S.C. 154(b) by 76 days.

(21) Appl. No.: 15/431,549

(22) Filed: Feb. 13, 2017

(65) Prior Publication Data

US 2017/0156258 A1 Jun. 8, 2017

Related U.S. Application Data

(63) Continuation-in-part of application No. 15/145,661, filed on May 3, 2016, which is a continuation-in-part
(Continued)

(51) Int. Cl.
*A01C 7/08* (2006.01)
*H04W 4/70* (2018.01)
(Continued)

(52) U.S. Cl.
CPC .............. *A01C 7/082* (2013.01); *A01C 7/081* (2013.01); *A01C 7/102* (2013.01); *A01C 7/105* (2013.01);
(Continued)

(58) Field of Classification Search
CPC ......... A01C 7/081; A01C 7/082; A01C 7/084; A01C 7/102; A01C 7/105; A01C 15/04; A01B 79/005
See application file for complete search history.

(56) References Cited

U.S. PATENT DOCUMENTS 3,610,252 A    10/1971  De Coene et al.
3,616,973 A *  11/1971  Hartley .................... A01C 7/16
                                                        222/330
(Continued)

FOREIGN PATENT DOCUMENTS

AU    2002214504    10/2004
CA       1184647     3/1985
(Continued)

OTHER PUBLICATIONS

Translation of JP 56-65720 (original JP document published Jun. 3, 1981) (Year: 1981).*
(Continued)

*Primary Examiner* — Behrang Badii
*Assistant Examiner* — David A Testardi

(57) ABSTRACT

A manifold system for balancing particle delivery from multiple discharge outlets includes a diverter subassembly movably mounted in a manifold for balancing discharge from the outlets. The manifold system is disclosed in an agricultural air seeder application, with the particles comprising tubes and the discharge outlets being connected to ground-engaging tools for depositing seeds in space, subsurface locations in a crop field. Automated and manually-adjustable embodiments are disclosed.

20 Claims, 58 Drawing Sheets

Related U.S. Application Data of application No. 13/843,029, filed on Mar. 15, 2013, now Pat. No. 9,330,062, which is a continuation-in-part of application No. 13/046,549, filed on Mar. 11, 2011, now Pat. No. 8,950,260.

(51) Int. Cl.

| | | |
|---|---|---|
| *A01C 7/10* | (2006.01) | |
| *G01F 1/66* | (2006.01) | |
| *G08C 17/02* | (2006.01) | |
| *H04L 29/08* | (2006.01) | |

(52) U.S. Cl.
CPC ............ *G01F 1/666* (2013.01); *G08C 17/02* (2013.01); *H04L 67/12* (2013.01); *H04W 4/70* (2018.02); *G08C 2201/40* (2013.01); *Y02P 60/16* (2015.11)

(56) References Cited

U.S. PATENT DOCUMENTS

| | | | |
|---|---|---|---|
| 3,639,755 A | | 2/1972 | Wrege |
| 3,935,866 A | | 2/1976 | Northup et al. |
| 4,004,289 A | | 1/1977 | Kirk |
| 4,024,822 A | * | 5/1977 | Ross .................. A01C 7/082 111/34 |
| 4,057,709 A | | 11/1977 | Lyngsgaard et al. |
| 4,259,020 A | | 3/1981 | Babb |
| 4,275,546 A | | 6/1981 | Bohman et al. |
| 4,296,409 A | | 10/1981 | Whitaker |
| 4,348,855 A | | 9/1982 | Depauw et al. |
| 4,360,998 A | | 11/1982 | Somes |
| 4,421,772 A | | 12/1983 | Munck et al. |
| 4,441,513 A | | 4/1984 | Herwig |
| 4,517,792 A | | 5/1985 | Denning et al. |
| 4,527,241 A | | 7/1985 | Sheehan et al. |
| 4,562,968 A | * | 1/1986 | Widmer ................ A01C 15/04 111/175 |
| 4,651,331 A | | 3/1987 | Harrsen et al. |
| 4,697,173 A | | 9/1987 | Stokes |
| 4,713,781 A | | 12/1987 | Brizgis et al. |
| 4,806,764 A | | 2/1989 | Satake |
| 4,900,881 A | | 2/1990 | Fischer |
| 4,902,264 A | | 2/1990 | Diekhans et al. |
| 4,922,467 A | | 5/1990 | Caulfield |
| 4,951,031 A | | 8/1990 | Strubbe |
| 4,961,304 A | | 10/1990 | Ovsborn et al. |
| 5,015,997 A | | 5/1991 | Strubbe |
| 5,132,538 A | | 7/1992 | Norris |
| 5,312,299 A | | 5/1994 | Behnke et al. |
| 5,561,250 A | | 10/1996 | Myers |
| 5,586,033 A | | 12/1996 | Hall |
| 5,732,074 A | | 3/1998 | Spaur |
| 5,751,421 A | | 5/1998 | Wright et al. |
| 5,802,489 A | | 9/1998 | Orbach et al. |
| 5,828,626 A | | 10/1998 | Castile et al. |
| 5,831,539 A | | 11/1998 | Thomas et al. |
| 5,831,542 A | | 11/1998 | Thomas et al. |
| 5,835,206 A | | 11/1998 | Tragesser |
| 5,837,906 A | | 11/1998 | Palmer |
| 5,917,927 A | | 6/1999 | Satake et al. |
| 5,924,371 A | | 7/1999 | Flamme et al. |
| 5,978,720 A | | 11/1999 | Hieronymus et al. |
| 5,995,894 A | | 11/1999 | Wendte |
| 6,009,186 A | | 12/1999 | Gorretta et al. |
| 6,024,035 A | | 2/2000 | Flamme |
| 6,070,538 A | | 6/2000 | Flamme et al. |
| 6,093,926 A | | 7/2000 | Mertins et al. |
| 6,100,526 A | | 8/2000 | Mayes |
| 6,119,442 A | | 9/2000 | Hale |
| 6,146,268 A | | 11/2000 | Behnke et al. |
| 6,205,384 B1 | | 3/2001 | Diekhans |
| 6,269,618 B1 | | 8/2001 | Digman et al. |
| 6,275,231 B1 | | 8/2001 | Obradovich |
| 6,282,476 B1 | | 8/2001 | Hieronymus et al. |
| 6,296,425 B1 | | 10/2001 | Memory et al. |
| 6,349,252 B1 | | 2/2002 | Imanishi |
| 6,386,128 B1 | | 5/2002 | Svoboda et al. |
| 6,421,990 B1 | | 7/2002 | Ohlemeyer et al. |
| 6,427,128 B1 | | 7/2002 | Satake et al. |
| 6,442,916 B1 | | 9/2002 | Pope |
| 6,449,932 B1 | | 9/2002 | Cooper et al. |
| 6,452,157 B1 | | 9/2002 | Hosel |
| 6,487,717 B1 | | 11/2002 | Brunemann |
| 6,524,183 B1 | | 2/2003 | Van Quekelberghe |
| 6,591,145 B1 | | 7/2003 | Hoskinson et al. |
| 6,683,970 B1 | | 1/2004 | Satake et al. |
| 6,726,559 B2 | | 4/2004 | Bischoff |
| 6,801,942 B1 | | 10/2004 | Dietrich et al. |
| 6,863,604 B2 | | 3/2005 | Behnke |
| 6,925,357 B2 | | 8/2005 | Wang et al. |
| 6,931,828 B2 | | 8/2005 | Kormann |
| 7,001,267 B2 | | 2/2006 | Behnke |
| 7,092,803 B2 | | 8/2006 | Kapolka |
| 7,131,614 B2 | | 11/2006 | Kisak et al. |
| 7,162,962 B2 | | 1/2007 | Fuessel et al. |
| 7,169,040 B2 | | 1/2007 | Kormann et al. |
| 7,367,880 B2 | | 5/2008 | Hoskinson et al. |
| 7,372,034 B2 | | 5/2008 | Kormann et al. |
| 7,415,365 B2 | | 8/2008 | Jeppe et al. |
| 7,502,353 B2 | | 3/2009 | Bolz |
| 7,516,244 B2 | | 4/2009 | Kelly |
| 7,654,141 B2 | | 2/2010 | Behnke et al. |
| 7,751,946 B2 | | 7/2010 | Taki et al. |
| 7,804,588 B2 | | 9/2010 | Kormann et al. |
| 7,830,530 B2 | | 11/2010 | Jonasson Bjarang |
| 7,938,075 B1 | | 5/2011 | Glendenning et al. |
| 7,993,187 B2 | | 8/2011 | Ricketts et al. |
| 8,045,168 B2 | | 10/2011 | Missotten et al. |
| 8,086,378 B2 | | 12/2011 | Behnke |
| 8,095,278 B2 | | 1/2012 | Schaaf et al. |
| 8,115,923 B2 | | 2/2012 | Priesnitz et al. |
| 8,139,824 B2 | | 3/2012 | Missotten et al. |
| 8,154,227 B1 | | 4/2012 | Young et al. |
| 8,239,087 B2 | | 8/2012 | Dybalski et al. |
| 8,295,992 B2 | | 10/2012 | Ecton et al. |
| 8,332,093 B2 | | 12/2012 | Yamasaki et al. |
| 8,337,283 B2 | | 12/2012 | Kormann et al. |
| 8,469,784 B1 | | 6/2013 | Hoskinson et al. |
| 8,656,081 B2 | | 2/2014 | Irizarry |
| 8,667,206 B2 | | 3/2014 | Irizarry |
| 8,950,260 B2 | | 2/2015 | Gelinske et al. |
| 9,125,344 B2 | | 9/2015 | Baumgarten |
| 9,205,914 B1 | | 12/2015 | Fagan |
| 9,330,062 B2 | | 5/2016 | Thurow |
| 10,051,781 B2 | * | 8/2018 | Beaujot .................. A01C 7/042 |
| 2002/0046322 A1 | | 4/2002 | Butterworth et al. |
| 2002/0091476 A1 | | 7/2002 | Beck |
| 2002/0140548 A1 | | 10/2002 | Lutter et al. |
| 2003/0004630 A1 | | 1/2003 | Beck |
| 2004/0186597 A1 | | 9/2004 | Wippersteg et al. |
| 2004/0203370 A1 | | 10/2004 | Luo et al. |
| 2005/0026662 A1 | | 2/2005 | Fechner |
| 2005/0033454 A1 | | 2/2005 | Fitzner |
| 2005/0091593 A1 | | 4/2005 | Peltz |
| 2005/0137003 A1 | | 6/2005 | Behnke |
| 2005/0143153 A1 | | 6/2005 | Behnke |
| 2005/0150202 A1 | | 7/2005 | Quick |
| 2005/0187674 A1 | | 8/2005 | Ando |
| 2005/0251347 A1 | | 11/2005 | Perona et al. |
| 2005/0280524 A1 | | 12/2005 | Boone et al. |
| 2006/0155429 A1 | | 7/2006 | Boone et al. |
| 2006/0250578 A1 | | 11/2006 | Pohl |
| 2006/0271243 A1 | | 11/2006 | Behnke |
| 2006/0272307 A1 | | 12/2006 | Behnke |
| 2006/0277882 A1 | | 12/2006 | Berger et al. |
| 2006/0277883 A1 | | 12/2006 | Berger et al. |
| 2007/0143482 A1 | | 6/2007 | Zancho |
| 2007/0238491 A1 | | 10/2007 | He |
| 2007/0280144 A1 | | 12/2007 | Hodson |
| 2008/0208395 A1 | | 8/2008 | Self et al. |
| 2008/0295471 A1 | | 12/2008 | Polklas et al. |
| 2008/0318648 A1 | | 12/2008 | Baumgarten et al. |

(56) References Cited

U.S. PATENT DOCUMENTS

| | | | |
|---|---|---|---|
| 2009/0078178 A1* | 3/2009 | Beaujot | A01C 7/084 |
| | | | 111/170 |
| 2009/0088932 A1 | 4/2009 | Diekhans | |
| 2009/0125197 A1 | 5/2009 | Behnke | |
| 2009/0251366 A1 | 10/2009 | McClure et al. | |
| 2009/0258684 A1 | 10/2009 | Missotten et al. | |
| 2009/0323578 A1 | 12/2009 | Hogenmueller et al. | |
| 2009/0325658 A1 | 12/2009 | Phelan | |
| 2010/0071329 A1 | 3/2010 | Hindryckz | |
| 2010/0097239 A1 | 4/2010 | Campbell et al. | |
| 2010/0125788 A1 | 5/2010 | Hieronymus | |
| 2010/0217474 A1 | 8/2010 | Baumgarten et al. | |
| 2010/0217481 A1 | 8/2010 | Baumgarten | |
| 2010/0293303 A1 | 11/2010 | Choi | |
| 2011/0086668 A1 | 4/2011 | Patel | |
| 2011/0106333 A1 | 5/2011 | Scheider et al. | |
| 2011/0224843 A1 | 9/2011 | Kalhous et al. | |
| 2012/0004815 A1 | 1/2012 | Behnke | |
| 2012/0036914 A1 | 2/2012 | Landphair et al. | |
| 2012/0042815 A1 | 2/2012 | Wonderlich | |
| 2012/0060967 A1* | 3/2012 | Gluch | A24C 5/391 |
| | | | 141/1 |
| 2012/0072533 A1 | 3/2012 | O'Neil | |
| 2012/0075511 A1 | 3/2012 | Tay | |
| 2012/0109446 A1 | 5/2012 | Yousefi et al. | |
| 2012/0169874 A1 | 7/2012 | Thomas et al. | |
| 2012/0174843 A1* | 7/2012 | Friggstad | A01C 7/084 |
| | | | 111/174 |
| 2012/0227646 A1 | 9/2012 | Gelinske et al. | |
| 2012/0227647 A1 | 9/2012 | Gelinske et al. | |
| 2012/0256763 A1 | 10/2012 | Johnson et al. | |
| 2012/0271489 A1 | 10/2012 | Roberts et al. | |
| 2012/0301231 A1* | 11/2012 | Jagow | A01C 7/082 |
| | | | 406/183 |
| 2012/0312211 A1* | 12/2012 | Hubalek | A01C 7/084 |
| | | | 111/175 |
| 2013/0008361 A1 | 1/2013 | Trevino et al. | |
| 2013/0053094 A1 | 2/2013 | Inagaki | |
| 2013/0211628 A1 | 8/2013 | Thurow et al. | |
| 2013/0319305 A1* | 12/2013 | Riffel | A01C 7/084 |
| | | | 111/130 |
| 2014/0019017 A1 | 1/2014 | Wilken | |
| 2014/0019018 A1 | 1/2014 | Baumgarten | |
| 2014/0033058 A1 | 1/2014 | Perotti | |
| 2014/0053092 A1 | 2/2014 | Grevinga | |
| 2014/0053093 A1 | 2/2014 | Grevinga | |
| 2014/0129048 A1 | 5/2014 | Baumgarten | |
| 2014/0135082 A1 | 5/2014 | Batcheller | |
| 2014/0163771 A1 | 6/2014 | Demeniuk | |
| 2014/0171161 A1 | 6/2014 | Bischoff | |
| 2014/0298259 A1 | 10/2014 | Meegan et al. | |
| 2014/0315619 A1 | 10/2014 | Bowers et al. | |
| 2014/0338298 A1 | 11/2014 | Jung et al. | |
| 2015/0009328 A1 | 1/2015 | Escher | |
| 2015/0046043 A1 | 2/2015 | Bollin et al. | |
| 2015/0271989 A1* | 10/2015 | Kinch | A01C 21/005 |
| | | | 701/50 |
| 2015/0293507 A1 | 10/2015 | Burns | |
| 2016/0000008 A1 | 1/2016 | Scholer et al. | |
| 2016/0029558 A1 | 2/2016 | Dybro et al. | |
| 2016/0052525 A1 | 2/2016 | Tuncer et al. | |
| 2016/0157418 A1* | 6/2016 | Henry | A01C 7/084 |
| | | | 111/174 |
| 2016/0165792 A1* | 6/2016 | Henry | A01C 7/102 |
| | | | 406/14 |
| 2016/0246296 A1 | 8/2016 | Gelinske et al. | |
| 2016/0366821 A1 | 12/2016 | Good | |
| 2017/0118906 A1* | 5/2017 | Beaujot | A01C 7/042 |
| 2017/0160916 A1 | 6/2017 | Baumgarten et al. | |

FOREIGN PATENT DOCUMENTS

| | | | |
|---|---|---|---|
| CA | 2311698 | | 5/2003 |
| CA | 2334400 | | 12/2006 |
| CN | 101887018 | | 1/2012 |
| CN | 102498794 | | 6/2012 |
| DE | 3805148 | C1 * | 12/1988 |
| DE | 10210010 | A1 * | 10/2003 |
| DE | 102007005889 | | 7/2008 |
| DE | 102008052442 | | 6/2009 |
| DE | 102014216593 | | 2/2016 |
| EP | 0702890 | | 3/1996 |
| EP | 0826959 | | 3/1998 |
| EP | 868841 | A1 * | 10/1998 |
| EP | 1221279 | | 12/2001 |
| EP | 1095262 | | 1/2003 |
| EP | 2123144 | | 2/2012 |
| EP | 2036424 | | 3/2013 |
| EP | 2687924 | | 6/2013 |
| GB | 1514274 | | 6/1978 |
| JP | 56065720 | A * | 6/1981 |
| JP | 2002078036 | | 3/2002 |
| JP | 2002318198 | | 10/2002 |
| JP | 2003309584 | | 10/2003 |
| JP | 2005153684 | | 6/2005 |
| JP | 2005191819 | | 7/2005 |
| JP | 2005236560 | | 9/2005 |
| JP | 2006201130 | | 8/2006 |
| JP | 2008149755 | | 7/2008 |
| JP | 2009100690 | A * | 5/2009 |
| JP | 2011120540 | | 6/2011 |
| SU | 571212 | A * | 10/1977 |
| SU | 1299531 | A1 * | 3/1987 |
| SU | 1764550 | A1 * | 9/1992 |
| WO | 1983002872 | | 9/1983 |
| WO | 1997042489 | | 11/1997 |
| WO | 1999046971 | | 9/1999 |
| WO | 2000000818 | | 1/2000 |
| WO | 2008110413 | | 9/2008 |

OTHER PUBLICATIONS

"AFS Concord air seeder monitors planting and fertilization from inside the cab", ASABE, Resource Magazine's 1999 AE50 Award Winner, Jun. 1999, 49.

"Air Seeder Blockage Monitoring and Balancing", Appareo Systems—A Briefing for Amity Technology, Nov. 30, 2010, pp. 1-28.

"Air Seeder Monitor Installation & Operation Instructions", Air Seeder Monitor 1020, www.farmscan.net, Apr. 2006, pp. 1-22.

"Amity Technology", www.amitytech.com Retrieved from the Internet Aug. 19, 2010.

"International Search Report and Written Opinion", PCT/US2012/028795, dated Jun. 1, 2012.

"International Search Report and Written Opinion", PCT/US2014/030417, dated Aug. 27, 2014, pp. 1-14.

"International Search Report and Written Opinion", PCT/US2015/050060, dated Dec. 15, 2015, pp. 1-6.

"International Search Report and Written Opinion", PCT/US2015/023415, dated Jul. 2, 2015.

"Translation of PCT Application PCT/EP2008/051411", Sep. 18, 2008.

Fu, et al., "Discriminant Absorption-Feature Learning for Material Classification", IEEE Transactions on Geoscience and Remote Sensing, vol. 49, No. 5, May 2011, pp. 1536-1556.

Gunasekaran, et al., "Soybean Seed Coat and Cotyledon Crack Detection by Image Processing", Journal of Agricultural Engineering Research, vol. 41 (1988), pp. 139-148.

Hest, "IAS enhances iPad based seed monitoring system", Farm Industry News, http://farmindustrynews.com/precision-farming/ias-enhances-ipad-based-seed-monitoring-system, Jan. 20, 2012, 1-2.

Hest, "Precision Planting launches iPad monitor application", Farm Industry News; http://farmindustrynews.com/precision-farming/precision-planting-launches-ipad-monitor-application, Jan. 30, 2012, 1-2.

Kinnikar, et al., "Identification and Detection of Seed Borne Diseases of Soybean Using Image Processing—A Survey", International Journal of Emerging Technology in Computer Science & Electronics (IJETCCSE), vol. 14, Issue 2, Apr. 2015, pp. 363-368.

(56) References Cited

OTHER PUBLICATIONS

Klassen, et al., "Investigation of a Feedrate Sensor for Combine Harvesters", SAE Technical Paper 932428, 1993, pp. 1-8.

Kotyk, et al., "Control System for Combine Harvesters", WESCANEX '91 'IEEE Western Canada Conference on Computer, Power and Communications Systems in a Rural Environment', May 29-30, 1991, pp. 96-102.

Romeo, et al., "Camera Sensor Arrangement for Crop/Weed Detection Accuracy in Agronomic Images", Sensors, vol. 13, No. 4, Apr. 2, 2013, pp. 4348-4366.

Stone, et al., "Evolution of Electronics for Mobile Agricultural Equipment", American Society of Agricultural and Biological Engineers ISSN 0001-2351 vol. 51(2), 2008, 385-390.

"International Search Report and Written Opinion", PCT/US2015/050059, dated Dec. 10, 2015.

De Boer, et al., "Generic remote software update for vehicle ECUs using a telemantics devices as a gateway", Advanced Microsystesm for Automotive Applications, 2005, pp. 371-380 [Part of the Advanced Microsystems for Automotive Applications 2005 book series (VDI-BUCH)].

"Extended European Search Report", Intelligent Agricultural Solutions LLC, European Application No. 15840433.5, dated Apr. 6, 20108.

* cited by examiner

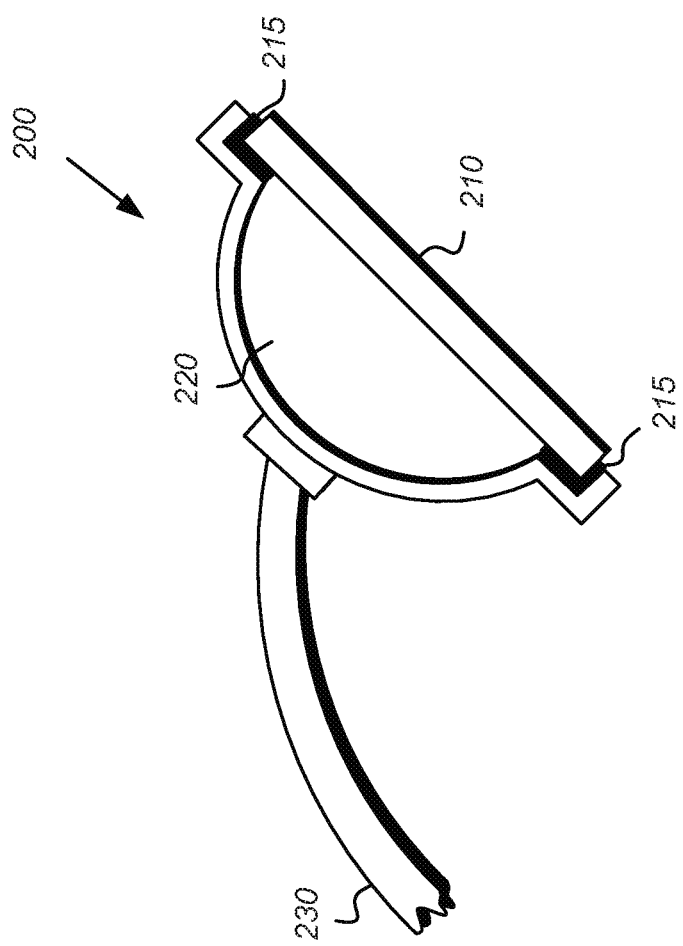

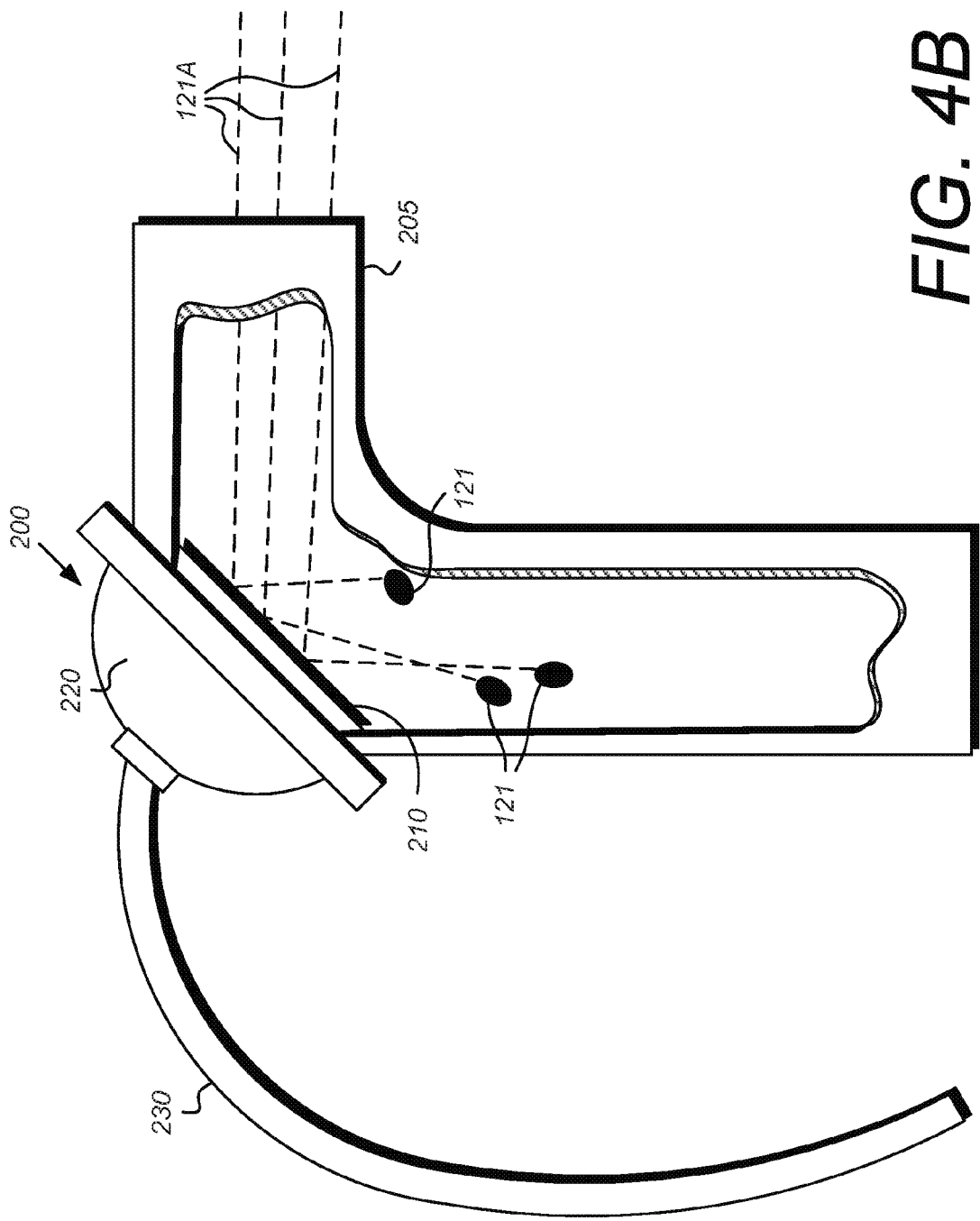

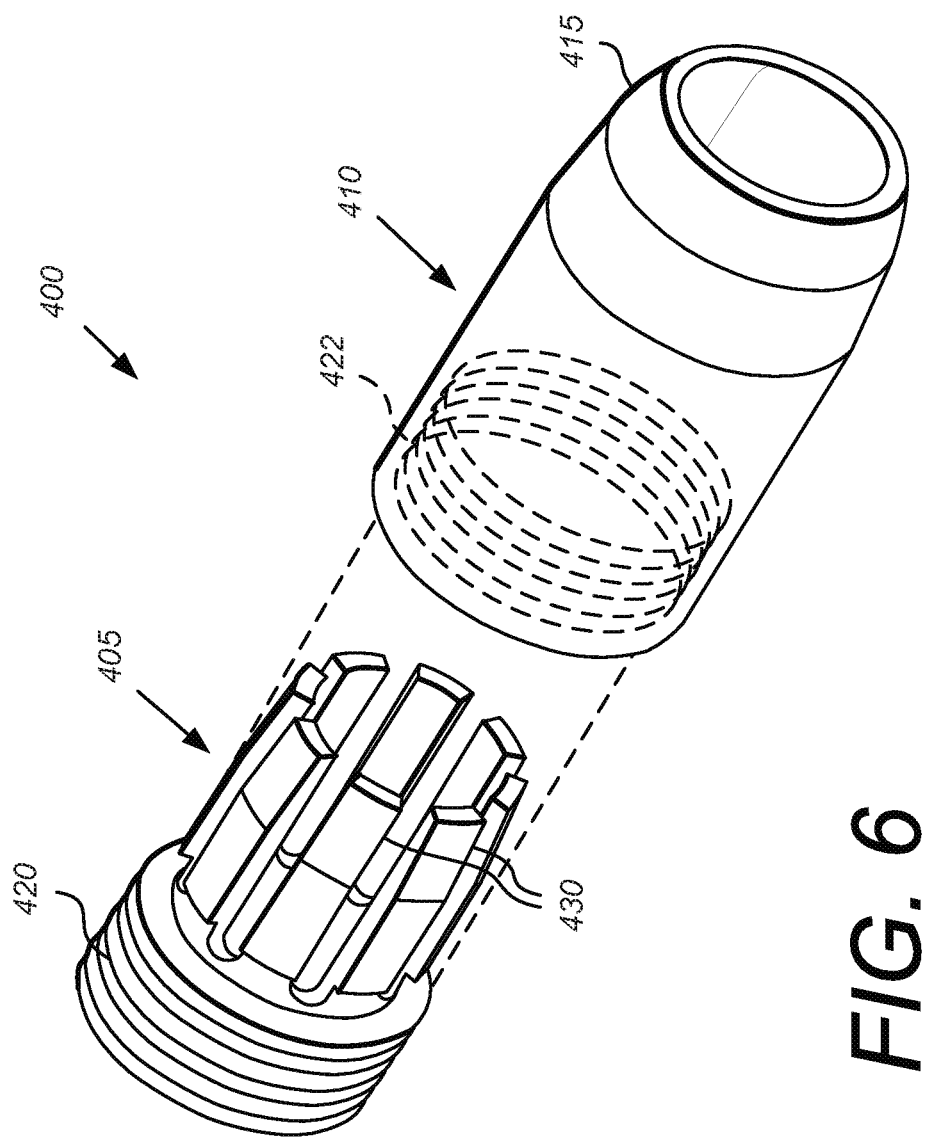

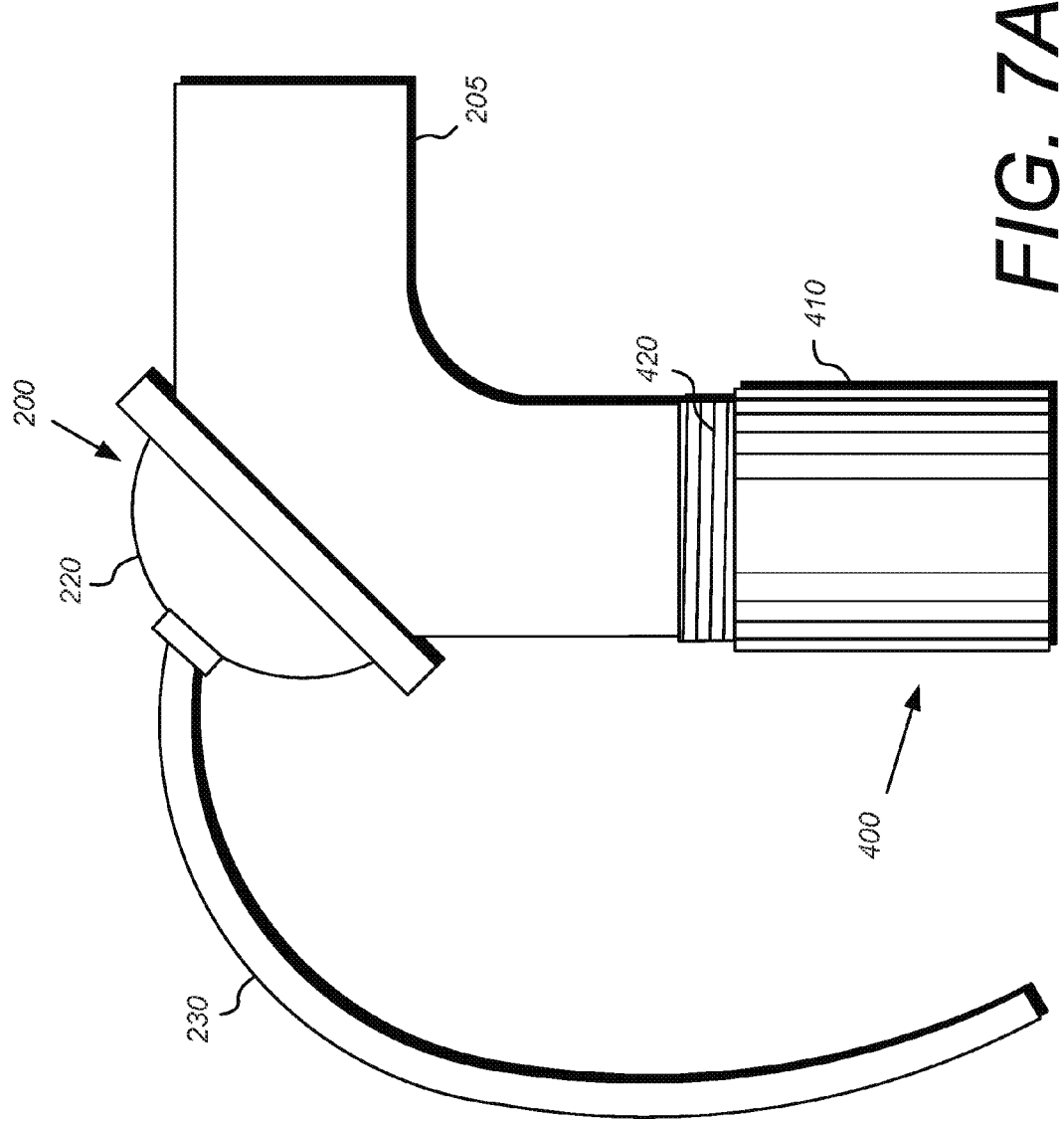

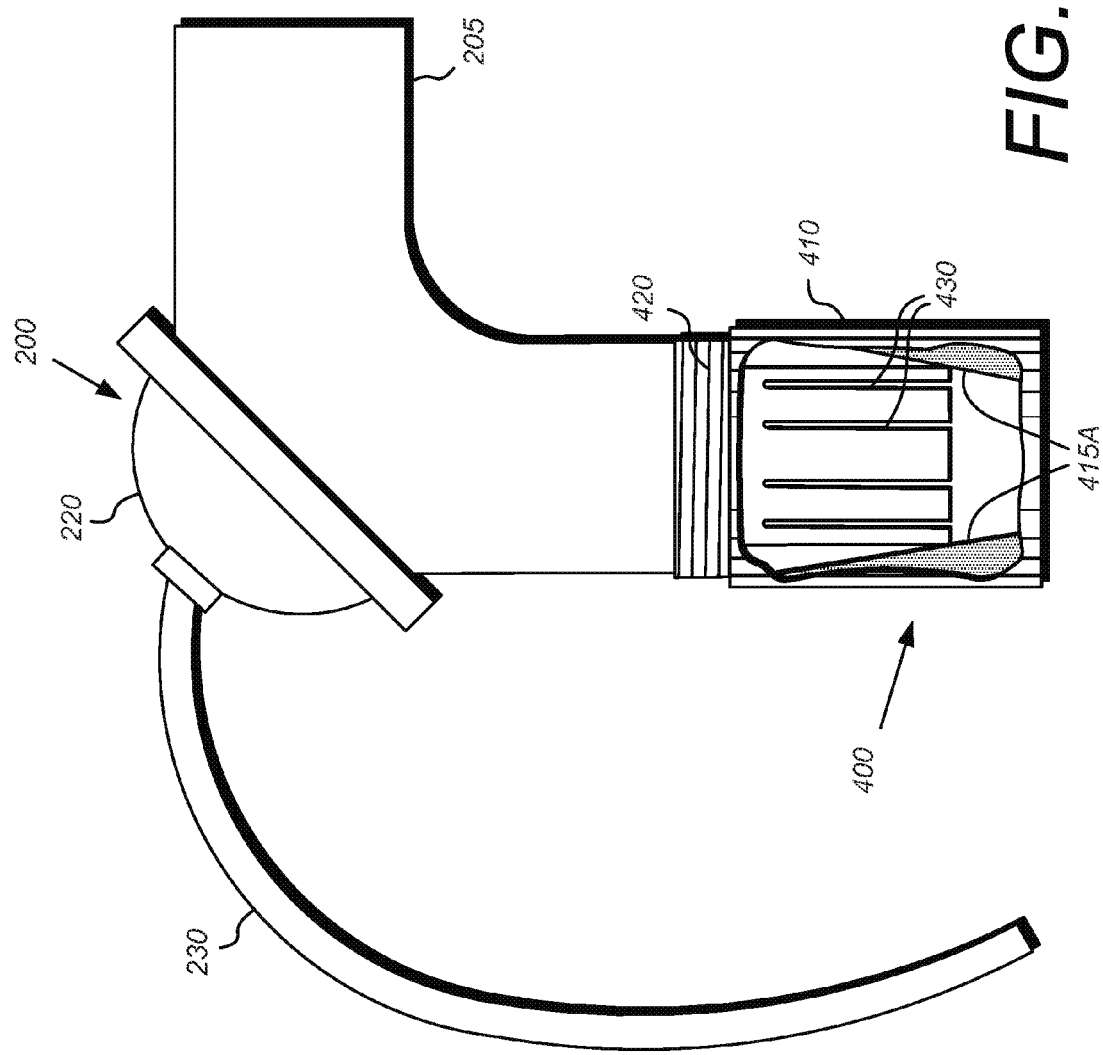

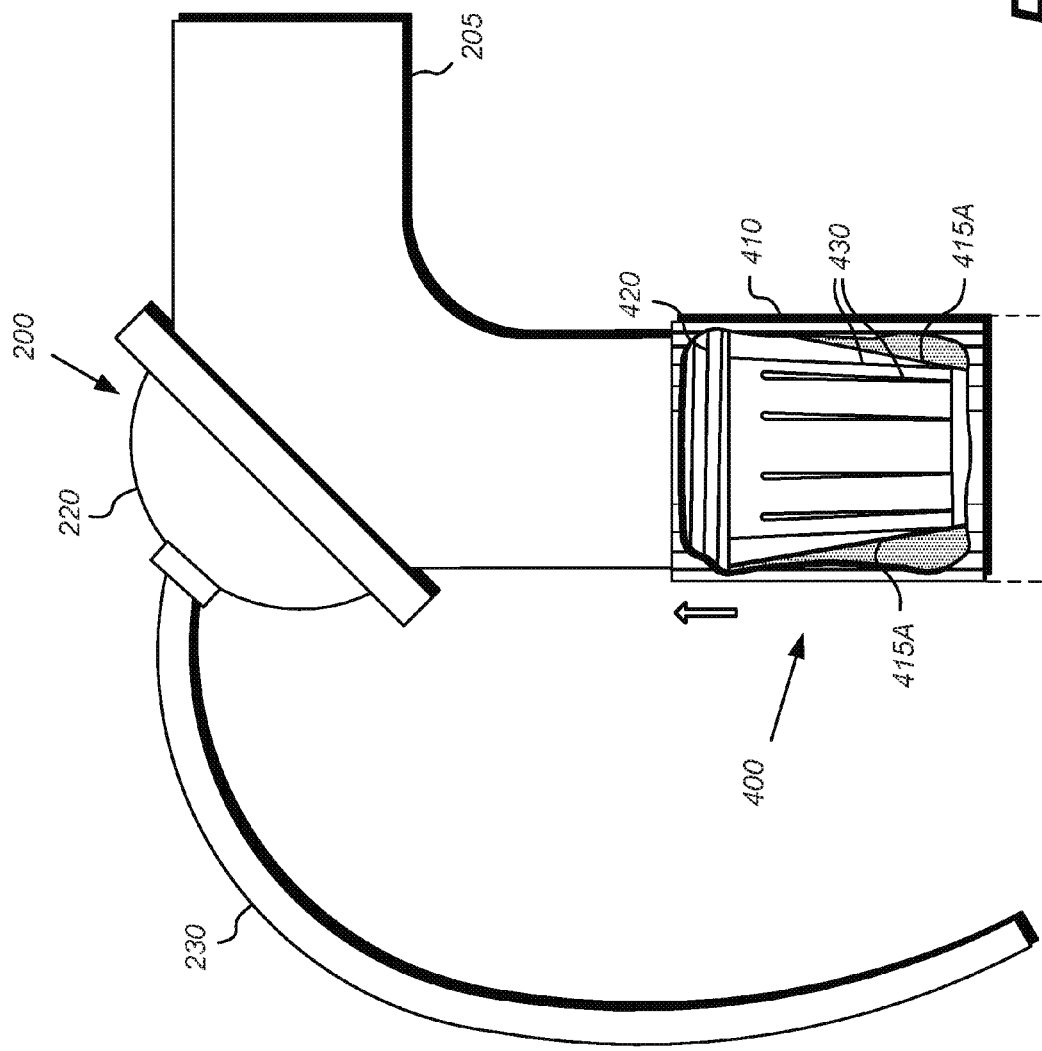

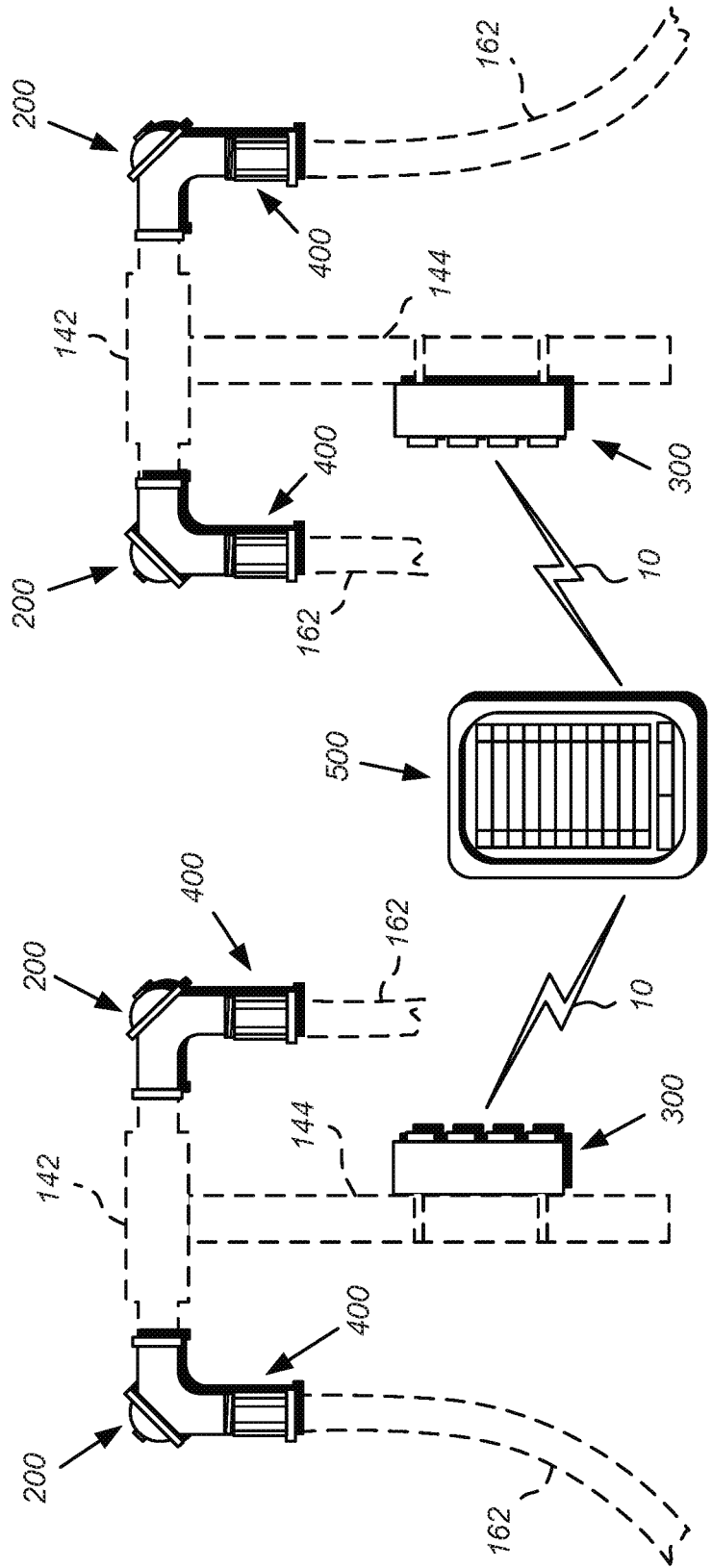

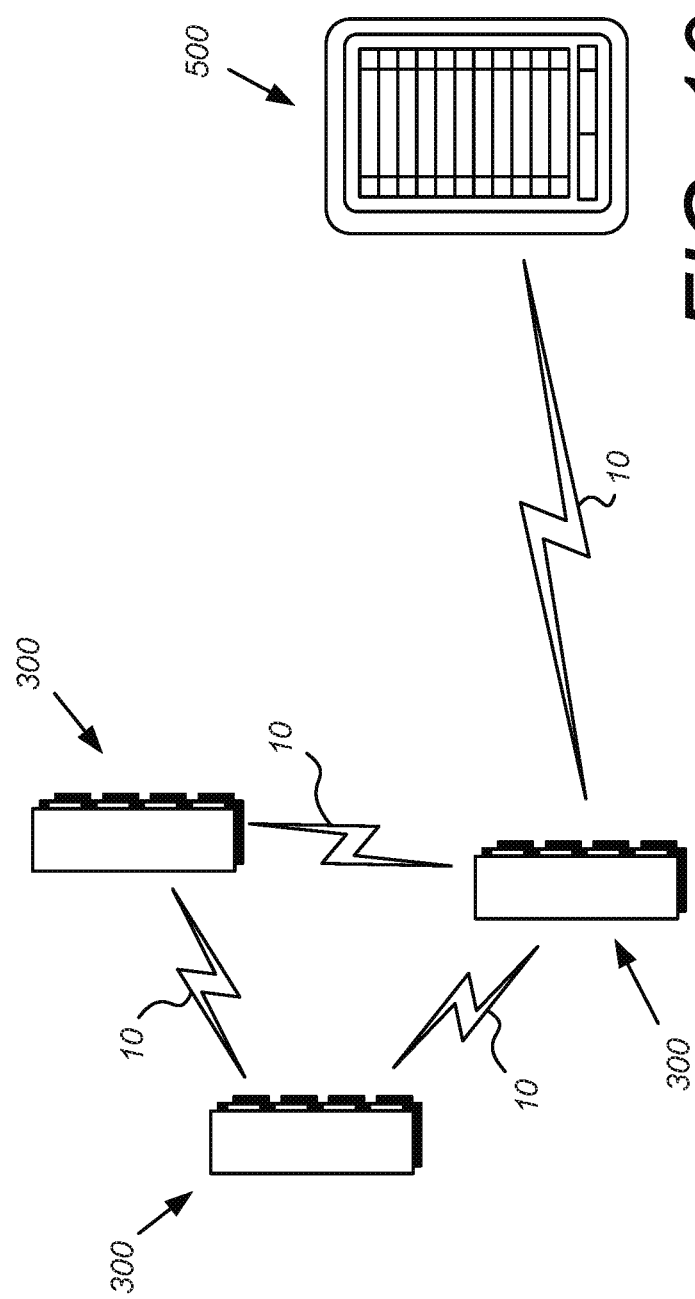

720 {
Let Tcurr be the current time of evaluation
Let AUDIBLE_ALARM be the flag denoting the audible alarm is set
Let VISUAL_ALARM be the flag denoting the visual alarm is set
Let BELOW_THRESHOLD be the flag denoting the seed flow is below the threshold
Let FLOW_FALLING be the flag denoting the seed flow falling over time
Let FLOW_RISING be the flag denoting the seed flow rising over time
Let FLOW_STEADY be the flag denoting steady seed flow (neither dropping nor rising)
Let ALARM_TIMEOUT be a number of seconds for the alarm timer 725 {
//Happens when the threshold is crossed
If (BELOW_THRESHOLD AND FLOW_FALLING and NOT VISUAL_ALARM) then
    VISUAL_ALARM = true
    Reset ALARM_TIMEOUT
End 730 {
If (VISUAL_ALARM)
    If (BELOW_THRESHOLD AND FLOW_FALLING AND (Tcurr - T1) > ALARM_TIMEOUT) then
        //Happens if flow has been falling for "too long"
        AUDIBLE_ALARM = true
    Else
        //Flow left the "falling" state before timeout
        Reset ALARM_TIMEOUT
    End 735 {
    If (BELOW_THRESHOLD AND FLOW_STEADY AND (Tcurr - T2) > ALARM_TIMEOUT) then
        //Happens if flow has been steady for "too long"
        AUDIBLE_ALARM = true
    Else
        //Flow left the "steady" state before timeout
        Reset ALARM_TIMEOUT
    End 740 {
    If (BELOW_THRESHOLD AND FLOW_RISING AND (Tcurr - T3) > ALARM_TIMEOUT) then
        AUDIBLE_ALARM = true
    Else
        //Flow left the "rising" state before timeout
        Reset ALARM_TIMEOUT
    End
End 745 {
//Now above threshold, clear warnings
If (NOT BELOW_THRESHOLD) then
    Reset ALARM_TIMEOUT
    AUDIBLE_ALARM = false
    VISUAL_ALARM = false
End

*FIG. 12B*

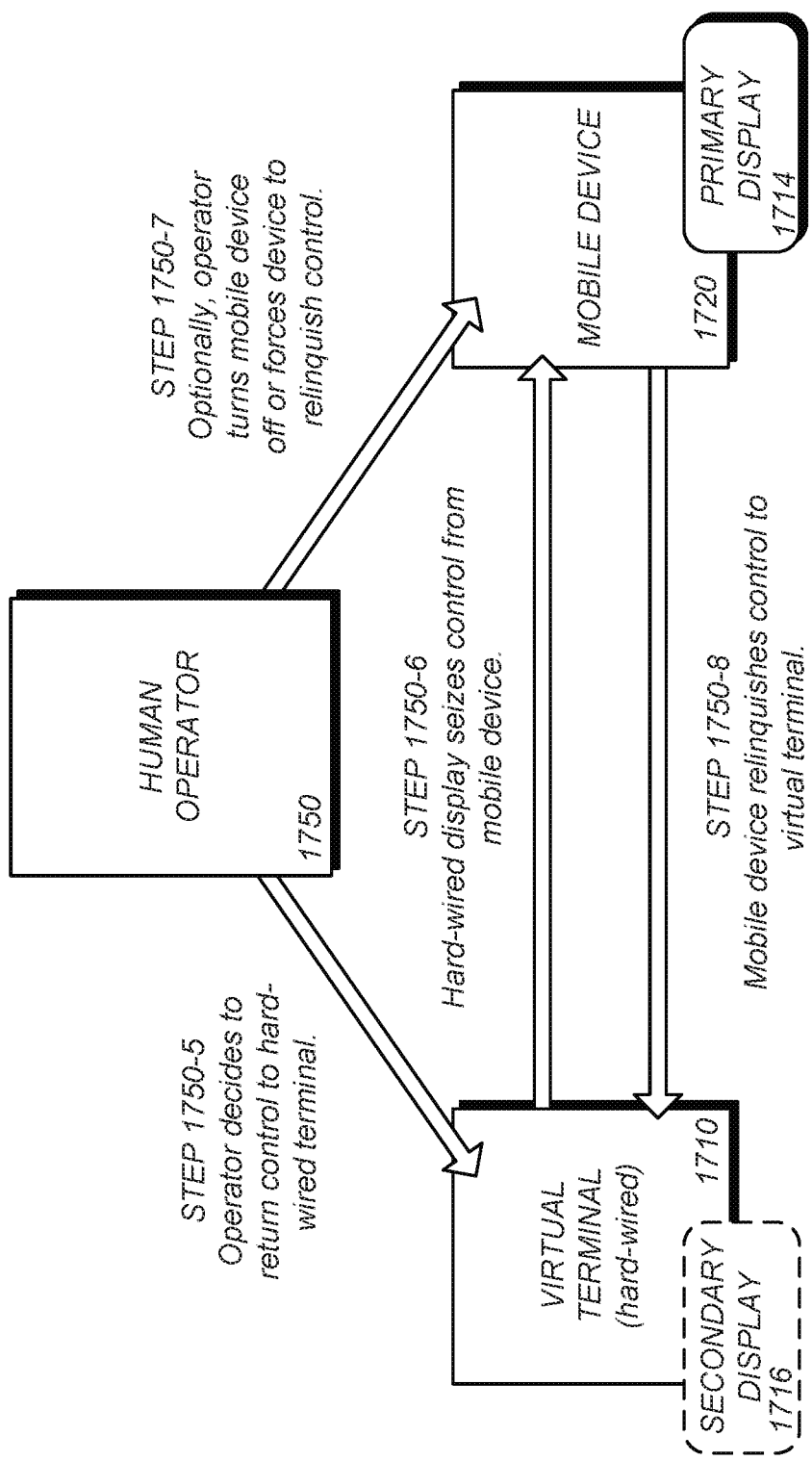

| SECURITY MODE | DESCRIPTION OF MODE |
|---|---|
| Role-Based Security | The system only gives access to a subset of system privileges, based on the requestor's role. |
| Conditional Security | The system only gives access to features when a condition is met, such as the operator's presence in the seat. |
| Pre-Approval Security | The operator can place the primary display into a mode such that it expects a request from a secondary display (potentially a specific one). |
| Manual Approval Security | Each request made by a secondary display must be manually approved by an operator at the primary display. |
| Shared Operations Security | Two or more displays are allowed to command separate, non-conflicting subsets of system privileges. (For example, Display 1 controls features A and B, and Display 2 controls features C and D.) |

FIG. 17E

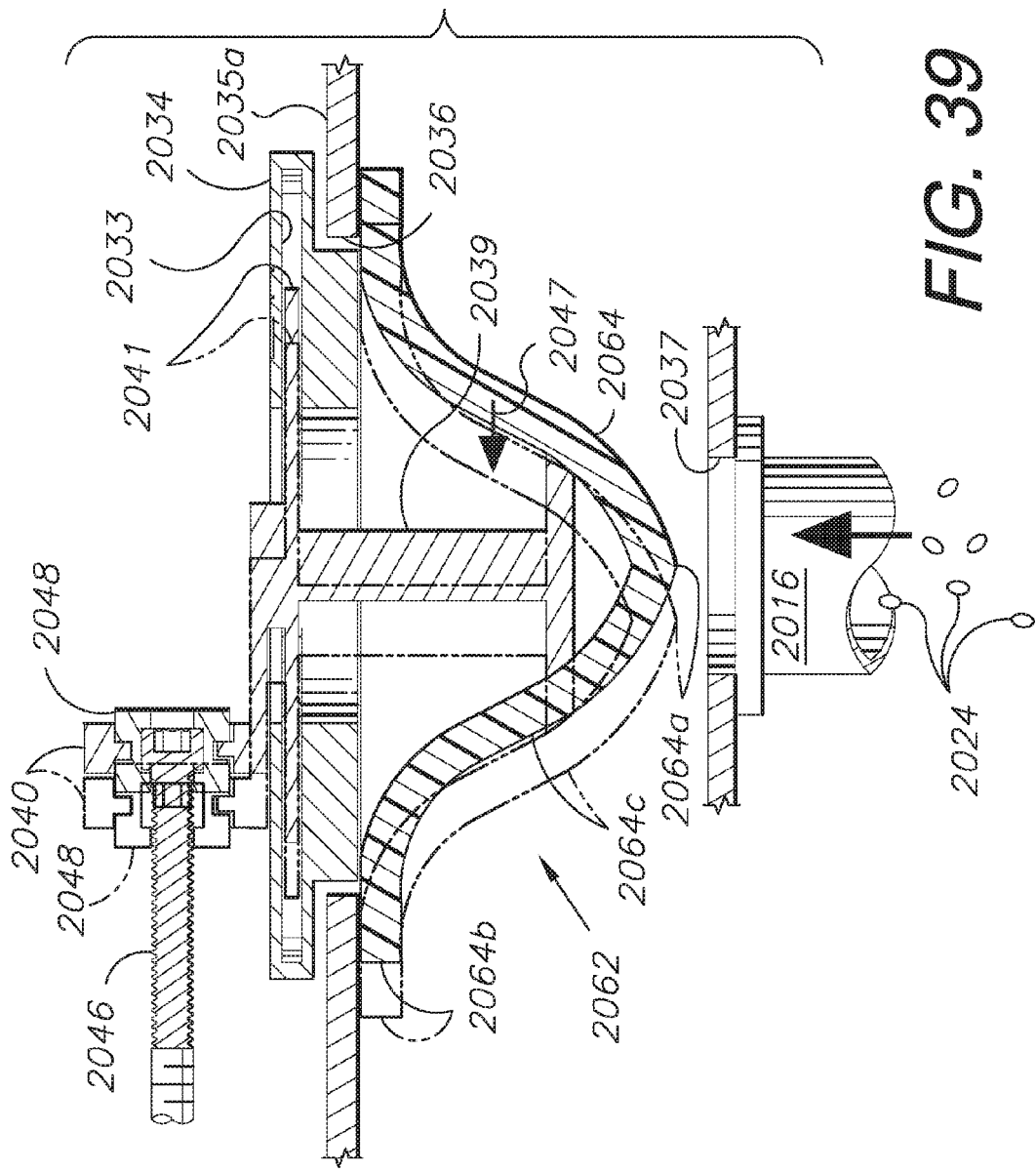

AIR SEEDER MANIFOLD SYSTEM

CROSS-REFERENCE TO RELATED APPLICATIONS

This patent application is a continuation-in-part of and claims priority in U.S. patent application Ser. No. 15/145,661, filed on May 3, 2016, which is a continuation-in-part of and claims priority in U.S. patent application Ser. No. 13/843,029, filed on Mar. 15, 2013, now U.S. Pat. No. 9,330,062, issued on May 3, 2016, which is in turn a continuation-in-part of U.S. patent application Ser. No. 13/046,549, filed on Mar. 11, 2011, now U.S. Pat. No. 8,950,260, issued on Feb. 10, 2015. This application is related to U.S. patent application Ser. No. 14/229,492, filed on Mar. 28, 2014, now U.S. Pat. No. 9,324,197, issued on Apr. 26, 2016. The entire disclosures of the above-noted patent applications are incorporated by reference in their entireties herein.

BACKGROUND OF THE INVENTION

1. Field of the Invention

The present invention relates generally to a material flow monitoring and equalization system, and more particularly to a system for measuring and balancing the flow of seeds in an air seeder for crop planting.

2. Description of the Related Art

The general principle of an air seeding system is to dispense seeds and/or other particulate matter (fertilizers, herbicides, etc.) from a hopper or other container into a moving flow of air, where the moving air will carry it through a series of branching tubes and manifolds to a point where it will ultimately be deposited into the soil. The particulate matter is typically metered in a controlled fashion as it is dispensed from the hopper, allowing the total rate of material distributed to be controlled. However, once the material leaves the hopper, it is difficult to determine precisely which portion takes which specific path through the branching network of tubes to eventually make its way to the end of the seed tubes and be placed into the soil.

An air seeding system represents a complex fluid dynamics problem, in which a single initial flow of air and suspended seeds may be continuously divided and redirected through multiple tubes to manifolds where it is then split off into branching seed tubes of varying lengths to a point of eventual discharge into the soil. Sharp turns, bends, and forks in the distribution tubes cause restrictions on the material flow, and make balancing the system for seed and other particulate dispersal problematic. A modern air seeder may plant well over 100 rows of seeds simultaneously. If a partial or full blockage develops in one or more of the particulate flow tubes, air flow (and, therefore, particulate flow) increases proportionately in the remaining tubes, further complicating the balancing problem. To optimize the distribution of material and maintain an even balance of distribution, an air seeding system must employ some type of particulate flow balancing system which balances the amount of particulate material flowing in the distribution tubes (the particulate flow path), a subsystem by which the flow can be adjusted so that an operator can balance the system, and another subsystem to detect particulate flow disruption or blockage during use should field conditions cause the system to become unbalanced.

It should be noted that the term "blockage" will be used generally throughout the specification to refer to either a full and a partial blockage in some part of the air seeding system. A partial blockage will still allow some amount of air and material to flow past it, but will reduce the flow noticeably. A full blockage will not allow any material to flow past it (although it may be possible for a small amount of air to leak past a full blockage).

An important metric for measuring the balance of an air seeder system is the "Coefficient of Variation" (CV), which is defined as a percentage difference between sets of final seed runs. The sets could range from a few final runs, to an entire manifold, to the entire width of the seeder. The Prairie Agricultural Machinery Institute has published guidelines for CV values as its basis for rating the uniformity of distribution for seeding implements. These guidelines describe a rating scale wherein: a CV greater than 15% is unacceptable, a CV between 10% and 15% is acceptable, and a CV less than 10% is good.

Heretofore there has not been available an air seeder manifold system with the advantages and features of the present invention.

SUMMARY OF THE INVENTION

In accordance with the teachings of the present invention, a particulate flow measurement, monitoring and balancing system is disclosed. The system has a particular use for monitoring and measuring the particulate flow in a pneumatic system such as an air seeder, such particulate flow consisting of seeds, fertilizer, or a combination of both seeds and fertilizer; and, based upon data derived from sensors in the system, provide a means to simply and effectively balance the material flow being dispensed by a plurality of seed tubes so as to affect uniform distribution of the material across the field. Each system consists of a plurality of discrete sensors placed in the particulate flow tubes such that the signals received are analyzed by a computational means, the data from which is transmitted to a central operator interface.

The system of the present invention can be used in conjunction with a vehicle control and gateway module, as described. An electronics module, called a gateway module, acts as a bridge between proprietary communication busses standard on a vehicle (such as those commonly seen on commercial agricultural and construction vehicles, including the standardized communication busses used for operator displays in the vehicle), and various external, remotely-located wireless networks (including but not limited to personal area networks, local area networks (LANs), mesh networks, wide area networks (WANs), metropolitan area networks, and cellular networks). The gateway module receives messages from one system (from one or more of the vehicle busses or from one or more of the off-board wireless networks), interprets the message, translates it into a form appropriate to the receiving system, and transmits it to the receiving system seamlessly. This allows a mobile device to access data from the vehicle as needed, or even to be used as a controller for the vehicle. It also allows an application programming interface (API) to be created that will allow an external, web-based application to access and use vehicle-generated data (such as vehicle service information, vehicle or implement status, seed or chemical quantity, etc.).

BRIEF DESCRIPTION OF THE DRAWINGS

FIG. 4A shows a stand-alone, cutaway view of an acoustic sensor of the present invention.

FIG. 4B shows a cutaway view of the mounting of an acoustic sensor of the present invention, showing how the sensor interacts with and detects seeds.

FIG. 6 shows a perspective view of an air flow restrictor as used in the present invention.

FIG. 7A shows an alternative embodiment of the acoustic sensor where the air flow restrictor of FIG. 6 is built into the acoustic sensor housing.

FIG. 7B shows the alternative embodiment of the acoustic sensor from FIG. 7A with a cutaway view of the air flow restrictor.

FIG. 7C shows the cutaway view of the air flow restrictor from FIG. 7B, but with the restrictor shell tightened such that the restrictor fingers are squeezed more tightly together.

FIG. 8 illustrates how the blockage monitoring nodes of FIG. 5A communicate wirelessly with a handheld computing device, which may be used as both a system display and control device.

FIGS. 10A, 10B, and 10C illustrate how the blockage monitoring nodes of the present invention can communicate wirelessly with each other, as well as with a remote information display.

FIGS. 12A and 12B illustrate one embodiment of an algorithm for determining when an air seeding system using the present invention is stopping or turning around at the end of a field, allowing the blockage alarms to be disabled to prevent false alarms.

FIG. 17B is a second use case diagram showing possible interactions between a hard-wired display, one or more mobile devices, and the human operator, but with the mobile device now acting as the primary display.

FIG. 17E shows a table describing possible security modes in which the system of the present invention might operate, granting certain privileges to system actors based on pre-defined conditions or scenarios.

FIG. 39 is a cross-sectional view of an air seeder manifold system comprising another alternative embodiment of the present invention with an elastomeric or rubber diverter element (cone).

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Said terminology will include the words specifically mentioned, derivatives thereof and words of similar meaning.

II. Air Seeder Monitoring and Equalization System and Method

With reference now to the drawings, and in particular to FIGS. 1 through 14 thereof, a new air seeder monitoring and equalization system embodying the principles and concepts of the present invention will be described.

Figure 1:
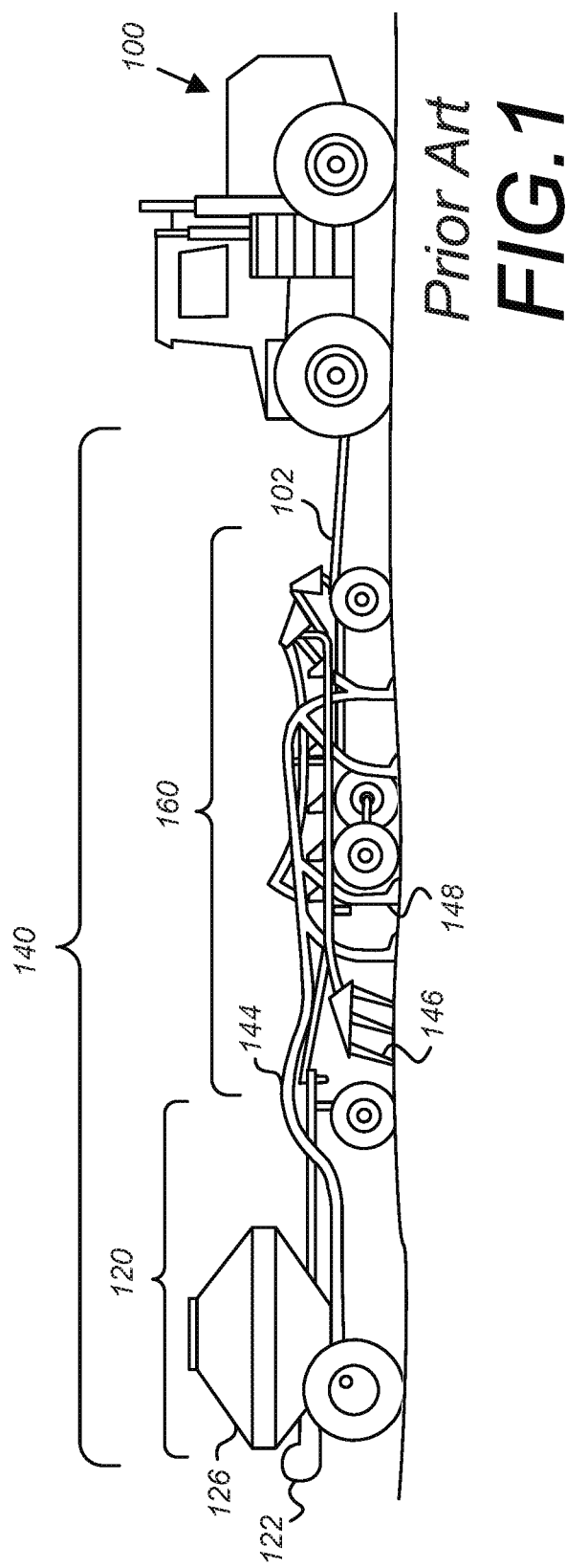
FIG. 1 shows a side view of a typical air seeder system being pulled by a tractor.

FIG. 1 shows a side view of a typical air seeding system being pulled by a tractor, which illustrates a typical system on which the present invention may be employed, and to provide a context for the present invention. A tractor 100 is towing an air seeding system 140. The air seeding system includes a tool bar 160 and an air cart 120, and is connected to the tractor by a tow bar 102. It should be noted that the configuration and details of the system shown in FIG. 1 are meant to be exemplary, and the actual system may vary in the exact configuration and components. For example, in some configurations, the position of the air cart 120 and the tool bar 160 may be reversed, such that the air cart 120 tows the tool bar 160.

While the exact configuration of the system shown in FIG. 1 does not limit the present invention, certain components of the system should be highlighted for clarity. Additional details on the configuration and operation of the air seeding system are provided in FIG. 2, which will be discussed shortly. The air cart 120 consists of one or more hoppers 126 which contain the material that is to be dispensed into the soil during operation. The material to be dispensed may be a particulate, which may consist of any particles suitable for achieving the purpose described herein, such as seeds, grains, herbicides, fertilizers, chemicals, etc., or any combination thereof; however, for the purposes of this discussion, the material will be referred to generically in the text of this specification as seeds. Any operations described herein in reference to seeds may also be applied to any other appropriate particulate or combination without changing the inventive concept.

It is important to note that the air cart 120 may actually have more than one hopper 126, and that each hopper 126 may contain a different type of material. For example, one hopper may include seed and a second hopper may contain fertilizer or other chemicals. It is also possible that the air seeding system 140 may itself include more than one air cart 120, with each air cart 120 potentially holding a different type of material. The exact number of air carts 120 in an air seeding system 140, as well as the exact number of hoppers 126 per air cart 120, can vary within the scope of the invention presented herein.

Figure 2:
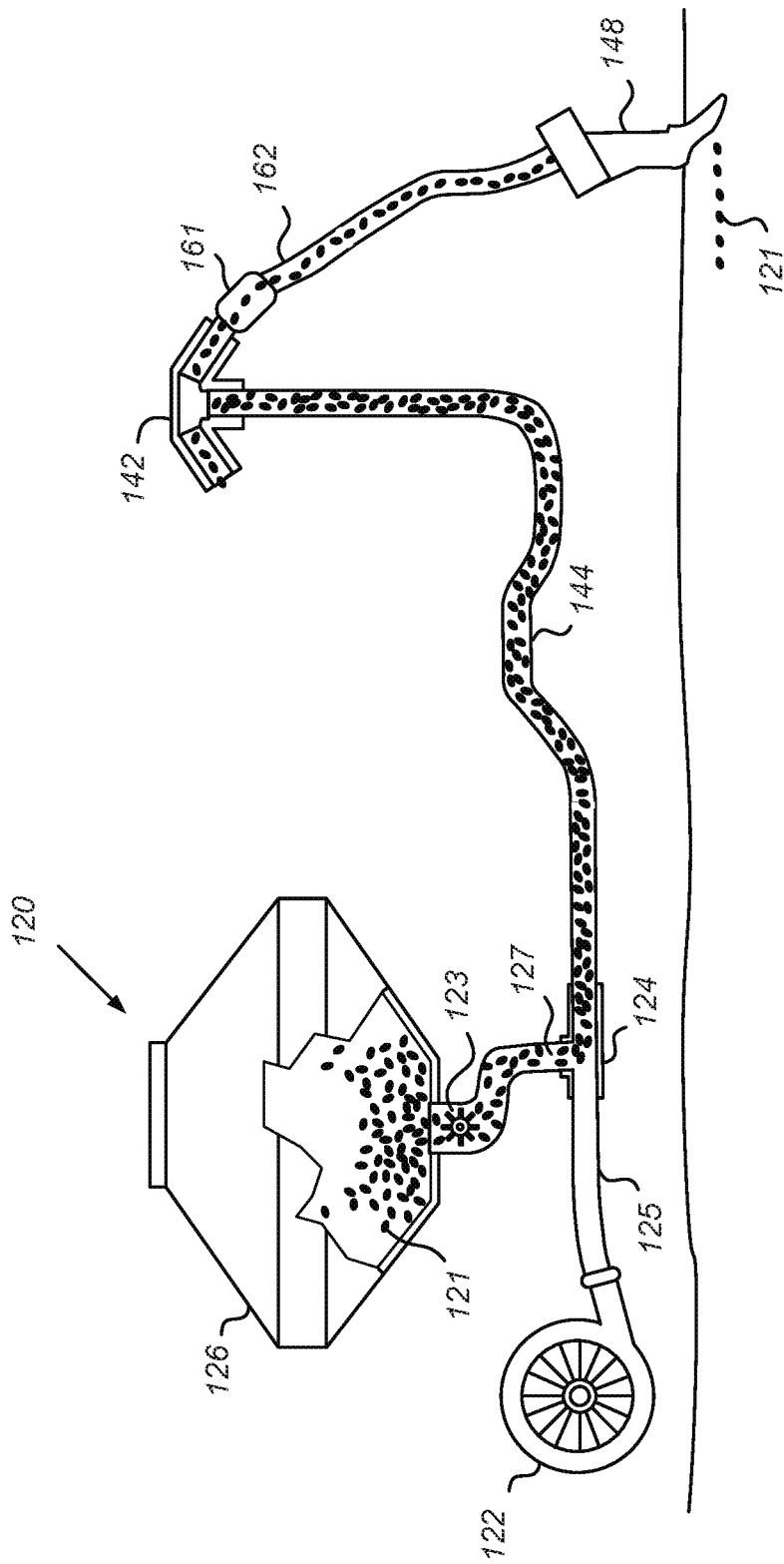
FIG. 2 shows a cutaway view of one embodiment of an air seeding system.

As shown in FIGS. 1 and 2, a prior art, preexisting air seeder implement can include a fan 122, which is connected to the air cart 120, and is used to introduce a flow of air into the implement which is used to carry the seeds 121 throughout the system. In general terms, the seeds 121 are dropped from the hopper 126 through a meter 123 and a conduit 127 into a primary manifold 124, where they enter into the flow of air provided by the fan 122. The seeds 121 flow from the primary manifold 124 to the primary seed tube 144 to secondary seed tubes 162 and are distributed throughout the tool bar 160. The air and seeds flow through the tool bar 160 and are deposited into a furrow dug in the ground by openers 148. The openers 148 are blades which extend into the soil, and create furrows for holding the seeds as they are drawn through the ground. As the tractor 100 and air seeding system 140 continue forward, the furrows created by the openers 148 are pushed shut by closers 146, covering the dispensed seeds with soil.

Referencing now to FIG. 2, a cutaway view of a portion of the air seeding system 140 is shown, detailing the path of the seeds 121 and particulate flow through the system. As with FIG. 1, FIG. 2 is intended to show an exemplary system to outline the functioning of a typical air seeding system, and is not meant to be limiting in any way. Various changes to the configuration and components of the system can be made without affecting the overall inventive concept presented herein.

For the example embodiment of an air seeding system shown in FIGS. 1 and 2, we will use the terms "primary" and "secondary" to indicate a component's relative position on the example air seeding system shown. In this example, seeds leaving the hopper first enter into a primary manifold, where they are divided into one or more primary seed tubes. The primary seed tubes carry the seeds away from the air cart and onto the tool bar, where the primary seed tubes each flow into a secondary manifold, where the flow of material is once again divided. From each secondary manifold, the seeds flow into secondary seed tubes, and eventually down into the furrow being made in the ground by the openers on the air seeder. It should be noted that the exact configuration of the manifolds and seed tubes is not critical to the key inventive concepts presented herein, and that the present invention will work on any configuration of air seeder. What is critical to the inventive concepts presented herein is that the amount of material flowing through each of the final seed runs in the system, just prior to the seeds leaving the machine and flowing into the earth below, is sensed as described herein. In the example system presented in the figures contained herein, these "final seed runs" are referred to as secondary seed tubes, but they could be called by another name in another system. This example system is further described, with the appropriate reference designators, in the following text.

The air cart 120 includes a hopper 126 which holds the seeds 121 to be dispensed by the implement. The seeds 121 are released from the hopper 126, falling into a conduit 127 that is connected to the rest of the system. As the seeds 121 pass into the conduit 127, the rate of their flow is controlled by a metering system 123. The seeds 121 fall through the conduit 127 into the primary manifold 124, where they are introduced to the flow of air produced by the fan 122. The fan 122 is connected to the primary manifold 124 by a hose 125.

The seeds 121 are propelled out of the primary manifold 124 by the flow of air and enter into one or more primary seed tubes 144. From the primary seed tube 144, the seeds 121 travel into a secondary manifold 142, where the flow of seeds 121 is split or branched in several directions and directed into a plurality of secondary seed tubes 162. The secondary seed tubes 162 then deliver the seeds 121 down into and behind the opener 148, where the seeds 121 fall down into the furrow in the ground created by the opener 148. Block 161 in FIG. 2, shown in the location between the secondary manifold 142 and the secondary seed tube 162, is one possible location for the sensor and restrictor components described in detail in FIGS. 3 through 6.

Figure 3:
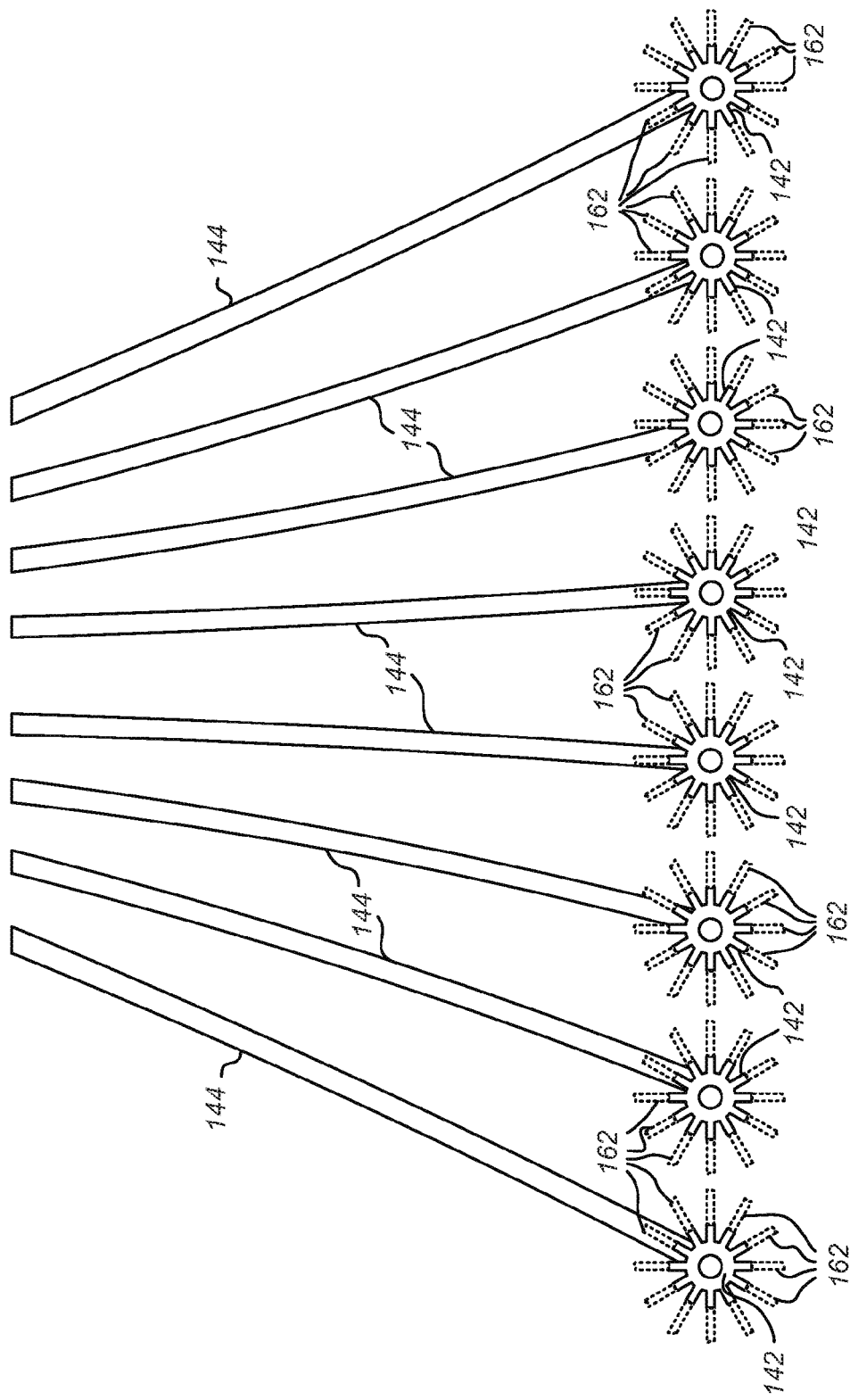
FIG. 3 shows an example of how the primary seed tubes bring seeds to the secondary manifolds, which in turn branch the flow of material into several secondary seed tubes.

FIG. 2 illustrates a single path through the system from the hopper 126 to an opener 148. To better illustrate how an air seeding system represents a complex fluid dynamics problem, it is helpful to describe the flow of material through an air seeder. FIG. 3 shows one example of an air seeding system which can seed up to ninety-six rows simultaneously. An air seeder with ninety-six rows is a common configuration, and modern air seeding systems may have more than one hundred rows. For the example air seeder shown in FIG. 3, only certain components are depicted to show the flow of material through the system. For ninety-six rows, this example system uses eight primary seed tubes 144 supplying a flow of material to eight secondary manifolds 142. Each of the eight secondary manifolds 142 then split the flow of material into twelve separate secondary seed tubes 162. In FIG. 3, only a portion of each of the secondary seed tubes 162 is shown (in dashed lines) to simplify the drawing. In reality, each of these ninety-six secondary seed tubes 162 will flow out onto the tool bar 160 and down into each of ninety-six openers 148, where the flow of seeds 121 will be injected into the corresponding furrow.

As illustrated in FIG. 3, the length of the primary seed tubes 144 will vary, depending on which secondary manifold they are routed to. The primary seed tubes 144 are routed over the structure of the tool bar 160, and may each have dips and bends where the flow of seed material can be slowed or otherwise disturbed. The secondary manifolds 142 are typically raised on towers, and the primary seed tubes 144 rise up into the towers, causing the flow of material to flow straight up, directly against gravity. Within the secondary manifolds 142, the flow of material is branched in twelve different directions (in this example), and follows the air flow into the secondary seed tubes 162. Similar to the primary seed tubes 144, the secondary seed tubes 162 must also be routed from the secondary manifolds 142 across the structure of the tool bar 160 and into the furrows behind the openers 148. The flow of air created by the fan 122 is split ninety-six times (in this example), and each branch of this flow has a different geometry and length, creating different impediments to the flow of air and airborne material and hence completely different flow characteristics. Creating a system in which this flow of material is balanced with all of the flows coming into the openers 148 on the system are essentially the same, is an extremely difficult task. The present invention provides an inexpensive yet accurate particulate flow monitor and a method of balancing the flow of particulate throughout the entire particulate flow path of a pneumatic system, such as an air seeding system.

Throughout this specification, various terms may be used interchangeably to describe the present invention. As previously discussed, the term "seeds" will be used generally to cover any type of particulate (that is, a material made up of particles or droplets) that is flowing through a system. Although the examples given herein primarily represent an air seeding system, the same inventive concepts may be applied to any particulate flow system in which particles or droplets of material are pushed through the system by a flow of air. Because the systems being described are based on flowing air, the term "pneumatic system" may be applied to these particulate flow systems. In general, the term "pneumatic" means filled with air, especially compressed or forced air.

The detailed description describes various embodiments and features of a particulate flow monitor, or simply flow monitor, which, for the purposes of this description, is a means of sensing the amount of particulate matter flowing through a pneumatic system at a given time. Other terms for a particulate flow monitor may include "seed flow monitor" or "material flow monitor."

One inventive component of the present invention is an acoustic sensor, also referred to as an acoustic transducer. The purpose of the acoustic sensor or transducer is to transform the sound waves generated by the flow of particulate material in a pneumatic system into electrical signals representing the amount of particulate flow through the flow paths of the pneumatic system. Sound waves are created by the vibrations of an object in air, which causes the air to be compressed in waves or impulses. The acoustic sensor detects the pneumatic impulses created by particulate striking the face of the acoustic sensor and directs them into an internal microphone, where the impulses are transformed into electrical signals to be interpreted by a processor.

For the purposes of this discussion, the term "processor" or "controller" is used in a general sense to describe electronic and/or software means for processing signals and/or data generated by a system, and may refer to a microprocessor, a microcomputer, or a separate computer system. A processor may be part of an "electrical signal generator," which is a module or collection of modules or functions that interpret data items or events (such as pneumatic impulses) and output electrical signals representing the data items or events.

The present invention also provides a means of displaying or outputting the electrical signals and/or the information they represent. This may be done using a direct mounted computer monitor (that is, a display built in or directly wired into a vehicle or application) or on a handheld computing device. The term "handheld computing device" is intended to generally refer to any type of easily portable computing platform that does not require being directly wired into a vehicle or application. One example of such a device is the iPad manufactured by Apple, Inc. Other examples may include a laptop computer, a tablet computer, or even a personal cellular phone with sufficient processing and displaying capabilities.

The present invention will now be described in additional detail in the following text and the remaining figures.

Figure 5A:
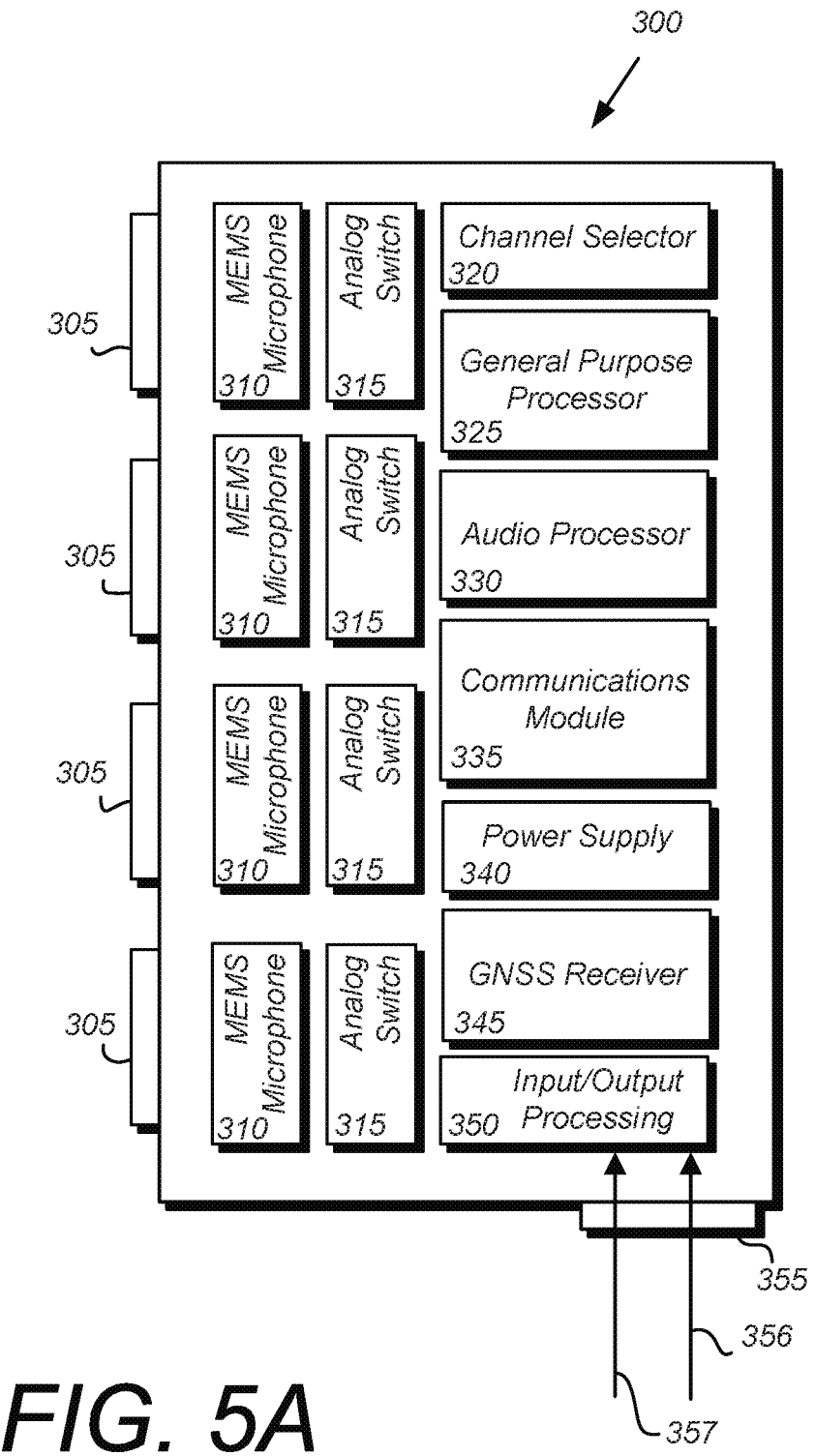
FIG. 5A shows a block diagram of a blockage monitoring node of the present invention.
Figure 5B:
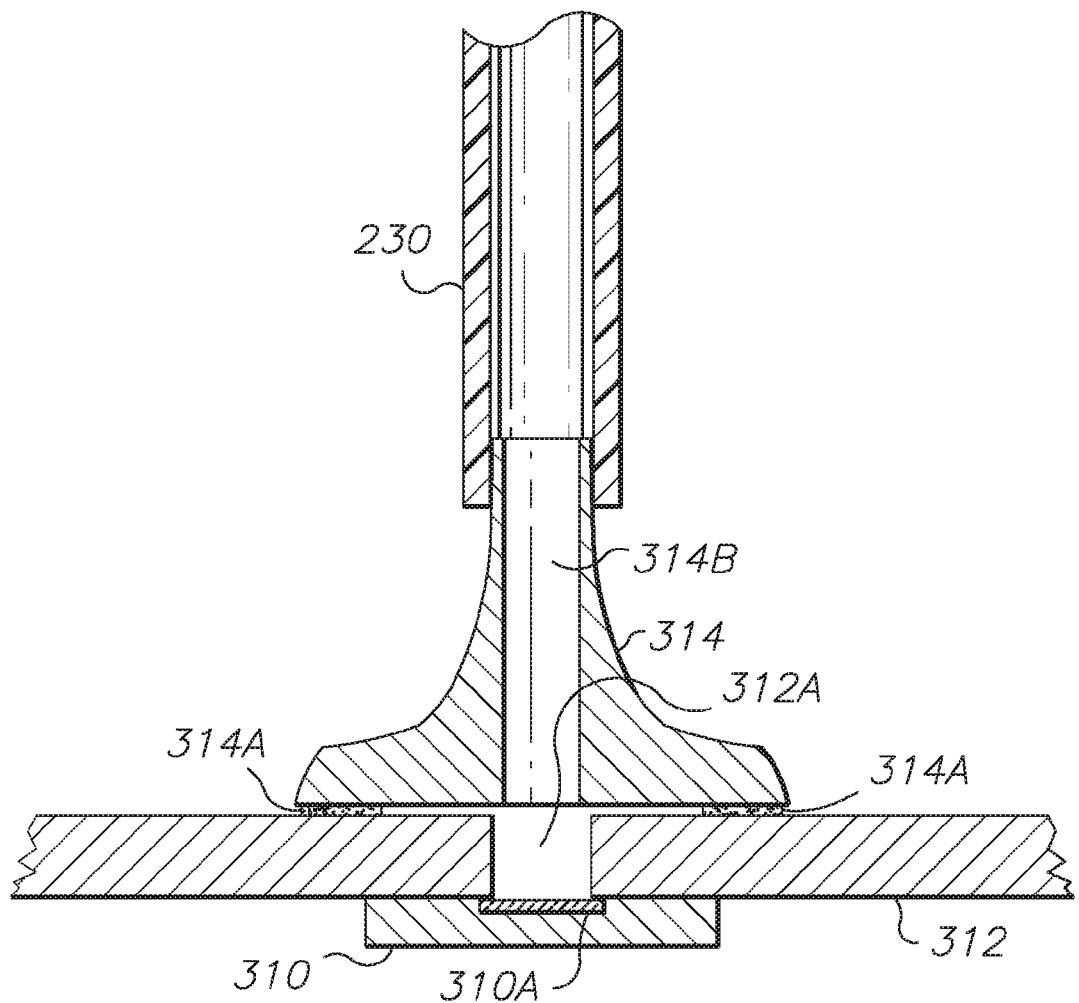
FIG. 5B shows a cutaway view of one embodiment of the connection between the transmitting hose and the microphone mounted inside the blockage monitoring node.
Figure 5C:
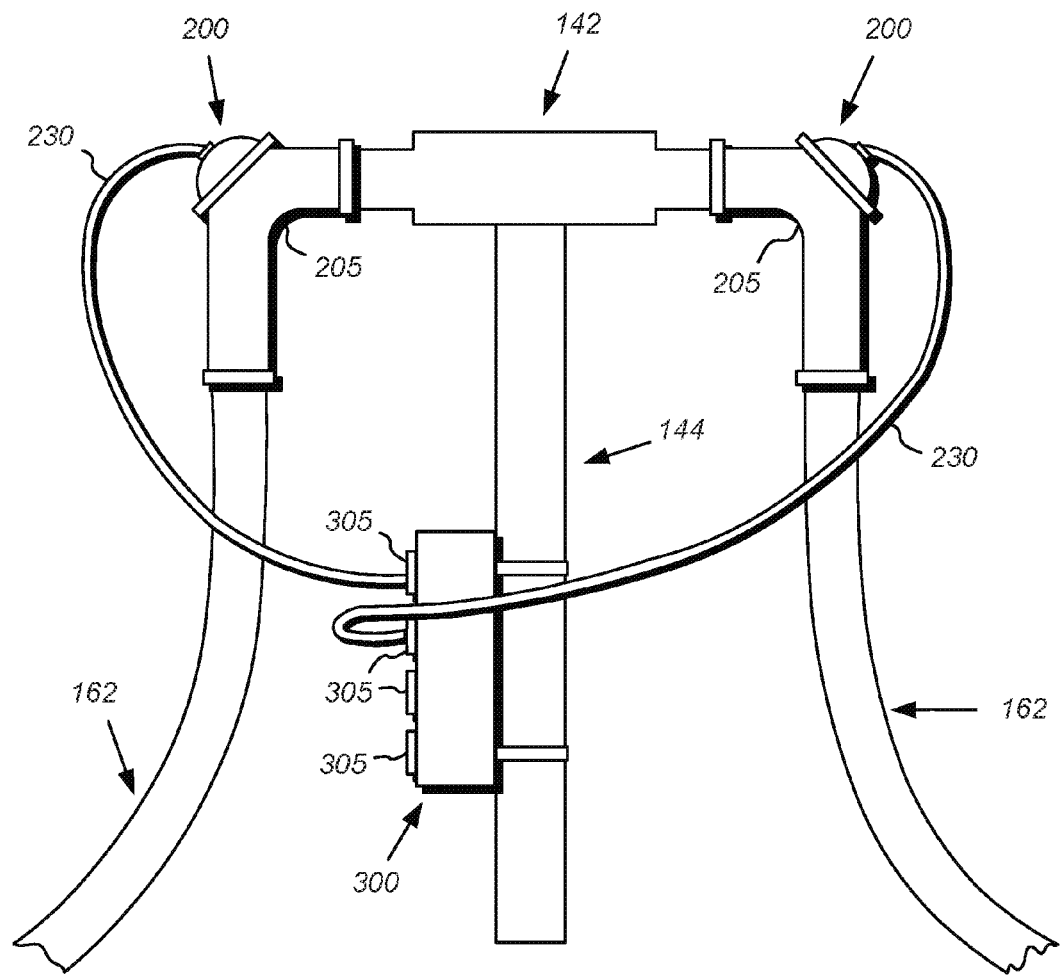
FIG. 5C shows a side view of the blockage monitoring node of FIG. 5A in use as it would be mounted and connected to the acoustic sensors of the present invention.

Referencing now to FIGS. 4A and 4B, an embodiment of an acoustic sensor used for detecting the amount of seeds and material flowing through the system will be discussed. FIG. 4A shows a stand-alone, cutaway view of an acoustic sensor of the present invention. The acoustic sensor 200 is a mechanical component that is designed to pick up, amplify, and direct sound from the inside of a seed tube into a separate electronics module called a blockage monitoring node 300. The blockage monitoring node 300 is not shown in FIGS. 4A and 4B, but is presented in detail in FIGS. 5A and 5B, and FIG. 5C shows one embodiment of how the blockage monitoring node 300 may be mounted along with one or more acoustic sensors 200.

In FIG. 4A, a sensor plate 210 is mounted over a hollow acoustic chamber 220. In the preferred embodiment, the sensor plate 210 is constructed of a durable material such as stainless steel which can withstand the impact of seeds, rocks, and other materials which may enter the material stream flowing through the air seeding system, and can also transmit sound into the acoustic chamber 220. Although stainless steel offers an ideal surface that provides high-amplitude signals and is both strong and resistant to corrosion, it is important to note that any appropriate material can be used to create the sensor plate 210. A gasket 215 is placed over or between the sensor plate 210 and the acoustic chamber 220 to prevent material from getting inside the acoustic chamber 220, thereby affecting the acoustic properties of the sensor, and also as a means of holding the sensor plate 210 in place. The gasket 215 may be a separate piece or may be applied as a paste in a dispensing operation. The gasket 215 is a flexible or spongy material that can be readily compressed to form an airtight seal between the sensor plate 210 and the acoustic chamber 220.

The acoustic chamber 220 is designed such that it can direct the sound picked up from objects striking the sensor plate 210 and direct them toward the back of the acoustic chamber 220, where they enter a transmitting hose 230. The sound travels through the transmitting hose 230 and is directed into the blockage monitoring node 300 (shown in FIGS. 5A and 5B).

In the preferred embodiment, the acoustic chamber 220 is made from an injection-molded plastic, such as those plastics commonly used for the construction of electronics enclosures and which withstand the extreme conditions found in the harsh environment of an air seeding system. However, the acoustic chamber 220 may be constructed by any appropriate manufacturing technique and using other materials without changing the inventive concept of the acoustic chamber 220.

The selection of materials is very important for the design of an acoustic sensor. The thickness and density of the material (for example, the sensor plate 210) will determine the frequency of the sound data that is transmitted into the acoustic chamber 220, and thus the sensor design can be "tuned" such that the frequencies it produces fall into an environmental "sweet spot" which is relatively free of background noise. Similarly, the design of the transmitting hose 230 is critical. The material of the transmitting hose 230 can have a filtering or attenuating effect on the noise that is transmitted down its length. If the transmitting hose 230 is too soft, it may also collapse and cut off sound transmissions. The material should be chosen with consideration for stiffness and such that the filtering effect of the transmitting hose 230 will not attenuate the frequencies in the system "sweet spot."

The transmitting hose 230, in the preferred embodiment, is constructed from a length of rubber hose. This material is flexible and allows the transmitting hoses 230 of several separate acoustic sensors to be easily routed to a nearby blockage monitoring node 300. However, the transmitting hose 230 may be made in a different manner, in a different geometry, or with a different material without altering its function, which is to create a conduit of sound which directs the sounds from the acoustic sensor 200 into a blockage monitoring node 300.

The acoustic sensor 200 is a simple mechanical solution which can be easily and inexpensively manufactured. The acoustic sensor 200 does not contain electronics, but instead routes the sounds it detects to a remotely located node where the sounds can be processed. As shown in FIG. 5B, the outputs of several acoustic sensors 200 can be directed into a single blockage monitoring node 300, so that the total amount of electronics on the air seeding system can be minimized, significantly reducing system cost and increasing system reliability.

Referencing now FIG. 4B, the acoustic sensor 200 is shown mounted on a hollow, tubular sensor housing 205. The sensor housing 205 provides a mounting point for the acoustic sensor 200. In the preferred embodiment, the sensor housing 205 is mounted between the secondary manifold 142 and the secondary seed tube 162 (placed in the position marked as 161 in FIG. 2, and as shown in FIG. 5C). The sensor housing 205 is essentially a rigid piece of tubing, bent at an angle such that the acoustic plate 210 of the acoustic sensor 200 will be impacted by seeds 121. The acoustic sensor 200 is mounted in an opening at the bend of the sensor housing 205, such that the acoustic plate 210 is directly exposed to the flow of material leaving the secondary manifold 142. Multiple seeds 121 are blown into the sensor housing 205 (following seed travel paths 121A, shown here as examples), where they impact the acoustic plate 210 and are deflected back down into the sensor housing and continue traveling down into the secondary seed tubes 162. Sounds created by the impacts of the seeds 121 on the acoustic plate 210 are transmitted into the acoustic chamber 220, and then are directed into the transmitting hose 230.

It should be noted that the sensor housing 205 could be designed such that it is an integral part of the acoustic sensor 200, or it could be a separate piece that connects the output of the secondary manifold 142 to the input of the secondary seed tubes 162. Although the angle of the sensor housing 205 is shown to be approximately 90 degrees in the figures, the ideal angle may be different, and would be calculated based on the geometry of the air seeding system for which the sensors are being designed. The angle of the acoustic sensor 200 would be optimized such that is presents the acoustic plate 210 to the flow of seeds 121 such that the sounds of impact can be adequately detected without adversely affecting the flow of material.

FIG. 5A is a functional block diagram of one embodiment of the blockage monitoring node 300 referenced previously in the specification. FIG. 5A shows one embodiment of the blockage monitoring node 300 capable of connecting to four acoustic sensors 200. The transmitting hoses 230 from one or more acoustic sensors 200 would connect to the blockage monitoring node 300 via a hose port 305. In alternative embodiments, the blockage monitoring node 300 may have any number of hose ports 305, and would likely offer the same number of hose ports 305 as there are acoustic sensors 200 on a single secondary manifold 142. As shown in the example system configuration of FIG. 3, each secondary manifold 142 would have a dedicated blockage monitoring node 300 (for a system total of eight blockage monitoring nodes 300), and each blockage monitoring node 300 would have a total of twelve hose ports 305. The number of hose ports 305 for a single blockage monitoring node 300 is variable, and may be any appropriate number.

Returning to FIG. 5A, for each hose port 305, there is a corresponding MEMS microphone 310 and a corresponding analog switch 315. "MEMS" is an acronym which stands for Micro-Electro-Mechanical Systems, and is used generally to refer to small devices or components which are micrometers (microns) in size. The MEMS microphones 310 receive the sound waves through the hose port 305 as they travel down from the transmitting hose 230 from the acoustic sensor 200. The analog switches 315 are used by the blockage monitoring node 300 to select which of the input streams from the MEMS microphones 310 should be processed at a given time.

MEMS microphones 310 are preferred for several reasons. Not only are the MEMS microphones 310 very small parts, contributing to a small blockage monitoring node 300, but they are also manufactured from a process that produces consistent parts, with very little part-to-part variation. This is important because it means that no calibration is required to account for the large part-to-part variations seen in traditional (non-MEMS) microphone components.

A general purpose processor 325 is provided to control the basic operations of the blockage monitoring node 300. A channel selector circuit 320 is controlled by the general purpose processor 325, and is used to toggle the analog switches 315 to select which of the MEMS microphones 310 should be processed. The audio signals captured by the MEMS microphones 310 are sent to an audio processor 330. In the preferred embodiment, the audio processor 330 is a high-end audio frequency processor, ideally suited for processing the frequency-based audio data captured from the acoustic sensors 200.

The blockage monitoring node 300 contains a communications module 335, which is responsible for communicating the analyzed audio signals and related data to a remote device, such as a central display in the tractor cab. Alternatively, the communications module 335 may transmit the data to an off-board device, such as a tablet computer or similar handheld computing platform. In the preferred embodiment, the communications module 335 is a wireless transceiver, capable of both transmitting and receiving information via a wireless protocol. An alternative embodiment of the communications module 335 is the circuitry required to communicate over a hardwired connection, such as a serial communications bus.

The blockage monitoring node 300 also has a power supply circuit 340, which is used to process and regulate the power coming into the blockage monitoring node 300, and provide it as necessary at the proper voltage level for the functional blocks shown in FIG. 5A. In one embodiment, the blockage monitoring node 300 will receive power from the implement or tractor through a wired connection. In another embodiment, the blockage monitoring node 300 could have its own internal power source, such as a battery pack.

In at least one embodiment, the blockage monitoring node 300 contains a global navigation satellite system (GNSS) receiver 345 to provide information on the location of the blockage monitoring node 300 in three-dimensional space. The GNSS receiver 345 may comprise any appropriate device for receiving signals from geosynchronous satellites and/or ground-based stations. Common examples of deployed, available GNSS systems include the global positioning system (GPS) and the Russian GLONASS system.

The general purpose of the GNSS receiver 345 is to allow the blockage monitoring node 300 to determine its current position at any given moment in time, and, by knowing its current position, to be able to calculate a ground speed (by determining how far the air seeding system has moved between two points in time) and to determine whether the air seeding system has reached the end of the field (which it may determine by detecting a reducing ground speed combined with consecutive changes in position that indicate the vehicle is turning around).

Also, some embodiments of the blockage monitoring node 300 may include the ability to accept inputs other than the audio signals entering the blockage monitoring node 300 through the hose ports 305. For instance, the blockage monitoring node 300 may accept a work switch input 356, which could be a digital switch input indicating that the operator of the air seeder has stopped the flow of seed through the system (perhaps because they have reached the end of the field and are turning around and do not wish to seed in this area). Another potential input the blockage monitoring node 300 may receive is an alternative ground speed input 357 (from a source such as a speed sensor that may already exist on the system). Inputs such as the work switch input 356 and alternative ground speed input 357, as well as additional outputs, may enter and leave the blockage monitoring node 300 through one or more I/O connectors 355. A block of input/output circuitry 350 would control and process the inputs and outputs from the blockage monitoring node 300.

FIG. 5B shows a cutaway view of one embodiment of the connection between the transmitting hose and the microphone mounted inside the blockage monitoring node. The components shown in FIG. 5B are internal to the blockage monitoring node 300. Inside the blockage monitoring node 300, the required electronics are mounted to a printed circuit board, or PCB, 312. A portion of the PCB 312 is shown in FIG. 5B, highlighting the acoustic connections made to the PCB 312.

A MEMS microphone 310 is mounted to the back or bottom side of a PCB 312, positioned so that a resistive membrane 310A built into the MEMS microphone 310 is directly in line with a hole 312A that passes through the thickness of the PCB 312. On the top or front side of the PCB 312 (that is, on the side of the PCB 312 opposite that of the MEMS microphone 310), an acoustic coupler 314 is attached to the PCB 312 with an adhesive 314A. The hollow center of the acoustic coupler 314B is positioned such that it lines up above the hole 312A in the PCB 312. The end of the transmitting hose 230 (the other end of which is attached to the acoustic sensor 200) is placed over top of the acoustic coupler 314. Sounds passing into the acoustic sensor 200 as pressure waves are directed into the transmitting hose 230, travel down the transmitting hose 230 into the acoustic coupler 314, and pass through hole 312A to strike the resistive membrane 310A. The resulting vibrations on the resistive membrane 310A are detected in the MEMS microphone 310 as changes in electrical characteristics, which can be interpreted by other electronics (not shown) mounted on or near the PCB 312.

It should be noted that other types of non-MEMS microphones could be used without changing the inventive concepts of the present invention. MEMS microphones are used for their size, reliability, and uniformity, as described previously. Also, the technology used for the MEMS microphones of the present invention is resistive (in which the amount of resistance in the membrane changes when it is compressed by sound waves), and this technology is inherently immune to the environmental noise present in an air seeding system.

FIG. 5C shows how the blockage monitoring node 300 may be mounted on the air seeding system and interconnected with other system components. As previously discussed, the examples shown in the figures show one possible configuration, and configuration details may change in the implemented system without affecting the invention content. Specifically, the blockage monitoring node 300 shown here offers only four hose ports 305, and only two acoustic sensors are shown connected to the system. Detail on the secondary manifold 142 has been omitted for clarity. In a real system, several additional acoustic sensors 200 would be present (up to twelve per manifold for the example system shown in FIG. 3), and the blockage monitoring node 300 would have a corresponding number of hose ports 305.

The intent of FIG. 5C is to show how the components of the present invention would be utilized on a typical secondary manifold tower 142. In the preferred embodiment, the blockage monitoring node 300 is attached to a rigid vertical section of the primary seed tube 144. As material flows up through the primary seed tube 144, it enters into a secondary manifold 142 and is split into multiple sub-streams. For simplicity, FIG. 5C shows only two such branches from the secondary manifold 142, one going to the left and one going to the right, but in reality these branches would occur in several directions, directed radially out from the center of the secondary manifold 142. The sensor housing 205 attached to each acoustic sensor 200 acts as a connector from the secondary manifold 142 to the secondary seed tubes 162. As the branched flow of material passes through the sensor housings 205, the seeds 121 impact the acoustic sensors 200 before continuing to flow into the secondary seed tubes 162. The sounds thus created by the impacts are directed into the transmitting hoses 230 and travel down into the blockage monitoring node 300, where the sounds are processed to determine the amount of flow traveling into each secondary seed tube 162.

The previous figures have illustrated how the present invention is used to determine the amount of material flow traveling through an air seeding system such as that shown in FIGS. 1 and 2. This is done by using the acoustic sensors detailed in FIGS. 4A and 4B in conjunction with the blockage monitoring nodes detailed in FIGS. 5A and 5C. By thus equipping every secondary seed tube with the sensors and modules described in these figures, a value of material flow, as calculated from the relative audio signal detected within each seed tube, can be calculated for these seed tubes. Additional details on how these material flow values are determined, and how they are used, are provided later in FIGS. 9A through 9E and the corresponding textual description. Once these material flow values are determined, measures can be taken to balance the material flows so that the flow is consistent within every secondary seed tube. Although existing prior art systems offer very little in the way of a means for balancing the material flow within the seed tubes, the present invention differs from the prior art by offering a means for adjusting the flow within each secondary seed tube independently, based upon data derived from the sensors 200. For example, this could be accomplished by providing an adjustable air flow restrictor within each secondary seed tube as a means of balancing the material flow values across the air seeding system.

FIG. 6 shows a perspective view of an air flow restrictor 400 as used in the present invention. The air flow restrictor 400 is comprised of two independent pieces: a toothed insert 405 and an outer adjustment sleeve 410. The toothed insert 405 includes insert threads 420 and a set of fingers 430 arranged in a circular grouping separated by a small gap. The outer adjustment sleeve 410 includes internal threads 422 which mate with the insert threads 420 on the toothed insert and is designed with a tapered end 415. When the outer adjustment sleeve 410 is placed over the toothed insert 405, such that the internal threads 422 just begin to engage the insert threads 420, the air flow restrictor 400 is assembled. When it is assembled, it can be placed in line with the secondary seed tubes 162 such that the material flowing through the secondary seed tubes 162 will also pass through the air flow restrictor 400. The two pieces of the air flow restrictor 400 are designed in such a way that, as the outer adjustment sleeve 410 is rotated, the internal threads 422 engage the insert threads 420 and pull the outer adjustment sleeve 410 further down onto the toothed insert 405. Because the outer adjustment sleeve 410 has a tapered end 415, the movement of the outer adjustment sleeve 410 as it engages the toothed insert 405 causes the internal walls of the tapered end 415 to come in contact with the fingers 430 and constrict them such that they push in toward each other. This squeezing of the fingers 430 causes the movement of air and other material through the center of the air flow restrictor 400 to be reduced. Loosening the outer adjustment sleeve 410 by rotating it in the opposite direction allows the fingers 430 to open back up again, allowing more air to pass through the center of the air flow restrictor 400.

The air flow restrictor 400 has a hollow center that allows air and material to flow through it, allowing it to be placed in-line anywhere in the secondary seed tube 162. An alternative method of introducing the air flow restrictor 400 would be to make it integral to the sensor housing 205 of the acoustic sensor 200 assembly. FIG. 7A shows an alternative embodiment of the acoustic sensor assembly of FIG. 4B where the air flow restrictor 400 is built into the lower half of the sensor housing 205. In this position, the flow of air and material entering the secondary seed tube 162 can be restricted by turning the outer adjustment shell 410 to close down the fingers 430. Note that the outer adjustment shell 410 is shown here with a non-tapered exterior, but the interior of the outer adjustment shell 410 is still tapered, as will be shown in cutaway views in FIGS. 7B and 7C.

FIG. 7B shows the alternative embodiment of the acoustic sensor from FIG. 7A with a cutaway view of the air flow restrictor 400. As viewed through the cutaway portion of FIG. 7B, the outer adjustment shell 410 has inner tapered walls 415A. The numeric designator for the interior tapered walls is 415A, to show the relation to the tapered end 415 of the outer adjustment shell 410 shown in FIG. 6. Both numeric designators, 415 and 415A, refer to the tapered features, but 415 refers to the tapered end in general and 415A refers to the interior tapered walls. The insert threads 420 are integral to or otherwise connected to the sensor housing 205. The fingers 430 are shown through the cutaway just coming into contact with the tapered walls 415A, but they are not yet compressed in this position. Full air and material flow would be allowed in this configuration.

FIG. 7C shows the cutaway view of the air flow restrictor from FIG. 7B, but with the restrictor shell tightened such that the restrictor fingers are squeezed more tightly together. The dashed lines near the bottom of FIG. 7C show the former position of the outer adjustment shell 410 as it appeared in FIG. 7B, before it was tightened down. The small arrow on the diagram near the insert threads 420 shows the direction in which the outer adjustment shell 410 moved. The insert threads 420 are now visible through the cutaway in the outer adjustment shell 410, instead of above it as they were in FIG. 7B. As shown, the fingers 430 are compressed by the tapered walls 415A, and are tightly squeezed together. The resulting configuration of the fingers 430 constricts the air and material flow that can pass through the sensor housing 205 as it passes into the secondary seed tube 162.

The information obtained by the acoustic sensors 200 as processed by the blockage monitoring nodes 300 is communicated to an operator. If a blockage is detected in one or more of the secondary seed tubes 162, then this condition should be displayed to the operator of the air seeding system so that appropriate steps can be taken to clear the condition. In addition, to be able to equalize the output of all of the secondary seed tubes 162, an operator must be able to have access to the output values of all of the seed tubes 162 in order to make corrections. Once these current output values are known, an operator can correct an imbalance in the system by manually adjusting the air flow restrictors 400 on the appropriate secondary seed tubes 162 in order to change the air and material flows in those tubes.

In an alternative embodiment of the present invention, the air flow restrictors 400 might be connected to electric motors or otherwise automatically controlled. In this embodiment, an electronics module (possibly a variation of the blockage monitoring node 300, or a separate module) could be entered into an "automatic balancing" mode. In this mode, the electronics module could read the seed flow rates for all of the secondary tubes 162 on the system, check for imbalances, and then drive the electric motors (or other automatic means) to adjust the air flow restrictors 400 automatically, without manual intervention. This would enable automatic adjustment of a system every time an operator pulls the air seeding system into a new field or changes crops.

FIG. 8 illustrates how the blockage monitoring nodes 300 are capable of communicating wirelessly with a handheld computing device 500. FIG. 8 also shows how the primary inventive components of the present invention might be mounted in one embodiment of the invention. The acoustic sensors 200 are between the secondary manifold 142 and the secondary seed tubes 162. The air flow restrictors 400 are show in-line with the acoustic sensors 200 and secondary seed tubes 162. One or more blockage monitoring nodes 300 are mounted on the vertical portion of the primary seed tube leading up into the secondary manifold 142. As previously described, FIG. 8 illustrates one possible configuration of the inventive components of the present invention, and is not meant to be limiting in any way. There may be alternative configurations of an air seeding system that would require a different configuration of the acoustic sensors 200, air flow restrictors 400, and blockage monitoring nodes 300.

The handheld computing device 500 may be used as both a system display and control device. In one embodiment, the handheld computing device 500 is a commercially available computing platform such as a version of the iPad computing device available from Apple, Inc., or any similar commercial computing platform. In an alternative embodiment, the handheld computing device 500 is a custom-designed handheld computing platform, which can be specifically designed for use with the present invention.

The handheld computing device 500 can receive and transmit wireless messages 10 with the blockage monitoring nodes 300. In one operating scenario, one or more of the blockage monitoring nodes 300 detects a drop in sound level from one or more of the acoustic sensors 200 to which it is connected. This information is transmitted to the handheld computing device 500 in the form of wireless messages 10. The handheld computing device 500 receives the wireless messages 10, processes the information contained within them, and determines what to display on the handheld computing device 500.

In the preferred embodiment, the algorithms that determine how to interpret the data transmitted by the blockage monitoring nodes 300 are located on the handheld computing device 500. By locating the algorithms inside the handheld computing device 500, the blockage monitoring nodes 300 may have less powerful, inexpensive processors, reducing the overall system cost. In an alternative embodiment, the algorithms for determining if there is a blockage are located within each blockage monitoring node 300, instead of in the handheld computing device 500. In this alternative embodiment, the handheld computing device 500 effectively becomes a sort of "dumb display", and is only used to display the results calculated by the blockage monitoring nodes 300. Although, in the preferred embodiment, the handheld computing device 500 does the majority of the processing, it may be desirable to have the blockage monitoring nodes 300 communicate with an existing "dumb display" on the tractor, instead of to the handheld computing device 500. In these cases, the blockage monitoring nodes 300 may need to do all of the processing, and send display directives to a non-processing (dumb) display, instead of allowing a handheld computing device 500 to do the processing.

For the purposes of this discussion, a "dumb display" or "non-processing display" shall be defined as a display with very limited processing power, which must be commanded what it should display through messages sent to it by a separate electronics module. Many modern tractor manufacturers provide such non-processing dumb displays for their tractors, as the displays must be capable of receiving and displaying information from different implements (hay balers, air seeders, spray equipment, etc.) from various manufacturers. Instead of trying to create a single display type that contains all of the processing power and algorithms needed for all of the various types of implements, the tractor manufacturers instead often provide a single "dumb display" which simply displays the information it receives from a separate module mounted on the implement.

Figure 10B:
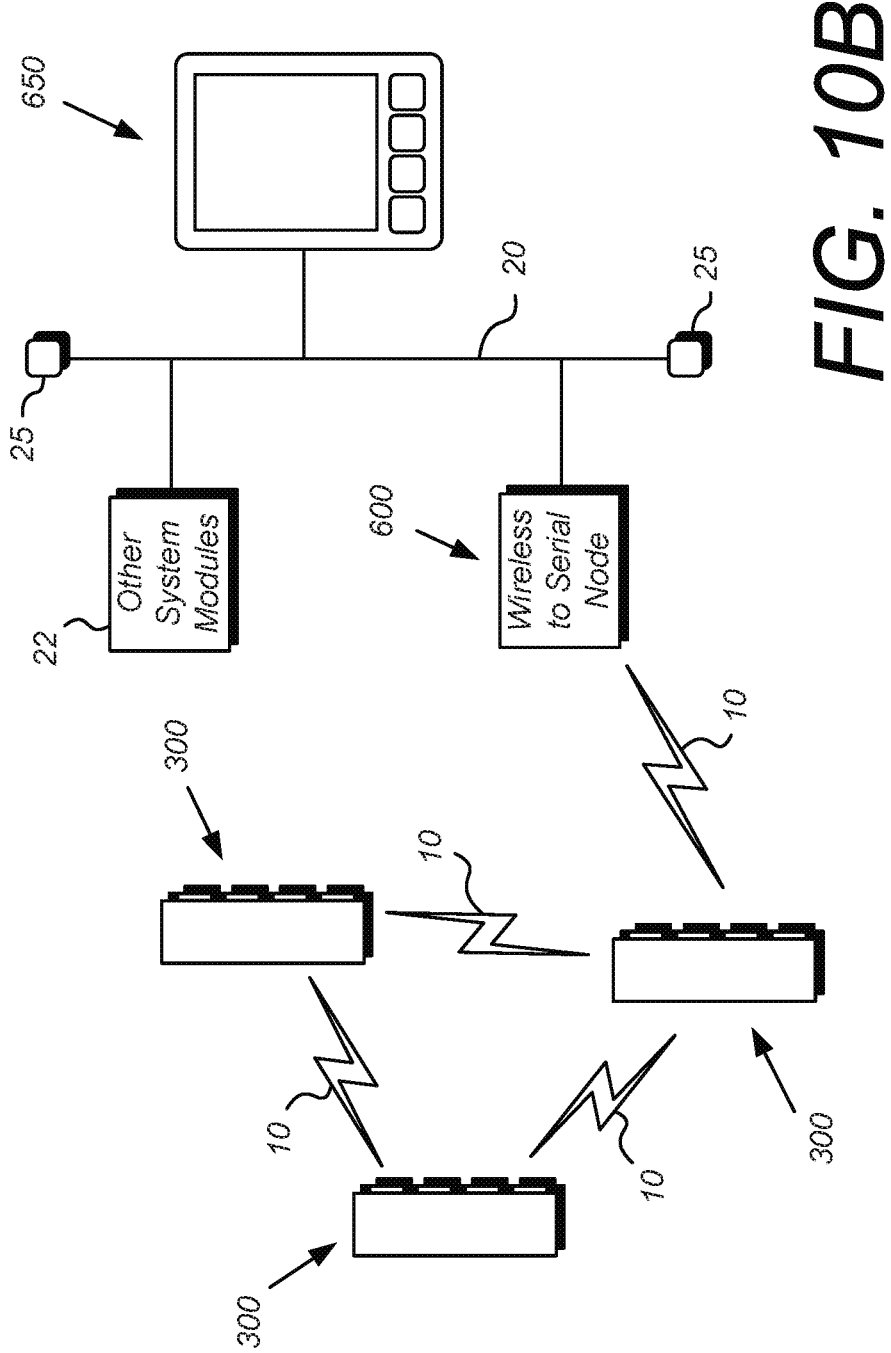

In this way, the "intelligence" is encapsulated in the electronics on the implement, and a single dumb display type will work with many different kinds of implements. In order to communicate with a single display type, all of the implements must send messages in a standardized format to the display in the tractor. One example of such a non-processing display is the GreenStar display found on tractors manufactured by the John Deere Company of Moline, Ill. The GreenStar display is an ISOBUS virtual terminal, where "ISOBUS" refers to a standardized open communications network technology for connecting electronic devices on agricultural equipment, and "virtual terminal" refers to a display which follows the ISOBUS standard. An ISOBUS virtual terminal accepts messages from implements using the industry-standard ISO 11873 communications protocol. Any implement that can send the proper commands using this communications protocol is capable of displaying information on the GreenStar display. Many other types of ISOBUS virtual terminals are available. FIG. 10B provides additional information on how the present invention might communicate to an existing non-processing display, such as an ISOBUS virtual terminal.

Referring now to FIGS. 9A through 9E, several examples of user interface pages will be described. The pages shown in these figures are intended to be examples only and not limiting in any way, and are representative of any number of similar pages that could be created for the application. For the purposes of this discussion, these user interface screens will be shown as they might appear being displayed on a handheld computing device 500. It should be noted, however, that similar screens could be displayed on any type of displaying device, including an ISOBUS virtual terminal as previously described and as illustrated in FIG. 10B.

Figure 9A:
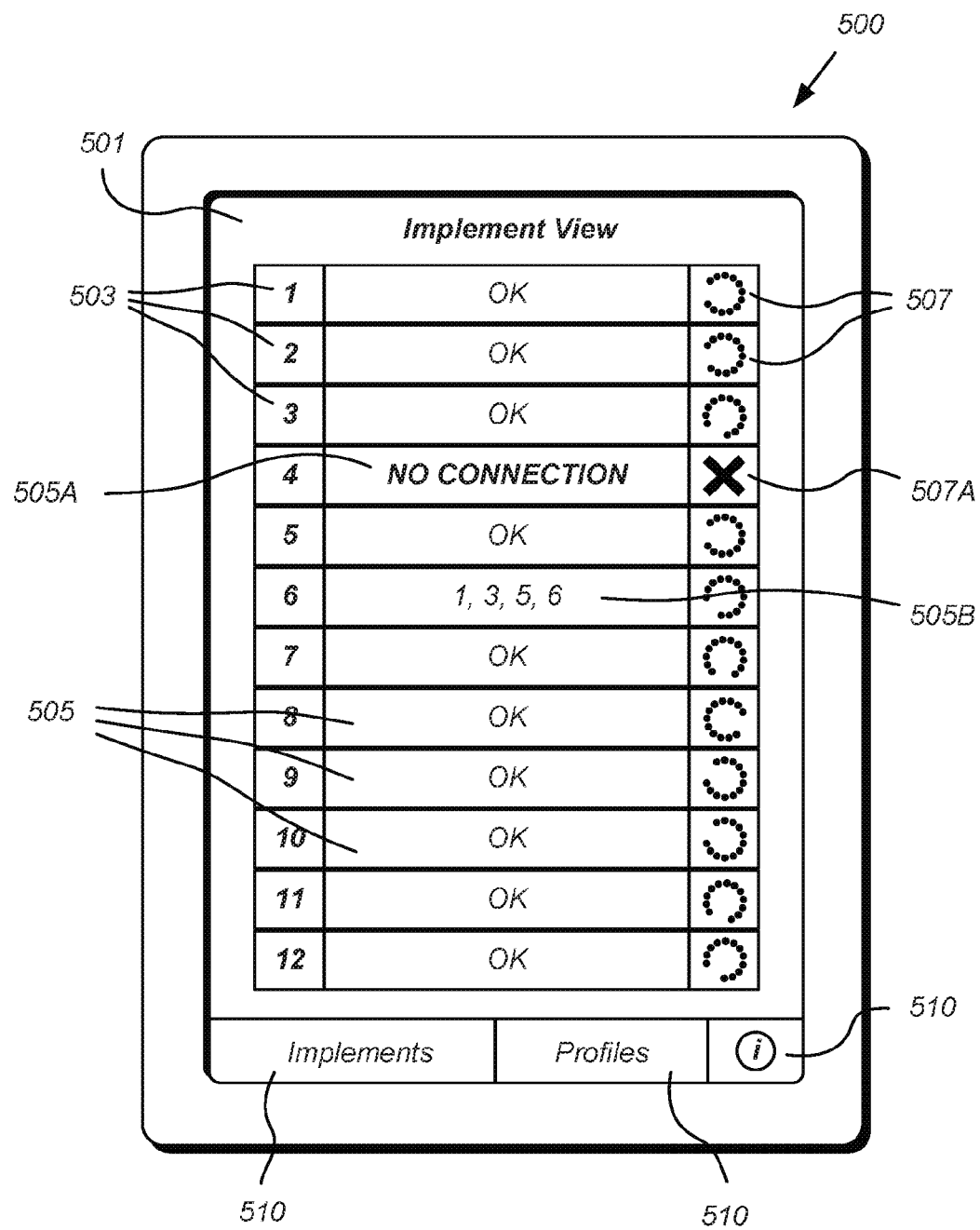
FIGS. 9A through 9E show various examples of user interface screens that might be used on the handheld computing device to configure and operate the system.

FIG. 9A shows one embodiment of a default information screen showing status information on the air seeding system. A display screen 501 displays information on the handheld computing device 500. In the preferred embodiment, the display screen 501 has a touch-sensitive interface (a touch screen), allowing the operator to interact with the device to bring up different displays, or to send commands to the blockage monitoring nodes 300, via the handheld computing device 500.

In the screen illustrated in FIG. 9A, a summary view of the entire air seeder implement is shown. In this view, numeric designators 503 refer to the number of a specific secondary manifold 142 on the seeder. FIG. 9A shows 12 separate numeric designators 503, showing that the air seeder implement now connected to the machine has 12 separate secondary manifolds 142. Next to each numeric designator 503 is a manifold status 505. In this embodiment, a manifold status 505 of "OK" indicates that the manifold in question is operating correctly (no blockages). A manifold status 505 other than "OK" will appear next to secondary manifolds 142 which have one or more problems. For example, as shown in FIG. 9A, a manifold status 505A stating "NO CONNECTION" is shown next to the entry for manifold 4, and manifold status 505B showing the numbers "1, 3, 5, 6" next to the entry for manifold 6.

A connection icon 507 appears to the right of each manifold status 505 (including statuses 505A and 505B). The connection icon 507 may be an animated icon such as a spinning disk or any appropriate symbol when the wireless connection to the blockage monitoring nodes 300 on the corresponding secondary manifold 142 is working properly. An alternative form of the connection icon 507A is used to indicate a malfunctioning or non-existent wireless connection between the handheld computing device 500 and the corresponding secondary manifold 142. In the embodiment shown in FIG. 9A, an "X" is used for the alternative connection icon 507A to indicate a bad connection. The manifold status 505A of "NO CONNECTION" is shown as an additional indication that the wireless connection is faulty. As previously indicated, the status labels, specific graphics, and the number and arrangement of onscreen components is intended to be an example only, and not meant to be limiting in any way.

The manifold status 505B showing the numbers "1, 3, 5, 6", as shown in FIG. 9A, is used to indicate that the corresponding secondary manifold 142 is detecting partial or full blockages on the first, third, fifth, and sixth secondary seed tubes 162 on that manifold. The fault condition shown in this FIG. 9A would likely have been caused by a detected and significant decrease in the amount of noise received from the acoustic sensors 200 associated with the secondary seed tubes 162 numbered 1, 3, 5, and 6 on the secondary manifold 142 numbered 6.

Each user interface screen, such as the one shown on the display screen 501 in FIG. 9A, will also likely contain one or more navigation controls 510. In FIG. 9A, the navigation controls 510 are displayed along the bottom of the display screen 501, and include buttons for moving to additional user interface screens (shown here with labels "Implements" and "Profiles") and a Help button (shown here as a circle with a lowercase "i" inside it).

Figure 9B:
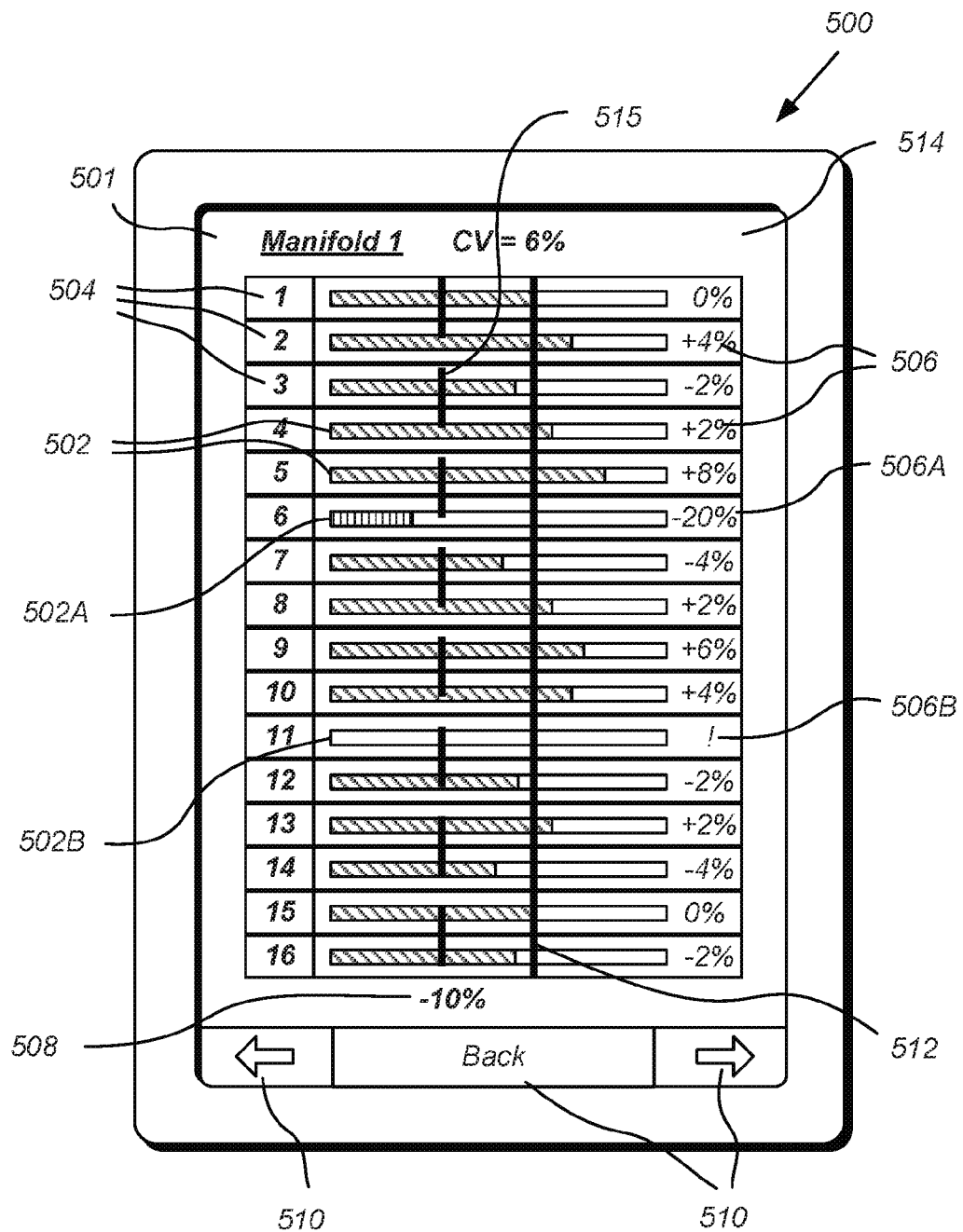

FIG. 9B shows one embodiment of a manifold information page. While FIG. 9A presented summary information showing the status of all of the secondary manifolds 142 on an air seeding system, FIG. 9B show the relative flow rates for each of the secondary seed tubes 162 connected to a single secondary manifold 142. This page, or one like it, may be displayed after an operator touches one of the manifold statuses 505 shown on FIG. 9A. For example, if the operator were to touch the top manifold status 505 on the display screen 501 illustrated in FIG. 9A (manifold number 1), the screen illustrated in FIG. 9B would appear.

In this embodiment, the manifold information page of FIG. 9B displays the current coefficient of variance (CV) numbers for each secondary seed tube 162 on Manifold 1 as a bar graph 502. The bar graphs 502 are created and displayed on the display screen 501 such that the exact middle point of each bar graph 502 represents the average flow rate across all of the secondary seed tubes 162 on this secondary manifold 142. The far left side of each bar graph 502 represents 0% flow rate. The far right side of each bar graph 502 represents twice the average flow rate. Each bar graph 502 is preceded by a numeric designator 504 indicating the number of the corresponding secondary seed tube 162. The CV numbers 506 displayed to the right of the bar graphs 502 represent the percentage that a secondary seed tube 162 is either above or below the average. For example, secondary seed tube number 2 (the second bar graph 502 from the top of the display screen 501) shows that its current CV is +4%, meaning that the flow rate in that secondary seed tube 162 is 4% greater than the average of all the secondary seed tubes 162 on this secondary manifold 142. Secondary seed tube number 14, near the bottom of the display screen 501, is 4% below the average (shown as −4%). The overall average flow rate 514 across all secondary seed tubes 162 for the displayed manifold 142 is shown at the top of the page.

A center line 512 (FIG. 9B) is displayed as a visual reference and represents 0% CV (it represents the average flow rate). A dashed line 515 is used to show the point to which a bar graph 502 must drop before the system will indicate a blockage or partial blockage has occurred. An alarm percentage 508 is displayed beneath the dashed line 515, showing the actual percentage drop that will trigger a blockage alarm. The alarm percentage 508 shown in this example is −10%, indicating that an alarm will be triggered when one or more of the bar graphs 502 falls at least 10% below the average flow rate. In a preferred embodiment, this alarm percentage 508 and the relative position of the dashed line 515 are user adjustable, allowing the operator to pick a different alarm percentage 508.

When an alarm condition occurs, the graphics shown on the bar graphs 502 may change as an indication of the condition. Bar graph 502A (shown corresponding to secondary seed tube 6 in FIG. 9B) has dropped below the dashed line 514 and is thus shown as a different color than the other bar graphs 502. The corresponding CV value 506A shows −20%, a significant drop from the average flow rate. Bar graph 502B has dropped to 0%, indicating either a total blockage condition (no seed flow) or an error in receiving data from the corresponding secondary seed tube 162 or blockage monitoring node 300. The CV value 506B is shown as an exclamation point, in this example, to indicate a serious condition exists.

Navigation controls 510 are provided for this page, as well. In this example, left and right arrows are provided to move from one manifold display to the next, and a "Back" button is provided to return the operator to the screen that was previously displayed. The navigation controls 510 shown here are intended to be representative of any type of virtual user control that allows the operator to navigate through the screens.

Figure 9C:
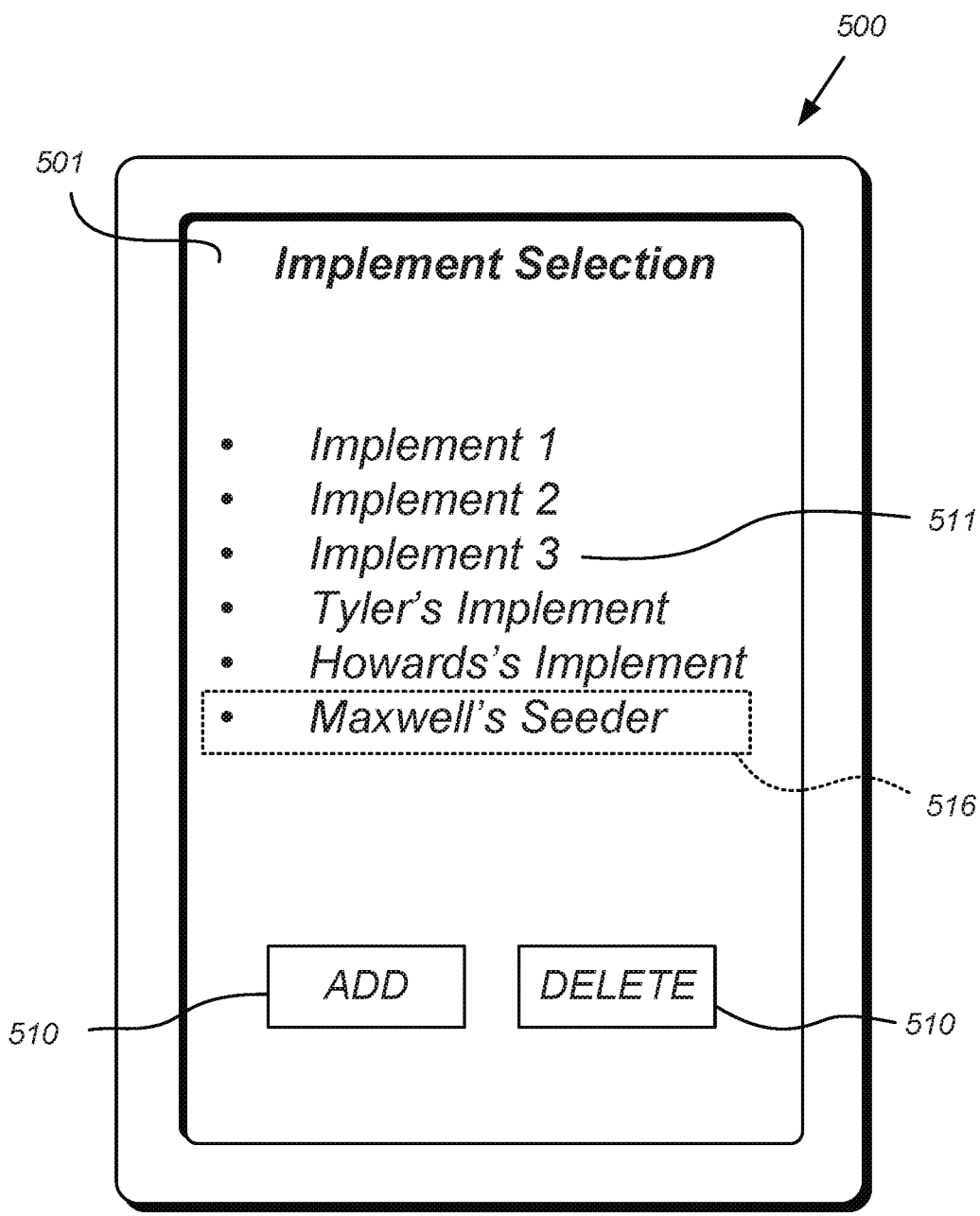

FIG. 9C shows one embodiment of an implement selection page. For the purposes of this discussion, an "implement" is any piece of agricultural machinery that can be attached to and pulled from a tractor (such as an air seeder or air cart). This page might be displayed when the handheld computing device 500 is first turned on, or when the software application for the air seeding system is first executed. An implement list 511 will appear on this page, showing a list of all of the implements that are currently in wireless communications range with the handheld computing device 500. If no implements are within communications range, the implement list 511 might display "No implements in range" or a similar informational message. If only one implement is in range, this implement selection page may not appear, as there are no choices to be made (the solitary implement will be the one chosen by default). When the implement list 511 has two or more selections to choose from, a selection indicator 516 will appear on the display screen 501, indicating which implement is currently selected. The operator can touch a different implement on the implement list 511 with a finger or stylus, and the selection indicator 516 will then appear around the selected implement. Navigation controls 510 are provided for additional functionality on this page. These may include an ADD and DELETE button, such as those shown in FIG. 9C, to allow the operator to define a new implement, or to remove an existing implement from the implement list 511.

Figure 9D:
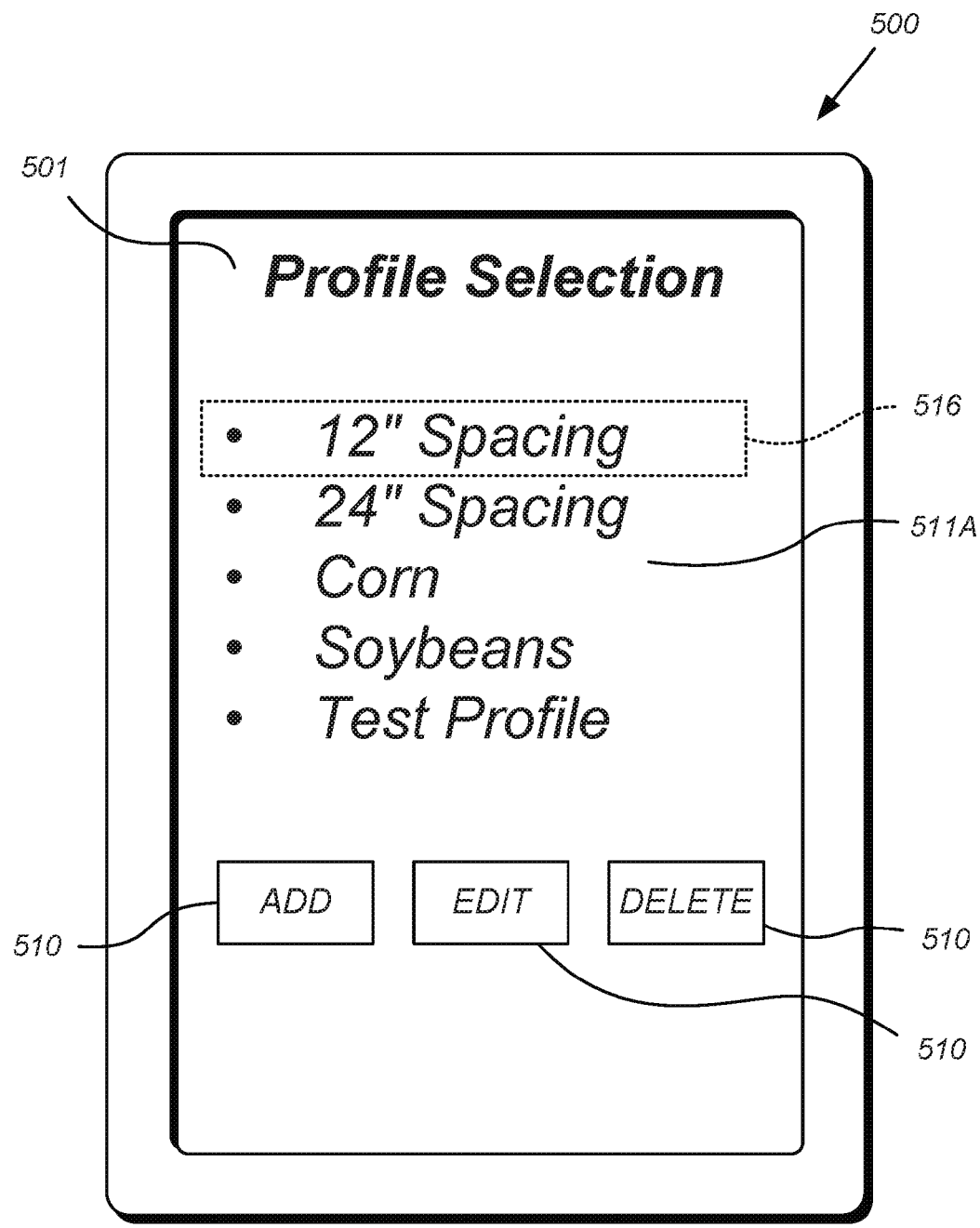

FIG. 9D shows one embodiment of a profile selection page. For the purposes of this discussion, a "profile" is defined as a specific pattern of secondary seed tubes 162. Defined profiles are sometimes required because different kinds of crops may require different row-to-row spacing when being planted. If the openers 148 (from FIG. 1 or 2) which dig the furrows in the soil are spaced on the air seeding system 12 inches apart, but a crop is known to grow better using a 24-inch spacing, then the operator of the air seeding system can disable every other row on the air seeder. This is typically done by blocking the entry of every other secondary seed tube 162 inside of the secondary manifold 142, so that only half of the seed tubes 162 will have air and seed flow. However, since all of the seed tubes 162, even the blocked ones, will have an acoustic sensor 200 installed, the system needs a means of detecting which of the secondary seed tubes 162 have been blocked, and which acoustic sensors 200 should be ignored, so that a false alarm is not triggered. Additional detail on how a specific profile is created will be shown on FIG. 9E.

The display screen 501 of the profile selection screen shown in FIG. 9D has a profile list 511A, listing all of the profiles that have been defined by the operator. A selection indicator 516 is used to indicate which profile is currently selected. The operator can choose a different profile by touching the profile name from the profile list 511A. Example navigation controls 510 allow the operator to add, delete, or edit profiles.

Figure 9E:
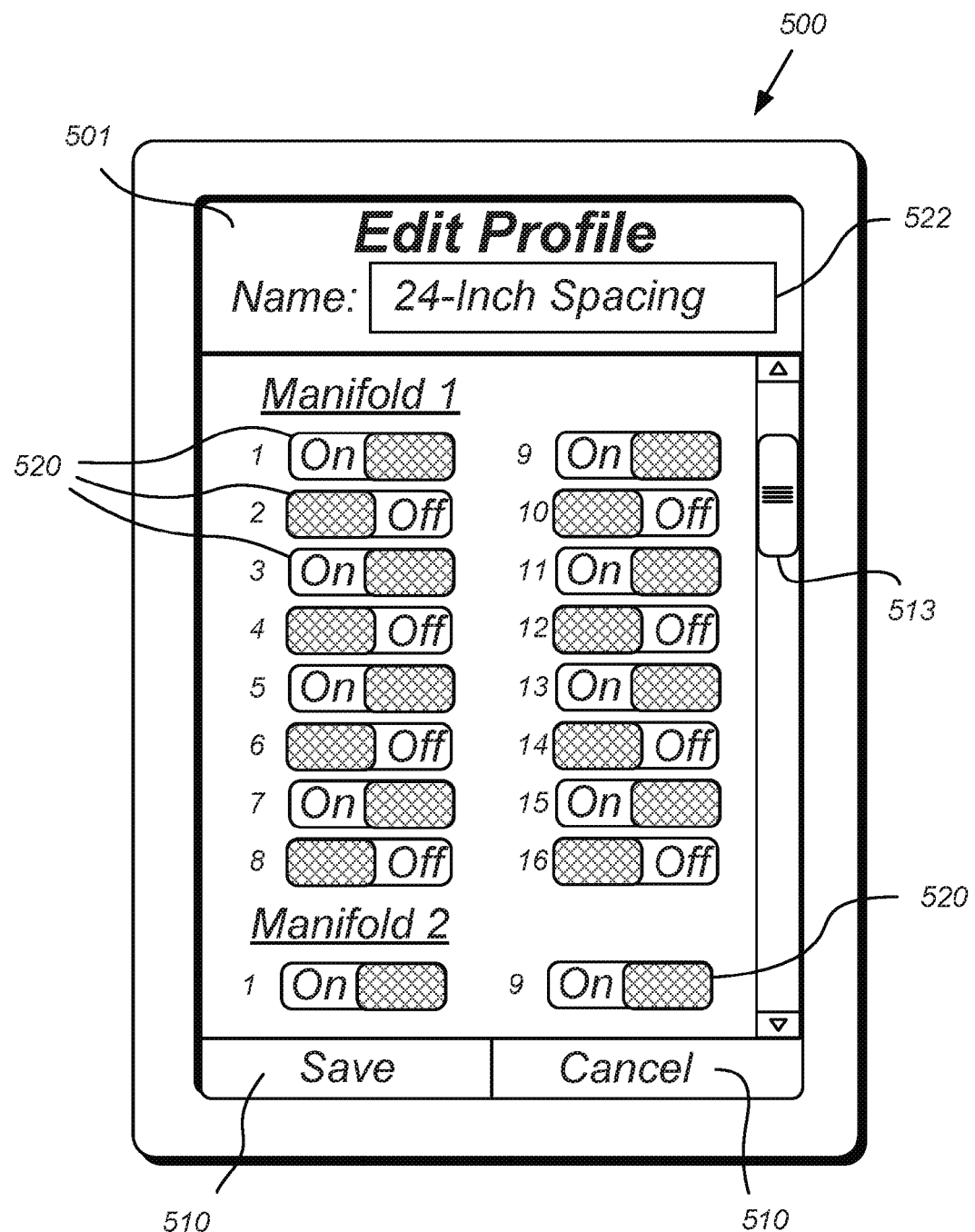

FIG. 9E shows an embodiment of an edit profile page, which can be used to create a new profile or to edit an existing one. At the top of the display screen 501, there is a profile name box 522, displaying the name of the profile currently being edited. In this example, the current profile is called "24-Inch Spacing". Below the profile name box 522, a series of virtual on/off switches 520 are displayed, one for each secondary seed tube 162 in the corresponding secondary manifold 142. By touching one of the on/off switches 520 with a finger or stylus, the operator can toggle the status of that switch. If a specific on/off switch 520 is shown to be "ON", that means that, for this profile, the secondary seed tube 162 corresponding to that on/off switch should be considered. If the on/off switch 520 is shown to be "OFF", the corresponding seed tube 162 is assumed to be blocked off and the data from the acoustic sensor 200 associated with that secondary seed tube 162 will be ignored when determining if there is an alarm condition.

As a profile may contain switch definitions for multiple manifolds, a slider bar 512 or similar control is provided to move the display up or down (to make other manifold switch sets visible). Example navigation controls 510 may include buttons to save an edited profile, or cancel editing mode and return to the previous screen.

The example pages shown in FIGS. 9A through 9E are intended to be representative of the types of operations that could be done using the handheld computing device 500. They should not be considered complete, and a person skilled in the art should realize that any number of display and control pages could be created. The fundamental concept presented herein is that a wireless display (the handheld computing device 500) can be used as a user interface and display for the air seeding system of the present invention.

Other types of display pages could include, but are certainly not limited to, the following types:

- A grouping page, which allows subsets of secondary manifolds from a single implement to be grouped together based on the type of material flowing into them. This may be needed in the case when two or more hoppers 126 (from FIGS. 1 and 2) are used on an air seeding system, with each containing different materials (for example, one containing seed and the other containing fertilizer).
- A documentation page, allowing an operator to display user's manuals or other documents.
- An "about" page, showing firmware and hardware revision numbers for each blockage monitoring node 300 on the seeder, and software revision numbers for the application running on the handheld computing device 500.
- A built-in-test (BIT) page, allowing an operator to initiate and see the results of system tests.
- A log page, displaying the text of log files created by the system software, perhaps showing the occurrence and location of blockage events or sensor/electronics errors.

It should be noted that, in one embodiment of the present invention, much of the configuration system described in FIGS. 9A through 9E may be stored in the blockage monitoring nodes 300 instead of or in addition to storing this information in the handheld computing device 500. By storing configuration information such as profile definitions in the blockage monitoring nodes 300, it becomes possible to swap out one handheld computing device 500 for another, allowing multiple handheld computing devices 500 to be used with the system without requiring a complete re-configuring of the system and redefinition of profiles. Since the blockage monitoring nodes 300 are meant to be mounted directly to the implement, the configuration information can be stored here, with the implement for which it is defined, instead of solely on the handheld computing device 500.

Figure 10C:
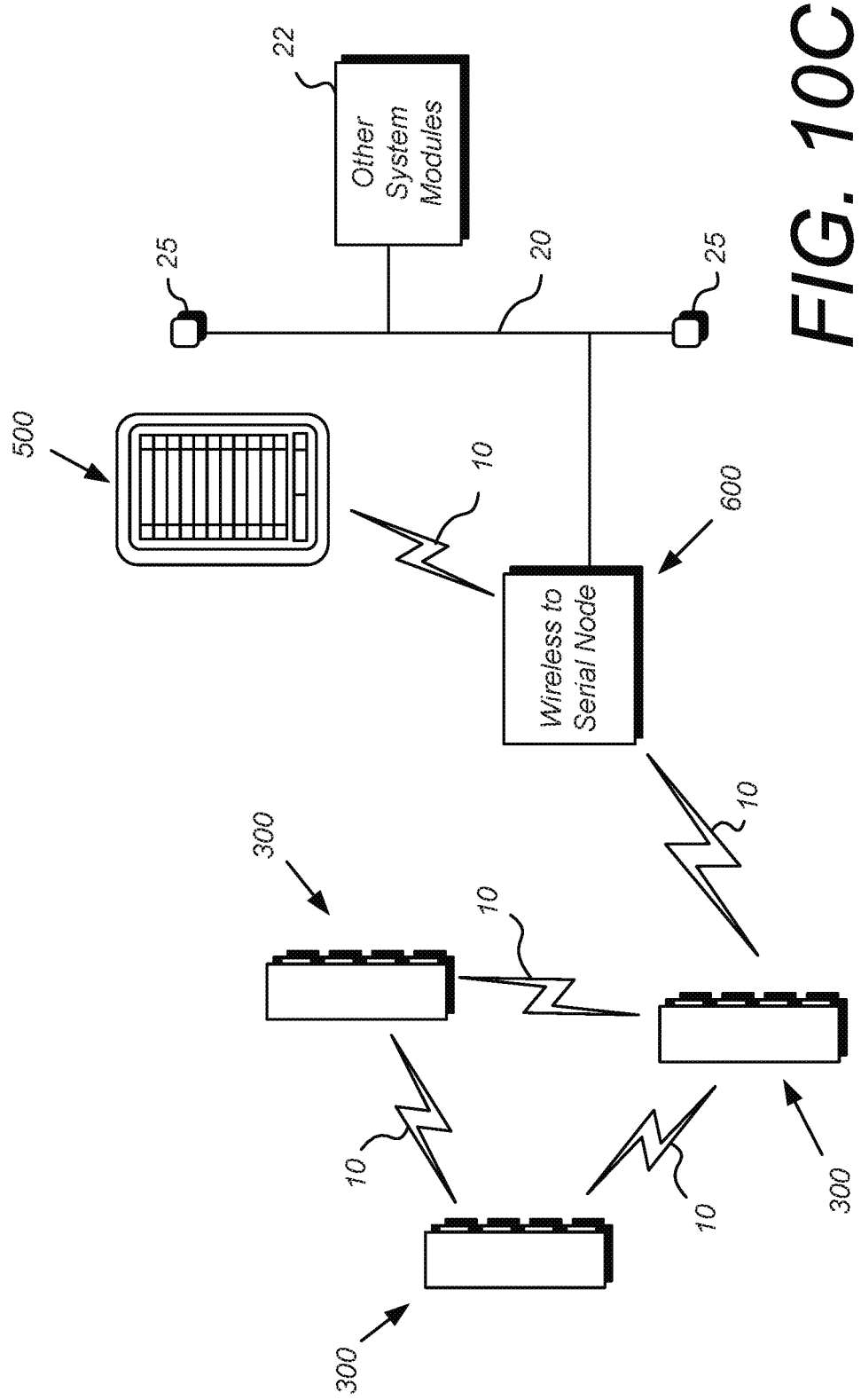

FIGS. 10A, 10B, and 10C illustrate how the blockage monitoring nodes of the present invention can communicate wirelessly with each other, as well as with a remote information display. FIG. 10A shows a set of blockage monitoring nodes 300 (shown here removed from the air seeding system, which is assumed to exist) communicating wirelessly 10 with each other and with a handheld computing device 500. As previously discussed, in the preferred embodiment, the majority of the processing required by the system (such as determining if there are blockages or alarm-triggering events) would be done by the handheld computing device 500. The blockage monitoring nodes 300 would simply capture the audio data from the acoustic sensors 200, convert the data into wireless messages 10, and transmit the messages to the handheld computing device 500 for processing and eventual display.

FIG. 10B illustrates an alternative embodiment of the present invention, in which the handheld computing device 500 is replaced by a tractor-mounted, hard-wired or wireless tractor display 650. As previously discussed, the tractor display 650 may be an ISOBUS virtual terminal (a non-processing or "dumb" display) or similar display which is designed to accept display directives from an electronics module on the implement. These virtual terminal displays receive the display directives from other system modules 22 over an industry standard, hardwired communications bus 20 following the ISO 11873 communications protocol. The other system modules 22 may be any number of separate electronic modules connected to the communications bus 20, and may include items such as transmission controllers, engine controllers, implement controllers, or any other appropriate electronic modules configured to send and receive messages using the ISO 11873 communications protocol.

In an embodiment using a tractor display 650 connected to a communications bus 20, a wireless-to-serial node 600 must be introduced to intercept the wireless communications 10 transmitted by the blockage monitoring nodes 300, and convert them to ISO 11873 messages for transmission over the communications bus 20. This added component, the wireless-to-serial node 600, allows the present invention to work with existing tractor displays 650. Also shown on FIG. 10B are bus terminators 25, which are required by some communications physical layer implementations.

FIG. 10C illustrates yet another embodiment of the present invention for use in an air seeding or similar system that uses the ISO 11873 communications protocol. Similar to the embodiment in FIG. 10B, this embodiment has a wireless-to-serial node 600 connected to a communications bus 20, and in communications with one or more other system modules 22. In this embodiment, however, the hardwired tractor display 650 has been replaced with a handheld computing device 500. In this embodiment, the handheld computing device 500 communicates wirelessly at 10 to the wireless-to-serial node 600, and can thus retrieve ISO 11873 messages from the communications bus 20. A ISOBUS virtual terminal emulator (a software program, and thus not shown here) can be executing on the handheld computing device 500, allowing the handheld computing device 500 to be used in place of the tractor display 650.

The embodiment shown in FIG. 10C is a significant advance in the art, because a typical tractor display 650, such as an ISOBUS virtual terminal supplied by an original equipment manufacturer (such as John Deere, CASE IH, etc.), is very expensive and may be several thousand dollars. If the same functionality can be supplied by an off-the-shelf handheld computing device 500 for a few hundred dollars, this is a significant benefit to the operator. The handheld computing device 500 may also be taken off of the tractor and used for other purposes, further reducing the system cost.

In the alternative embodiments shown in FIGS. 10A, 10B, and 10C, the wireless communication link 10 could be replaced with direct-wired communication links, but this would add additional system costs and decrease the system reliability (additional wiring provides additional failure points in the system). Also, although the ISO 11873 communications standard is described above in some detail, any similar protocol or messaging scheme can be supported using the same invention.

The other system modules 22 can include an electronic equipment control module connected to the dynamic equipment and configured for controlling and monitoring one or more equipment functions. The electronic equipment control module can be connected to the wireless to serial node 600 via the communications bus 20 (FIG. 10 C).

Figure 11:
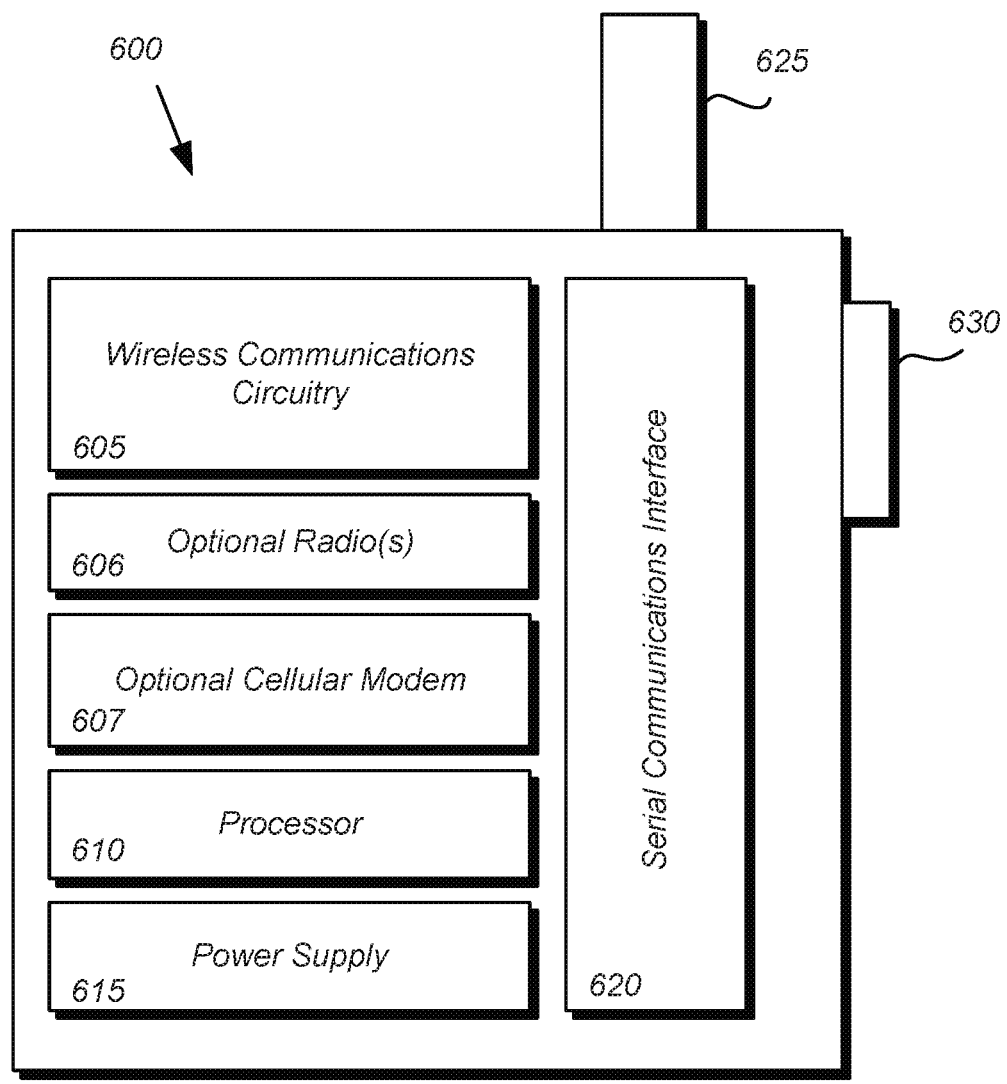
FIG. 11 shows a functional block diagram of the wireless-to-serial node shown in FIGS. 10B and 10C.

FIG. 11 shows a functional block diagram of the wireless-to-serial node introduced in FIG. 10B. In one embodiment, the wireless-to-serial node 600 includes wireless communications circuitry 605 to exchange wireless information with the blockage monitoring nodes 300. Optionally, the wireless-to-serial node 600 may contain optional radio devices 606 or an optional cellular modem 607, for communicating with other systems either on the air seeding system or external to it. The cellular modem 607 may be one adhering to the CDMA, GSM, or any other appropriate cellular communications protocol.

A processor 610 controls the operations of the wireless-to-serial node 600, and contains instructions for processing the information received from the wireless communications circuitry 605, or optional radios 606 or cellular modem 607, and sends it to the serial communications interface 620, which packages the data received wirelessly into messages based on the particular serial communications protocol employed by the system. A connector 630 provides a connection point for the communications bus 20. An antenna 625 is provided to allow the wireless-to-serial node 600 to receive and transmit information wirelessly. The wireless-to-serial node 600 includes a power supply circuit 615 to regulate incoming power and convert it to the levels required for the circuitry within the node. Power may be supplied from the vehicle or implement (routed through the connector 630), or may come from an optional internal power source such as a battery pack.

Figure 12A:
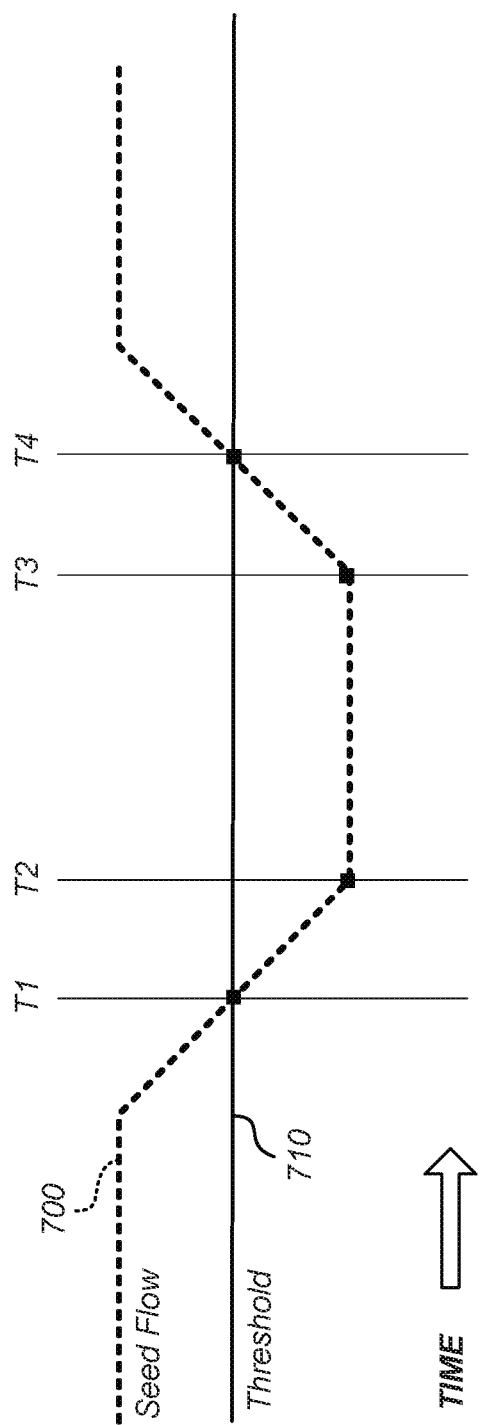

The remaining figures illustrate some of the operational aspects of the present invention. FIGS. 12A and 12B illustrate one embodiment of an algorithm for determining when an air seeding system using the present invention is stopping or turning around at the end of a field, allowing the blockage alarms to be disabled to prevent false alarms. During normal operation, the acoustic sensors 200 will determine the relative amount of seed flowing through the secondary seed tubes 162 based on the sound level present in the tubes. If one or more of the acoustic sensors 200 detects a sudden drop in sound level, the blockage monitoring node 300 will determine that the corresponding seed tube 162 has a partial or full blockage and will indicate an alarm condition (in at least one embodiment, the determination of whether there is an alarm condition may actually take place in the handheld computing device 500, based on information it receives from the blockage monitoring node 300).

However, when the air seeder reaches the end of the field, the operator typically lifts the implement (the components of the air seeding system that are in contact with the ground, such as the openers 148), turns off the flow of seed, and begins to turn around to make the next pass down the field. Since the flow of seed is stopped during the turn, the acoustic sensors 200 will detect a drop in sound level which may in turn be falsely interpreted by the system as a blockage. To prevent false alarms in this manner, some means for detecting when the implement has been lifted must be provided, such that the system can tell the difference between a blockage and the operator turning off the air flow through the system.

One means of doing this is to provide a work switch input 356 to the blockage monitoring node 300, such as that shown in FIG. 5A. In one embodiment, this work switch input 356 is a digital input that is high when the implement is lowered and seed flow is enabled, and low when the implement is lifted and seed flow is turned off. The blockage monitoring node 300 reads the current state of the work switch input 356 and enables or disables the alarms accordingly. As previously discussed, in certain embodiments of the present invention, the blockage monitoring node 300 may simply pass the state of the work switch input 356, along with the data detected from the acoustic sensors 200, to the handheld computing device 500, and it is actually the handheld computing device 500 that determines whether or not an alarm should be sounded.

In some air seeding systems, however, there may not be a work switch input 356, or the work switch input 356 may be malfunctioning. In these circumstances, it is possible to detect the conditions normally associated with seed flow being disabled by using information already present in the system of the present invention. FIG. 12A graphically depicts what happens to the seed flow during a typical work stoppage, and FIG. 12B outlines an algorithm for determining if alarms should be disabled or enabled when a work stoppage is detected.

FIG. 12A shows the relative seed flow 700 in an air seeding system as it changes over time. As shown in FIG. 12A, a user-defined threshold 710 indicates the level at which the seed flow 700 will trigger an alarm, if it drops below threshold 710 for a pre-determined period of time. Four key times are marked as times T1 through T4.

T1 indicates the time when the seed flow 700 first drops below the threshold 710. This time is reached when the seed flow 700 begins to drop off (due to either a blockage or a work stoppage).

T2 indicates the time when the seed flow 700 stops dropping and reaches a steady state below the threshold 710. This might occur, for instance, during a work stoppage, when the seed flow 700 has completely stopped (remains steady at zero flow for a period of time).

T3 indicates the time when the seed flow 700 begins to rise again. This may occur after a work stoppage when the seed flow 700 is resumed. Since seed flow 700 will not jump immediately back to its former "full-flow" level, the seed flow 700 takes some time to climb back above the threshold 710.

T4 indicates the time when the seed flow 700 climbs back above the threshold 710, presumably after a work stoppage has ended and seed flow 700 begins to return to the previous level.

By defining acceptable durations between these key timing events (T1 through T4), the system can be configured so that it can detect the difference between a blockage and a normal end of field work stoppage. For example, if the time between T1 (when the seed flow 700 first falls below the threshold 710) and T2 (when seed flow 700 reaches steady state) takes too long (that is, it exceeds a pre-defined timer), an alarm may be sounded. However, if T2 (steady state) is reached before the pre-defined timer expires, the alarm is disabled, meaning that steady state has been achieved and seed flow is considered off.

FIG. 12B is a block of pseudo-code detailing one embodiment of an algorithm used for determining if alarms should be enabled or disabled for a scenario such as that shown in FIG. 12A. The times T1 through T3 from FIG. 12A are used in this algorithm.

Section or step 720 of FIG. 12B defines the variables used in the algorithm. Most of the variables are "flags" which are Boolean-type variables (set to either "true" or "false"), indicating the presence or absence of a certain condition. For instance, if the FLOW_RISING flag is true, that is an indication that the seed flow 700 is currently increasing.

Section 725 indicates what happens when the seed flow 700 is below the threshold and currently falling, but the VISUAL_ALARM flag is false. In this case, the visual alarm flag is set to true and the ALARM_TIMER is reset to 0. Section 725 will only occur when the seed flow 700 first drops below the threshold.

Sections 730, 735, and 740 are all only executed when the VISUAL_ALARM flag is already true, when the seed flow 700 is below the threshold 710. Section 730 checks to see how long the seed flow 700 has been falling, and if it has been falling longer than the pre-defined ALARM_TIMEOUT period, the audible alarm is sounded (AUDIBLE_ALARM set to true).

Section 735 checks to see if the seed flow 700 has been in a steady state for too long (exceeding the ALARM_TIMEOUT). If the ALARM_TIMEOUT is exceeded, the audible alarm is also sounded in this case.

Section 740 checks to see if the seed flow 700 has been rising for too long. If the ALARM_TIMEOUT period is exceeded, the audible alarm is sounded.

Finally, Section 745 resets the ALARM_TIMEOUT, AUDIBLE_ALARM and VISUAL_ALARM flags once the seed flow 700 is no longer below the threshold 710.

It should be noted that the algorithm outlined in FIG. 12B is an example only and is not intended to represent an optimized algorithm or to limit the implementation of the algorithm in any way. One skilled in the art understands that changes can be made to the algorithm shown without deviating from the general idea of the algorithm. For example, instead of a single ALARM_TIMEOUT variable, the algorithm may use up to three separate alarm timeout variables, one each for the scenarios covered in Sections 730, 735, and 740 of FIG. 12B. Other changes are also possible.

Figure 13A:
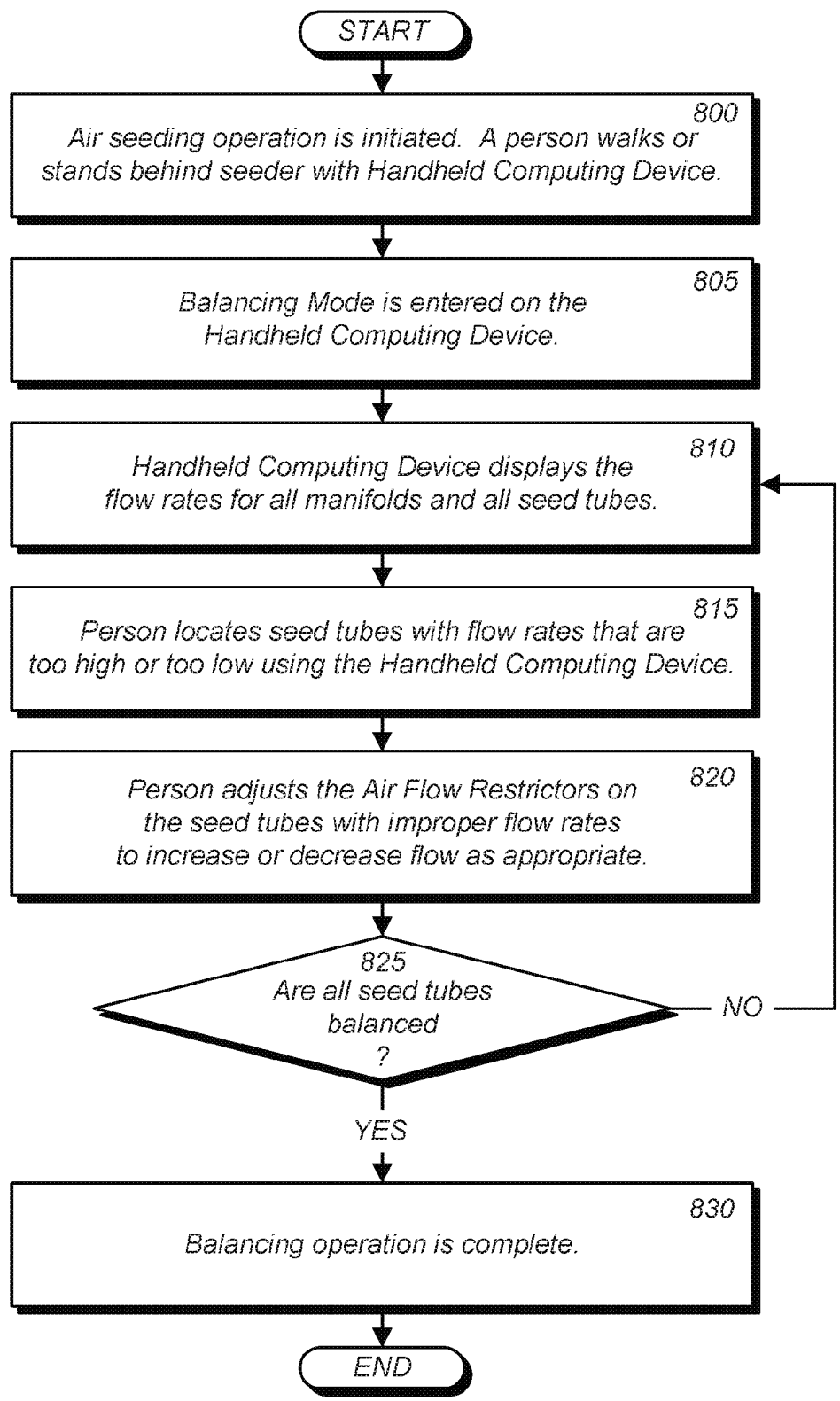
FIGS. 13A and 13B show two possible embodiments of an algorithm for balancing the output of an air seeding system using the present invention.

FIG. 13A shows one embodiment of a flowchart for balancing the output of an air seeding system using the present invention. In Step 800, an operator begins operating the air seeder in a field, or, alternatively, in a stationary test set-up. Seed begins to flow through the air seeding system and secondary seed tubes 162. A person (who could be the same operator who initiated air seeder operation in Step 800, or a second person) walks or stands behind the seeder holding the handheld computing device 500. In Step 805, the person enters "Balancing Mode" on the handheld computing device 500, which is a page that aids the user in equalizing the outputs of all active secondary seed tubes 162. In Step 810, the handheld computing device 500 displays the flow rates for all manifolds and seed tubes in the air seeding system. In Step 815, the person uses the handheld computing device 500 to identify seed tubes with flow rates that are either too high or too low. In Step 820, the person adjusts the air flow restrictors 400 on the seed tubes with improper flow rates to increase or decrease the flow as needed. If the handheld computing device 500 shows that the outputs of all secondary seed tubes 162 are now balanced (Step 825), the balancing operation is complete (Step 830). If the secondary seed tubes 162 are still not balanced, the algorithm jumps back up to Step 810 and these steps are repeated as necessary until the outputs of all secondary seed tubes 162 are equalized.

Figure 13B:
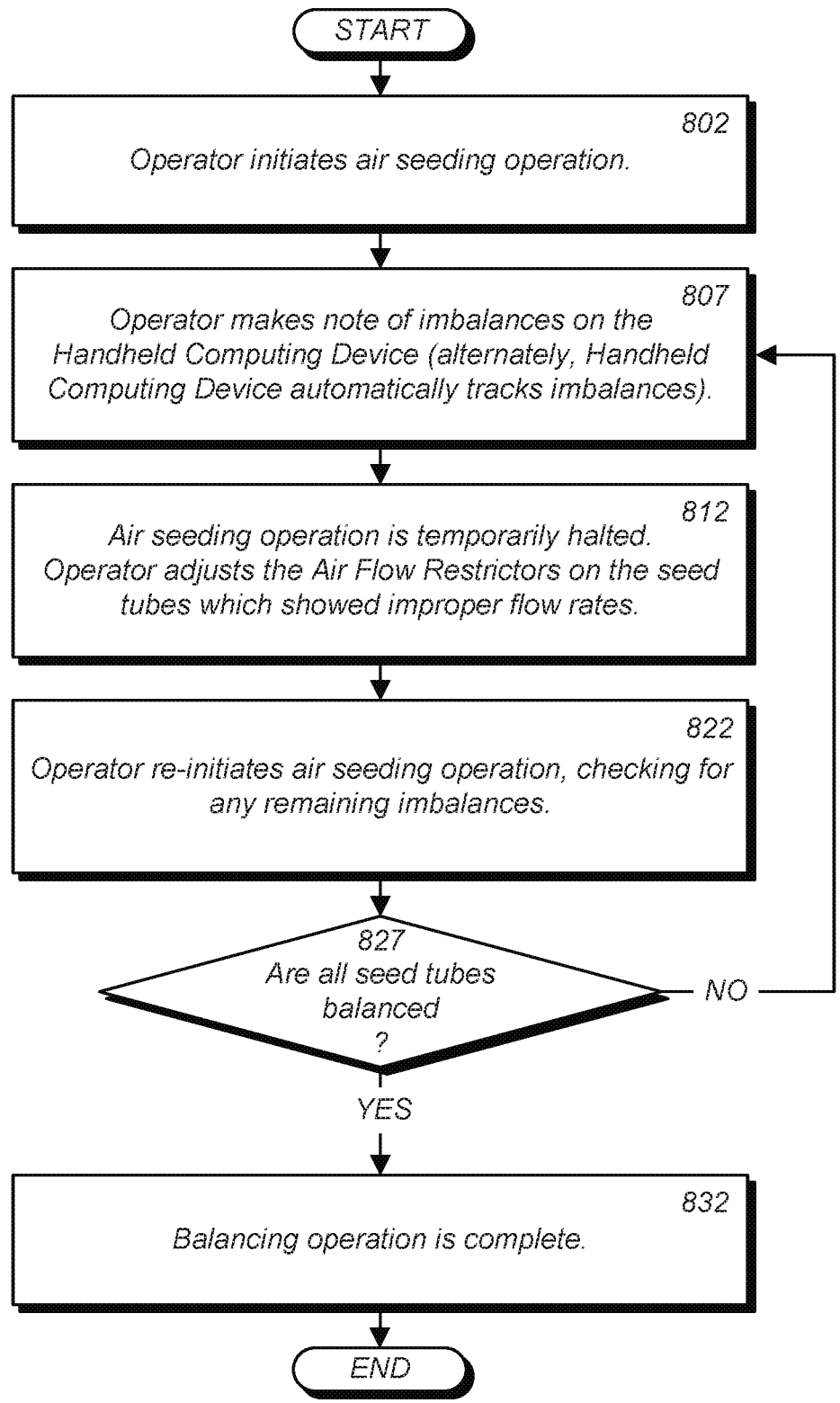

FIG. 13B shows another embodiment of a flowchart for balancing the output of an air seeding system using the present invention. In Step 802, an operator initiates an air seeding operation by driving the air seeder into the field and planting seed. As they seed, the operator or the handheld computing device will keep track of imbalances detected by the present invention (Step 807). After a sufficient section of field has been seeded (enough to note where the system imbalances are), the air seeding operation is halted (Step 812) and the operator adjusts the air flow restrictors on the seed tubes that showed improper flow rates (imbalances). The operator then re-initiates the air seeding operation (Step 822) and checks to see if any imbalances are remaining. If all seed tubes are balanced (Step 827), the balancing operation in complete (Step 832). If the seed tubes are not balanced (Step 827), then Steps 807-827 are repeated until the system is fully balanced.

In the preferred embodiments of an air seeding system, as described herein, a design was chosen to reduce the overall system cost while still providing sufficient functionality, e.g., in processing of the acoustic data captured by the present invention. This was achieved by providing one blockage monitoring node for multiple microphones (potentially more than 20 acoustic sensors may be plugged into a single blockage monitoring node). Since a single blockage monitoring node has to process sound data received by multiple microphones, a multiplexing approach is used, where a blockage monitoring node listens to one microphone for a short period of time, then moves on to the next, and so on, until the blockage monitoring node has sampled all of the microphones and begins again. These multiplexed signals are then converted into the frequency domain and analyzed to produce an estimate for the overall "sound power" seen by the system. This sound power is a relative indication of the amount of flow in a system or in a given seed tube. Instead of showing the exact amount of seed flowing in each tube, the system provides the amount of flow relative to the average of all seed tube flow rates. One embodiment of an algorithm for determining a sound power estimate in this fashion is provided in FIG. 14, which will be discussed shortly.

However, by reducing the amount of or eliminating completely the multiplexing that occurs, possibly by increasing the number of processors available for each microphone, the sound data could be processed in the time domain. This would allow a system to count the actual number of seeds that strike the acoustic sensor, instead of providing a relative flow rate. Working in the time domain in this fashion would allow elements of the present invention to be used in other applications. For instance, the acoustic sensors described in this specification could be used in a grain loss monitor, in which grain falling out of the back of a combine (and therefore lost to the harvester) could be detected by placing an acoustic sensor (or an array of acoustic sensors) on the back of the combine, such that grain falling out of the harvester would first hit the acoustic sensor and be detected. The acoustic sensors and electronic components described herein enable processing in both the frequency and time domains. While this specification describes the inventions use on an air seeding system, it is important to note that the same components can be used in similar material flow applications, including agricultural and other applications.

Figure 14:
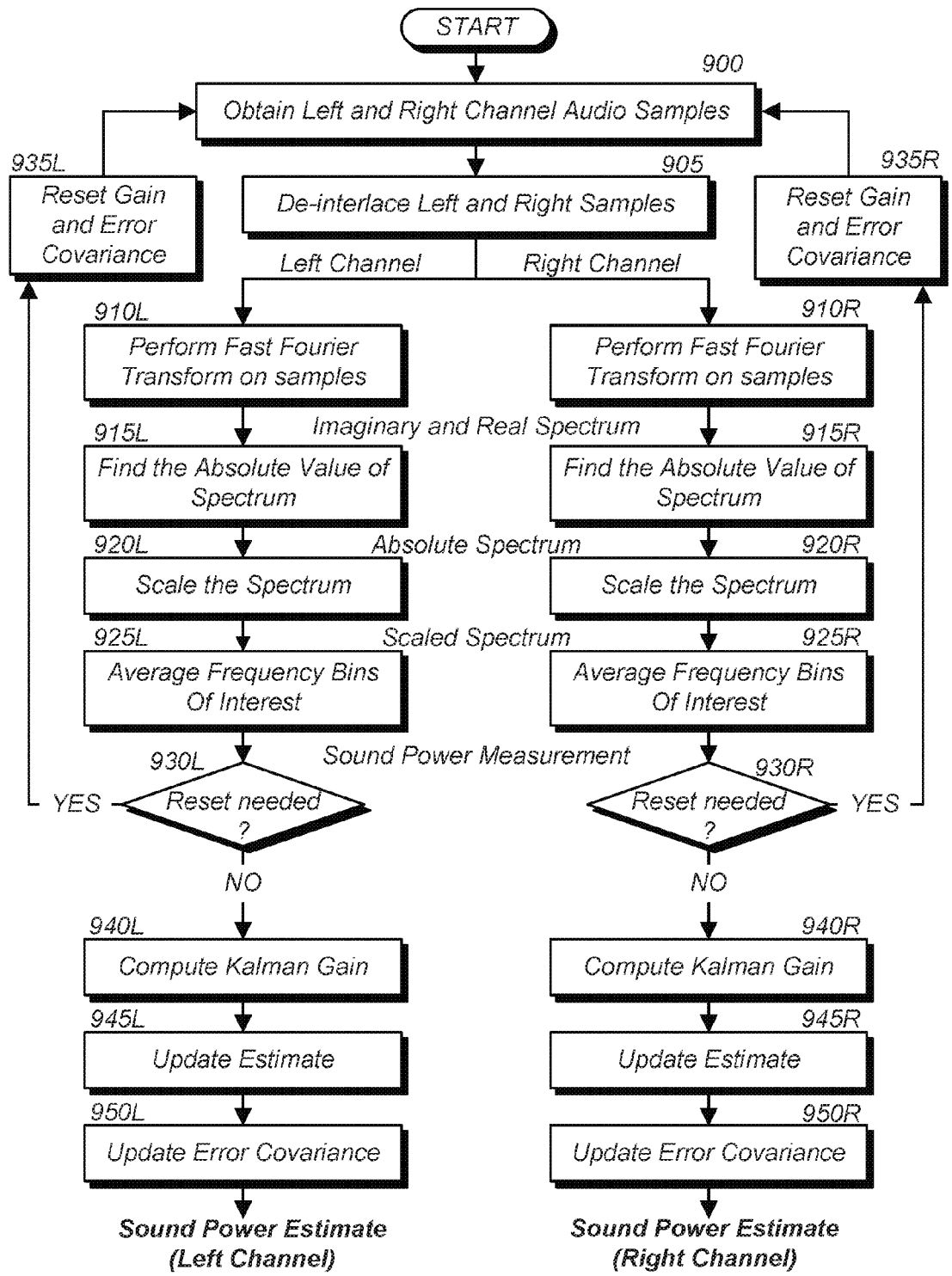
FIG. 14 shows one embodiment of an algorithm for creating a sound power estimate using the acoustic sensors of the present invention.

FIG. 14 shows an embodiment of an algorithm for creating a sound power estimate using the acoustic sensors of the present invention, in which the data is utilized in the frequency domain. In Step 900, audio samples are obtained from the acoustic sensors as interlaced left and right channel samples. Then the samples are separated (de-interlaced) into left and right channel data (Step 905). The processing shown in FIG. 14 from Step 910 on is done for both the left channel data and right channel data. The steps for both left and right channels are labeled with the same number, but an "L" or an "R" is appended to the reference designator to distinguish the processing of the left channel ("L") versus the right channel ("R"). The remaining description of FIG. 14 will apply to both the left and right channels equally.

A fast Fourier transform (FFT) is performed on the raw data from the left and right channels (Steps 910L, 910R). This creates a frequency spectrum containing imaginary and real spectrum information. The algorithm then finds the absolute value of the spectrum (Steps 915L, 915R), and the spectrum is scaled so that the frequency data of interest is better displayed (Steps 920L, 920R). The average of the frequency "bins" of interest is found to produce an instantaneous sound power measurement (Steps 925L, 925R). If the data is out of range, indicating a reset of the gain and error information is needed (Steps 930L, 930R), the algorithm resets the gain and error covariance (Steps 935L, 935R) and a new sample is obtained (Step 900). This is repeated until a valid instantaneous power measurement is obtained (Steps 930L, 930R).

Once a valid instantaneous power measurement is obtained, the algorithm computes the gain required for the Kalman filter (Steps 940L, 940R), the running sound power estimate is updated (Steps 945L, 945R), and the error covariance is updated (Steps 950L, 950R). Finally, an updated sound power estimate is delivered and sent to the handheld computing device 500 for processing and display.

Having described a preferred embodiment, it will become apparent that various modifications can be made without departing from the scope of the invention as defined in the accompanying claims. In particular, the components of the present invention, described herein and in the accompanying drawings, may be used in different configurations and combinations than described in the examples described above. The arrangement of seed tubes, blower fans, manifolds, and other components can vary significantly from one air seeding system to the next. The present invention can be easily adapted to these alternative configurations without changing the inventive concepts presented herein.

Also, as previously discussed, the components of the present invention can be adapted for use in other material flow applications. One such application previously discussed in this specification is a grain loss sensor, where acoustic sensors may be used (perhaps in an array) to detect grain falling from the back of a combine. In the grain loss application, the air flow restrictors of the present invention would not be used, but versions of both the acoustic sensors and blockage monitoring nodes would be employed. These components could be used similarly in any system in which an amount of material is flowing through a system.

III. Vehicle Gateway Module 1600 (Alternative Embodiment or Aspect)

Referring now to FIGS. 15 through 24B, FIG. 15 is a software architecture diagram showing the various layers of software resident in at least one embodiment of a vehicle gateway module. In this view, the physical gateway module 1600 is shown as a dashed line to indicate that the software layers depicted represent various pieces of software embedded within the gateway module 1600. Additional detail on the gateway module 1600 (the hardware) will be presented in FIG. 16.

The software architecture of at least one embodiment of a gateway module 1600 includes a hardware interface layer 1500, which includes routines for interfacing to and controlling the various physical hardware devices and components that will be further explained in connection with FIG. 16. The hardware interface layer 1500 is essentially the firmware that controls the primary functions of the physical hardware components.

The architecture also contains an ISO 11783 software layer 1400, which is responsible for creating proprietary messages 1420 in ISO 11783 format. The messages 1420 can be used to control functions on the vehicle or an attached implement, or to receive information from the vehicle or the attached implement. The ISO 11783 layer 1400 can also create or receive Virtual Terminal messages 1440 (messages that match the Virtual Terminal protocol specification of the ISO 11783 standard), such that it can communicate with any attached standard Virtual Terminal. The ISO 11783 layer 1400 is responsible for translating messages and data back and forth between ISO 11783 format and other forms which may be used by the gateway module 1600, such as information received by the gateway module 1600 from one of the wireless networks with which it is communicating.

ISO 11783, also known as ISO BUS or ISOBUS, is a common communication protocol used by the agriculture industry, and is based on the J1939 Controller Area Network (CAN) protocol published by the Society of Automotive Engineers (SAE). The ISO 11783 standard specifies a serial data network for control and communications on forestry and agricultural vehicles and implements. The ISO 11783 standard consists of several "parts", each of which describes a different aspect of the standard. Most notably, ISO 11783 Part 6 describes the Virtual Terminal standard. By providing a gateway module which can convert between the type of messages and information typically sent over a wireless network used by a mobile device into a standardized protocol used by a Virtual Terminal, it is possible for the mobile device to act as a Virtual Terminal, or for the mobile device to provide control directives to a vehicle in the same way that an operator would through the use of a Virtual Terminal.

Figure 15:
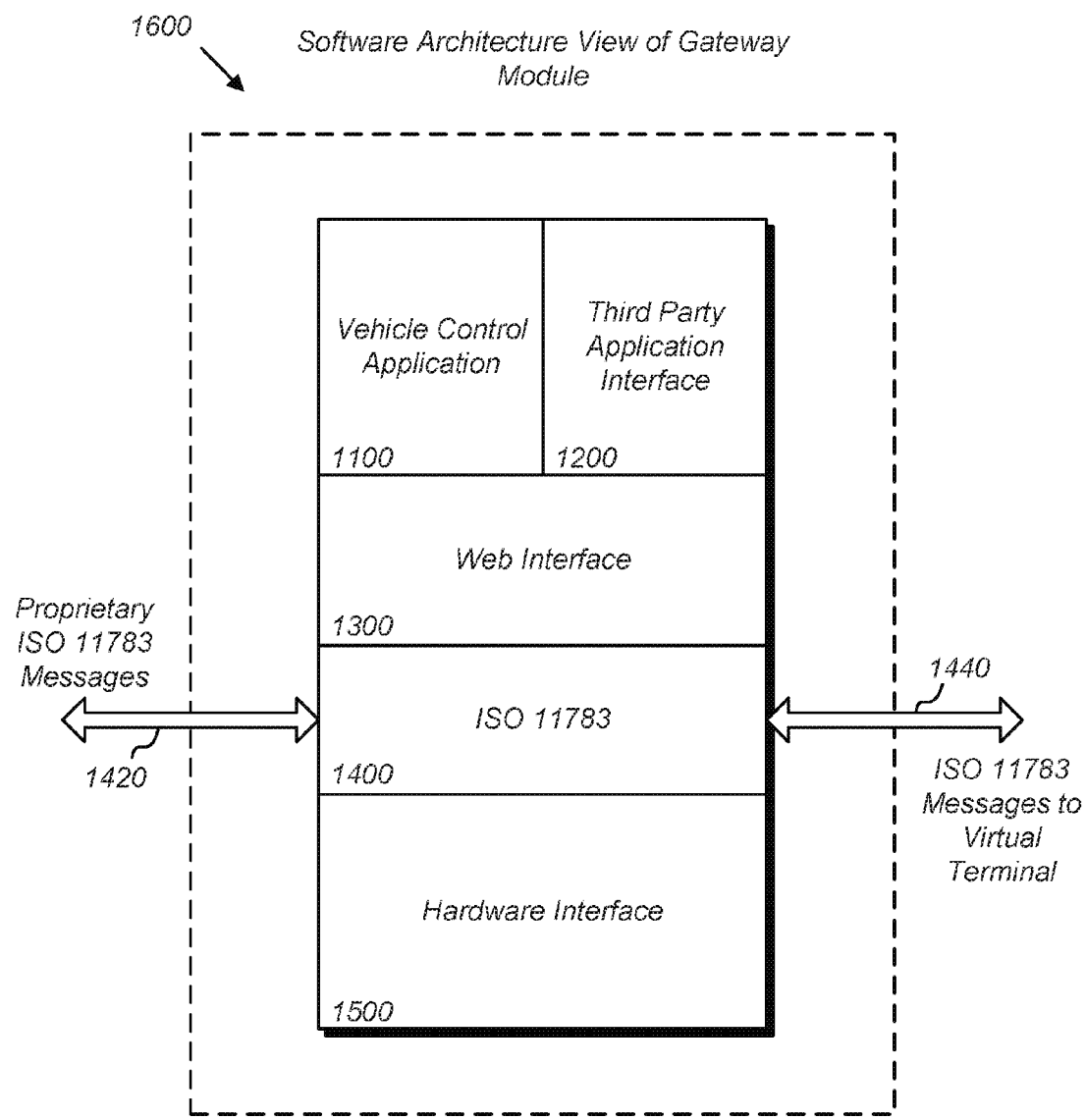
FIG. 15 is a software architecture diagram showing the various layers of software resident in at least one embodiment of a vehicle gateway module.

The use of ISO 11783 in FIG. 15 and in all examples throughout this specification is intended to be exemplary only, and is in no way limiting. Any standard protocol may be used, including a future protocol. Therefore, the use of ISO 11783 can be replaced with any appropriate standardized communication protocol without deviating from the intent of the invention described herein.

The software architecture of the gateway module 1600 contains a web interface layer 1300, which has software which can interpret internet commands such as those written in HTML (hypertext markup language), the language upon which most webpages are written and built. HTML5, the fifth revision of the HTML standard, is currently under development and will include many new syntactical features which allow the easier implementation of multimedia features. This web interface layer 1300 allows vehicle-specific and third-party web-based applications to be executed on the gateway module 1600.

Particularly, a vehicle control application 1100 is provided to allow access to certain vehicle and implement subsystems and data, as well as control of certain subsystems. Requests are made by the vehicle control application 1100 in the form of a web-style request (an HTML command) through the web interface layer 1300, which is received by the ISO 11783 layer 1400, which translates the request into ISO 11783 format for transmittal on one of the vehicle's communications busses. Information is returned to the vehicle control application 1100 via the reverse of this request path.

Similarly, applications provided by third parties (such as vendors of seed requesting data on seed usage from a planter, for example) can gain access to data contained within the gateway module 1600 by making requests through the third-party application interface layer 1200. These requests by third-party applications are passed down from a cloud or internet server as will be described in additional detail in FIG. 17.

In addition to accepting and processing requests made by third-party applications passed down from the cloud server, the third-party application interface layer 1200 also allows third-party applications to be hosted directly on the gateway module 1600. This means that an original equipment manufacturer (OEM) using a version of the gateway module 1600 can create variations of the control software as required to operate their vehicles and implements and can install them as applications directly on the gateway module 1600. The third-party application interface layer 1200 has knowledge of function calls available within the vehicle control application 1100 that allow it to access desired functions.

Figure 16:
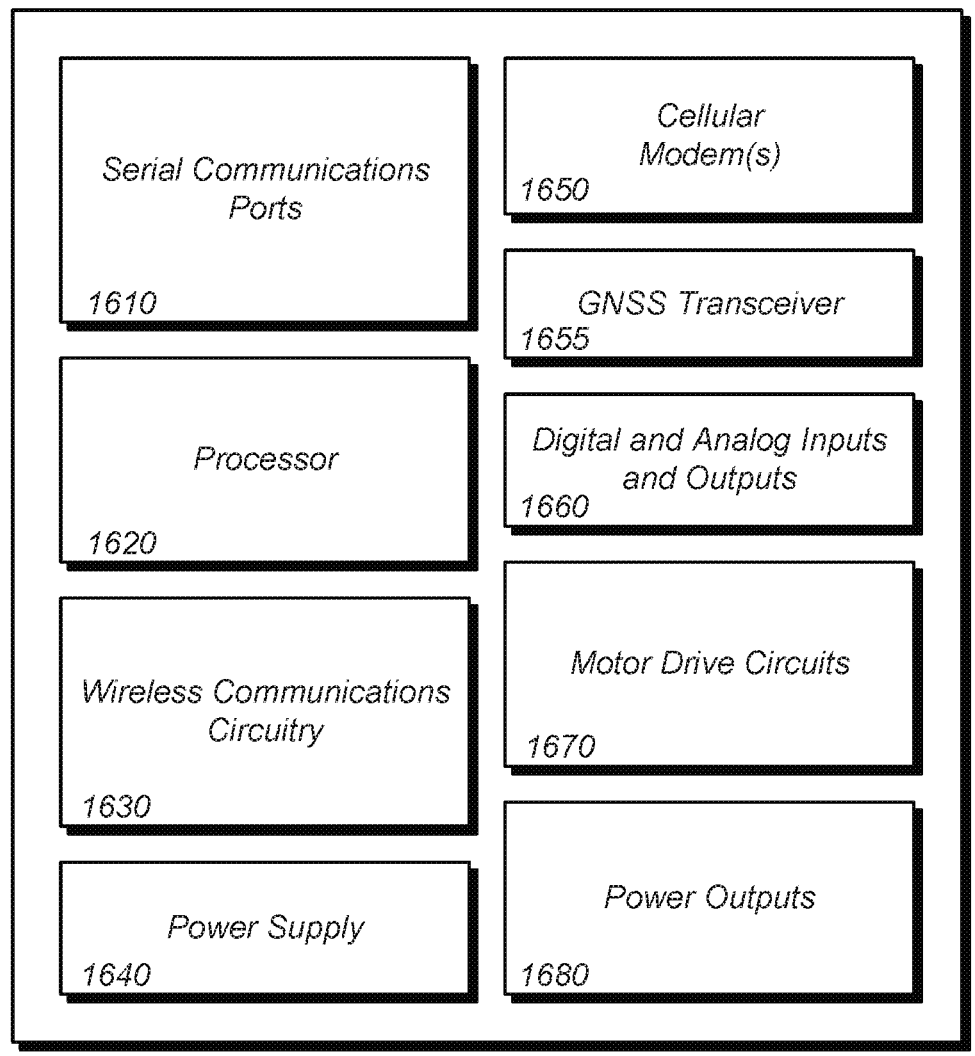
FIG. 16 is a high-level hardware block diagram illustrating the physical hardware components of at least one embodiment of a vehicle gateway module.

FIG. 16 is a high-level hardware block diagram illustrating the physical hardware components of at least one embodiment of a vehicle gateway module. The gateway module 1600 contains a power supply 1640 which manages the input power to the gateway module 1600 and steps the power level down and conditions the power appropriately for the various subcircuits in the gateway module 1600. The power supply 1640 may also supply power to other, external systems through one or more power outputs 1680, which may, for example, be sensors or other modules which require a power supply with a voltage or other characteristics not otherwise available on the vehicle.

A processor 1620 serves as the primary control for the gateway module 1600, executing the embedded software and controlling the functions of the system including the module 1600. The gateway module 1600 has serial communications ports 1610 for sending messages to other parts of the vehicle system. Serial communications on the vehicle may include, but are not limited to, ISO 11783 messages, CAN messages, and other proprietary messages in a serial format.

Wireless communications circuitry 1630 is used to control the exchange of information with various wireless networks, which may include but are not limited to IEEE 802.11, WiMAX, Bluetooth, Zigbee, or any other appropriate wireless communications protocol. One or more cellular modems 1650 are provided to allow the gateway module 1600 to communicate via cellular networks. The gateway module 1600 can include a global navigation satellite system (GNSS) transceiver 1655.

The gateway module 1600 can provide control to a vehicle or receive inputs from a vehicle using digital and analog inputs and outputs 1660, the number of which can vary (from zero to several of each type) based on the needs of the system. The gateway module 1600 may also have a number of motor drive circuits 1670 that can be used to engage motor drives on a vehicle or implement.

Figure 17:
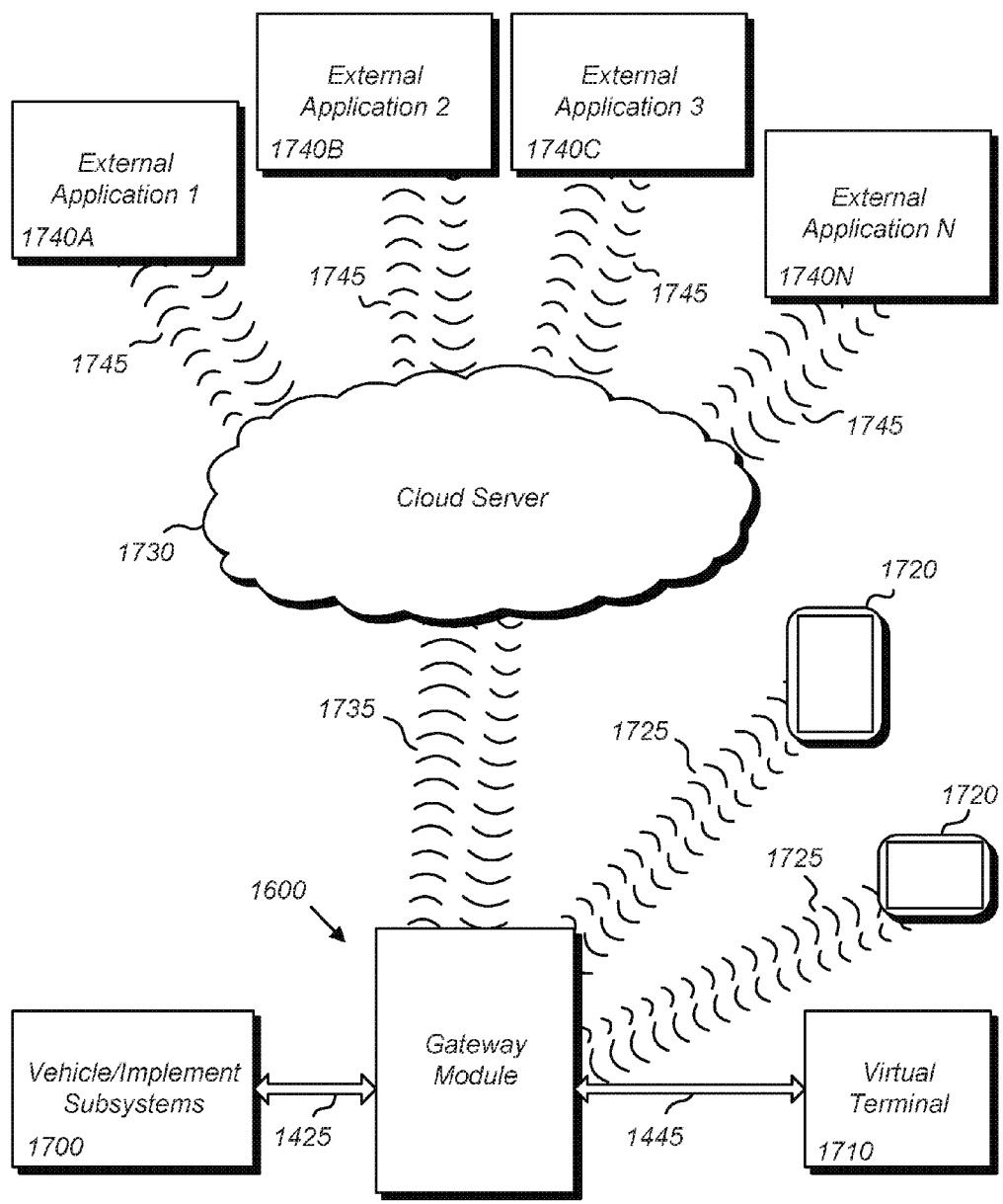
FIG. 17 is a system architecture diagram showing one embodiment of a vehicle gateway module interacting with other components in the system.

The gateway module 1600 can comprise, for example only, an electronic control module with a first connection connected to the vehicle/implement subsystems 1700 and a second connection connected to a virtual terminal 1710 (FIG. 17).

It should be noted that the block diagram shown in FIG. 16 is one embodiment of a gateway module, and is not meant to be limiting in any way. Variations can be made to the number and types of circuits included without deviating from the inventive concept. For example, a gateway module embodiment with no digital and analog inputs and outputs and no motor drive circuits would still meet the intent of the invention described herein. There are other variations possible which can be made, as well, while still maintaining the concept of a module which provides a bridge or translation pathway between hard-wired, vehicle-based or application-based communication busses and wireless networks.

FIG. 17 is a system architecture diagram showing one embodiment of a vehicle gateway module interacting with other components in the system. Central to this system is a gateway module 1600, such as those described in the embodiments shown in FIGS. 15 and 16 previously. This gateway module 1600 is attached to the subsystems of a vehicle or implement 1700 via a proprietary communications bus 1425, such as the ISO 11783 bus shown in FIG. 17 (although, as previously stated in this specification, any appropriate communication standard could be used in place of ISO 11783). A virtual terminal 1710 is optionally connected to the gateway module 1600 via a communications bus 1445, such as an ISO 11783 bus over which virtual terminal commands may be sent. It should be noted that, although a virtual terminal standard (meeting ISO 11783, Part 6, as described previously) is shown in this example illustration, any other appropriate type of display which can receive and send information via a standard, published protocol can be used in place of the virtual terminal without deviating from the invention.

The gateway module 1600 optionally communicates with one or more mobile devices 1720 (such as a smart phone, tablet computer, notebook computer, etc.) over a wireless communications means 1725 such as an IEEE 802.11 connection or any appropriate wireless connection. A user operating the mobile device 1720 can use an application running on the device and written specifically for the vehicle or application on which the gateway module 1600 is mounted for accessing data and controlling the vehicle by issuing wireless commands. The commands can be translated into standard protocol messages for the vehicle, as previously described in the detailed description of FIG. 15 and FIG. 16.

In this way, the mobile device 1720 can actually be used in place of the virtual terminal 1710 as the primary display and control interface to the vehicle and/or the implement attached to the vehicle. This allows the operator to replace a potentially expensive piece of hardware (the virtual terminal 1710) that was specifically designed for use in the vehicle with an inexpensive and multipurpose mobile device that the operator may already own for another purpose. This also has the added advantage of allowing the operator to leave the cab of the vehicle with the display (in the form of the mobile device 1720, instead of the hard wired virtual terminal 1710), which gives the operator greater freedom and enables features that could not be done with a permanently-mounted, single-purpose display.

In addition to enabling communication with one or more mobile devices 1720, the gateway module 1600 allows the vehicle to communicate with a cloud server 1730 over a wireless communication means 1735 such as a cellular network (or any appropriate wireless protocol). The cloud server 1730 is an internet-based set of resources that comprises one or more physical servers and which can draw upon additional resources as the need demands. The cloud server 1730 may optionally offer a single company-hosted database which stores information collected from a fleet of deployed vehicles and/or implements, each with their own gateway modules 1600, or the cloud server 1730 can provide direct access to a number of external applications 1740 (shown here as 1740A through 1740N, but collectively referred to as 1740) over a separate communication means 1745. Communication means 1745 may be implemented as a wireless connection (such as a cellular connection or any of the various wireless network protocols available) or as a wired connection to the internet and the cloud server 1730.

These external applications 1740 can make requests through the cloud server 1730 to the gateway module 1600. These requests are received by the gateway module 1600 through the third-party application interface 1200 (FIG. 15) and are translated into machine-specific requests as previously described in this document.

Examples of external applications 1740 may include, but are not limited to, the following examples:

Prognostics/Diagnostics Application: An original equipment manufacturer (OEM) of a vehicle such as a tractor could receive information directly from a deployed fleet of gateway modules that would allow them to monitor the failure rates of components across a fleet and eventually have enough data to predict when these components should be replaced and notify the customer to replace or service the parts before they actually fail, reducing downtime and cost.

Remote Vehicle Access: Monitoring vehicle items such as position, speed, tire pressure, oil pressure, engine temperature, RPM, etc., and creating a log of the use of a vehicle.

Seed and Chemical Usage: Suppliers, such as seed companies, distributors of fertilizers, herbicides and pesticides, and others can receive reports directly from machines with gateway modules reporting the quantities of each item used per acre, and can analyze this data for trends.

It should be noted that some embodiments of the system of FIG. 17 will used both a virtual terminal 1710 and one or more mobile devices 1720 in conjunction. This system embodiment may require an application or software to manage the handoff of primary control between the hard-wired virtual terminal 1710 and the mobile devices 1720. FIGS. 17A-17E detail possible embodiments of security and safety schemes for managing this handoff. It should be noted that providing security and safety schemes such as those described enables additional system functionality, including the handoff of control from the on-board system to a second system, external to the vehicle system entirely. For example, as shown in FIG. 17D, it would be possible for an operator of a grain truck to control the unload auger on a combine, to enable the transfer of harvested crop from the combine to the grain truck without requiring an operator in the harvester. An ideal system should also protect against the inadvertent activation or hijacking by a non-authorized external system. We turn now to FIGS. 17A through 17E.

Figure 17A:
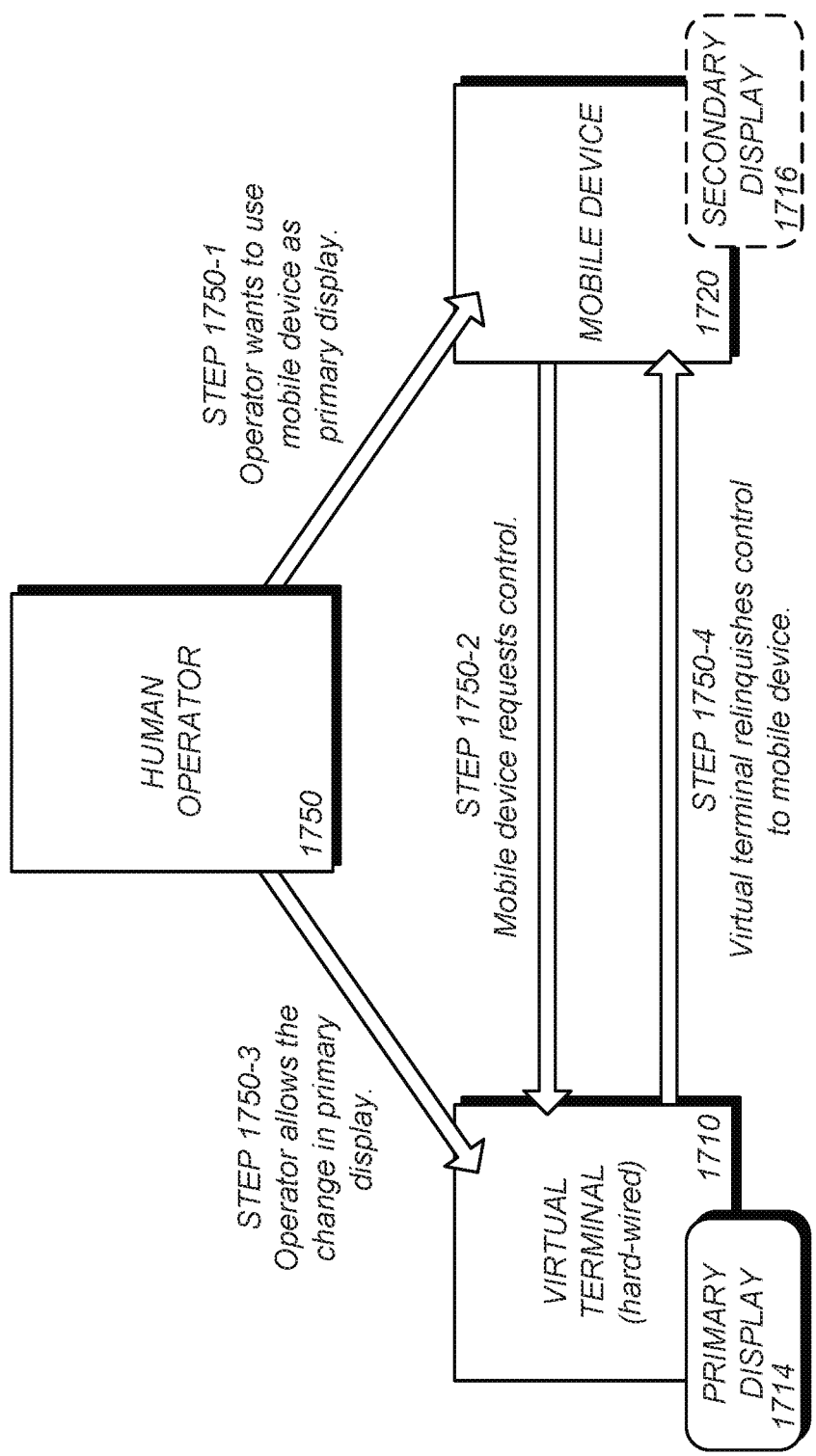
FIG. 17A is a use case diagram showing possible interactions between a hard-wired display and one or more mobile devices, as well as the human operator, when the mobile device is to be used as the primary system display.

FIGS. 17A and 17B show a use case diagram showing possible interactions between a hard-wired display and one or more mobile devices, as well as the human operator, when the mobile device is to be used as the primary system display. FIG. 17A shows the actors in a system which include a virtual terminal (or, more generically, a hard-wired display) 1710, one or more mobile devices 1720, and a human operator 1750.

In this initial state, the hard-wired display 1710 is acting as and designated the "primary display" 1714, and the mobile device 1720 is acting as and designated the "secondary display" 1716. The definition of "primary display" as used in this context is the display through which the operator can command changes to the vehicle system (such as turning a subsystem on and off, commanding state changes, etc.) A "secondary display" in this context is a display which cannot be used currently to command changes to the vehicle system. A secondary display can receive data from the vehicle system and provide readouts and data based on that data, but a secondary display is not allowed to command changes directly.

For additional clarity, alternate terms for "primary display" and "secondary display" that have been used in the past are "master display" and "slave display," respectively. The terms "master" and "slave" can carry negative connotations, however, because of reminders of and allusions to human slavery, and so these terms have fallen out of fashion and are rarely used today. The reference to these terms is provided for completeness and to avoid ambiguity. These terms will not be used again in this specification and are provided only for additional historic background.

The human operator 1750 decides that he or she would like to use a mobile device 1720 as the primary display [Step 1750-1] and uses the mobile device 1720 to initiate a request for control. The mobile device 1720 sends a request for control [Step 1750-2] to the hard-wired display 1710. The hard-wired display 1710 receives the request and, assuming the current system state allows control by a mobile device 1720, the hard-wired display 1710 displays a message to the operator 1750, who must then provide manual approval for the change in primary display status [Step 1750-3]. The hard-wired display 1710 then relinquishes control to the mobile device 1720 [Step 1750-4].

It should be noted that the transactions shown in FIG. 17A represent one possible embodiment of the system, and one skilled in the art should see that it is possible to modify the steps shown without deviating from the intent of the current invention. For example, it may be possible for the change in display status could happen without requiring approval by a human operator 1750. That is, Step 1750-3 as shown in FIG. 17A may not be necessary if enough intelligence is built into the gateway module 1600 (shown in FIG. 17).

It is also important to know that the requests and messages shown passing between the hard-wired display 1710 and the mobile device 1720 do not necessarily pass directly between the displays, but are in reality passed into the gateway module 1600 as shown in FIG. 17. In the embodiment of the system shown in FIG. 17, it is actually the gateway module 1600 that manages the interactions with the displays, using the hard-wired display 1710 and mobile device 1720 as the interface to the human operator 1750. The arrows shown in FIG. 17A, therefore, should not be seen as the direct transfer of data among the actors in the system, but as the hand-off of control within the system.

FIG. 17B is a second use case diagram showing possible interactions between a hardwired display, one or more mobile devices, and the human operator. FIG. 17B is similar to FIG. 17A except that the mobile device 1720 is now designated as the primary display 1714, and the hard-wired display 1710 is now designated as the secondary display 1716. Because of this change in designation, the interactions between the system actors are slightly different. One major difference in this new system configuration is that control can be shifted from the mobile device 1720 to the hard-wired display 1710 simply by turning off the mobile device 1720 or commanding it to relinquish control [Step 1750-7]. This functional difference is based on the fact that the hard-wired display 1710 is an installed part of the overall system and thus is the default point of control (the primary display 1714) when a mobile device 1720 with control loses power or connectivity.

Optionally, the human operator 1750 can use the hard-wired display 1710 as an interface to demand control back from the mobile device 1720 [Step 1750-5]. The hard-wired display 1710 then seizes control back from the mobile device and informs the mobile device that it is taking control [Step 1750-6]. The mobile device 1720 then relinquishes control to the hard-wired display 1710 [Step 1750-8].

Figure 17C:
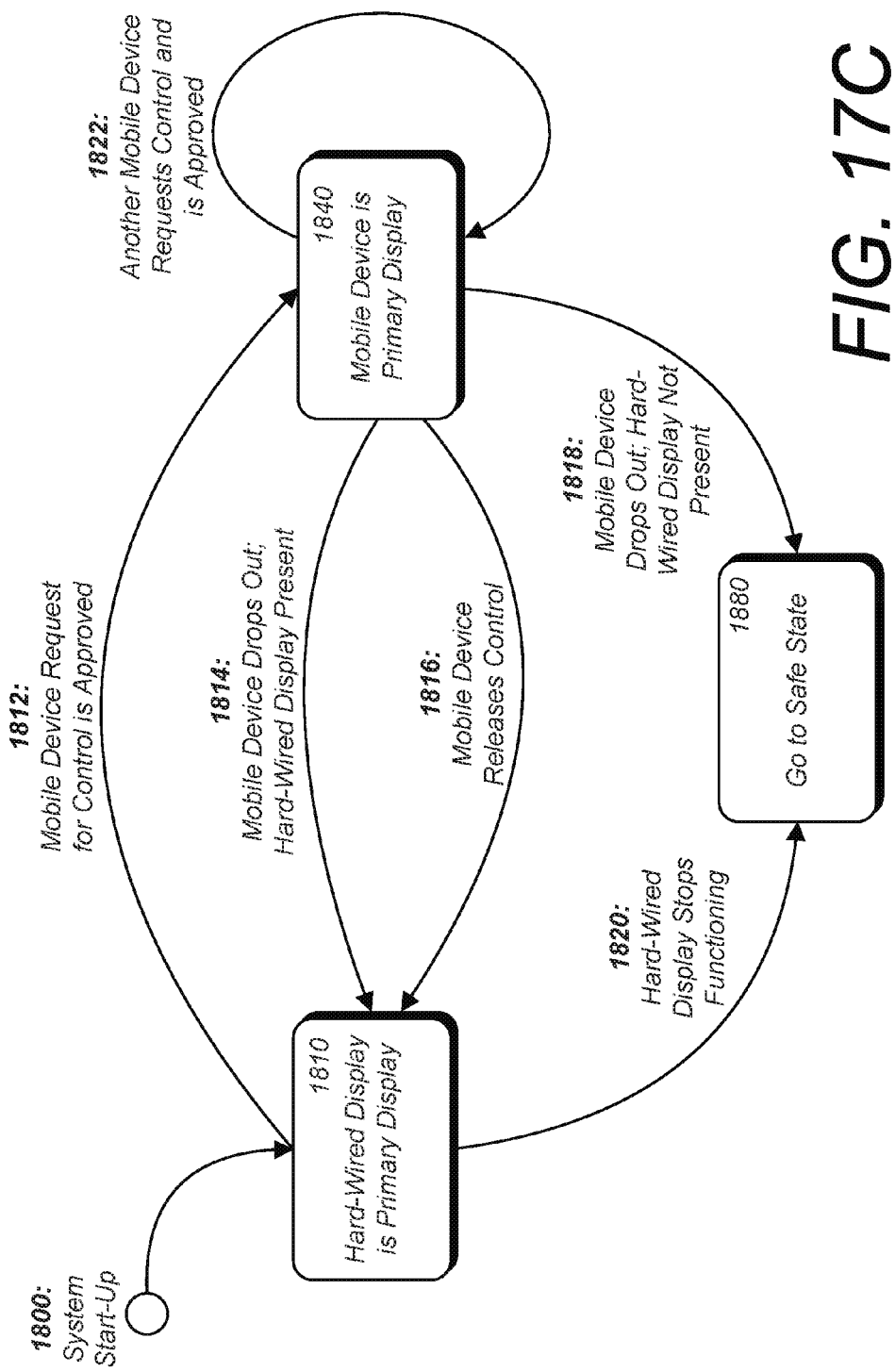
FIG. 17C is a state transition diagram for one embodiment of an application for managing the handoff among a hard-wired display and one or more mobile devices.
Figure 17D:
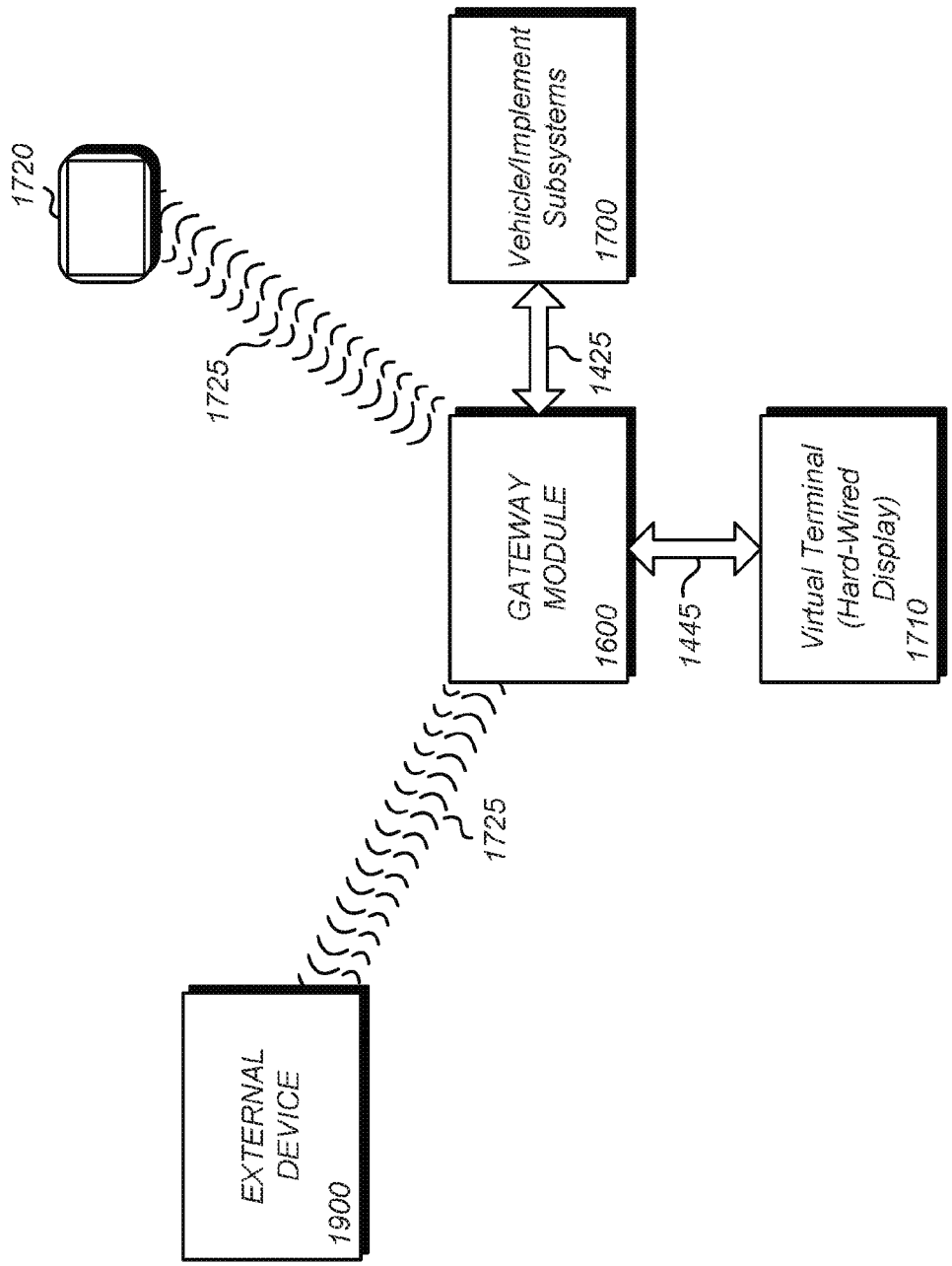
FIG. 17D is a block diagram showing how an external device might request and be granted control of subsystems on system of which it is not a part.

FIG. 17C is a state transition diagram for one embodiment of an application for managing the handoff among a hard-wired display and one or more mobile devices. If we look first at FIG. 17, we see that the gateway module 1600 is connected to the virtual terminal (hard-wired display) 1710 by a hard-wired connection 1445, and also to one or more mobile devices 1720. This position with a connection to all system displays allows the gateway module 1600 to serve as a manager for the handoff of control between displays. The gateway module 1600 is called the "gateway" as it controls the interface from the external world into the internal world of the machines subsystems 1700. Therefore, in some embodiments, the gateway module 1600 contains an additional layer of software specific to managing the handoff of control between displays. The overall concept of this software for managing the handoff of the primary display designation is provided in the state transition diagram of FIG. 17C.

FIG. 17C shows three possible states for gateway module 1600 when determining which display is the primary display. At system start-up 1800, the gateway module 1600 defaults to state 1810 (the hard-wired display 1710 takes control immediately). In the case when a mobile device 1720 asks for control and the hard-wired display 1710 approves the request (transition 1812), the system moves into state 1840 (the mobile device 1720 becomes the primary display).

When the system is in state 1840 and the mobile device 1720 drops out (that is, it loses power or connectivity, or is shut off) one of two things may happen in the state transition diagram. If the mobile device 1720 drops out and the hard-wired display is present (transition 1814), control returns by default to the hard-wired display and the system enters back into state 1810. If, however, the mobile device 1720 drops out and the hard-wired display is not present (that is, it has gone offline, lost power, or is otherwise unavailable, transition 1818), then the system moves into a safe state, state 1880, and stays in state 1880 until the system is powered on and off or otherwise reset. It should be noted that state 1880 can also be entered from state 1810 if the hard-wired display 1710 stops functioning for some reason (transition 1820).

When the mobile device 1720 is the primary display (state 1840), the mobile device 1720 may also release control on purpose (transition 1816) and return control to the hard-wired display 1710 (returning to state 1810). Finally, it is possible that, when the system is in state 1840, a second mobile device 1720 may request control from the current mobile device 1720 (transition 1822). When this happens, the system returns to state 1840, albeit using a new and different mobile device 1720 now.

FIG. 17D is a block diagram showing how an external device might request and be granted control of subsystems on a system of which it is not a part. An external device 1900, such as a mobile device operating from a separate vehicle (not part of the original vehicle system) can communicate wirelessly 1725 to the gateway module 1600. An example of this is when the driver of a grain truck pulls up beside a combine to unload grain from the combine into the truck for transport to a storage facility. Under the embodiment of the present invention shown in FIG. 17D, an operator in the grain truck can use the external device 1900 (such as a smart phone or other mobile device) to operate the unload auger on the combine remotely, without having to exit the grain truck to enter into the combine cab. The gateway module 1600 must now determine whether the mobile device 1720, the virtual terminal 1710, or the newly introduced external device 1900 should be the primary display. The state transition diagram of FIG. 17C could be used to perform this determination, where the external device 1900 of FIG. 17D would be treated as one of the mobile devices 1720 present, as if it were part of the original system hosting the present invention.

If the gateway module 1600 determines that the external device 1900 should be designated as the primary display, then the gateway module 1600 may decide to limit the accessibility to the vehicle/implement subsystems 1700. For instance, maybe the gateway module 1600 would only grant access to the subsystem for controlling the auger, and not to any other subsystem.

This selective, limited access granting suggests that multiple "security schemes" can be put in place for the sharing of system privileges, or limiting access based on role or need. FIG. 17E shows a table describing possible security modes in which the system of the present invention might operate, granting certain privileges to system actors based on pre-defined conditions or scenarios.

The first entry in the table of FIG. 17E is a control scheme called "role-based security." Under this scheme, the gateway module 1600 will grant access to only the vehicle or implement subsystems 1700 needed to fulfill a certain role. As described in the previous two paragraphs, for example, perhaps the gateway module 1600 would only give access to the auger control functions because it knows that the requesting device is filling the role of "grain truck."

The second entry in FIG. 17E is "conditional security," so named because access to certain subsystems will only be granted to a requesting device when a certain condition exists. For example, the gateway module 1600 may decide not to give access to dangerous subsystems (such as the ability to spin the shaft of a power take off, or PTO, shaft) to a mobile device 1720 when the operator is not in the seat of the vehicle. This can be used as a safety feature to limit control of the vehicle when the location of the operator is in question.

The third entry is "pre-approval security" whereby the operator can put the current primary display into a mode where it knows to expect a request to relinquish control, thereby granting pre-approval to the display. In this mode, for example, an operator in the cab of the vehicle can use the hard-wired display 1710 to pre-approve this own mobile device 1720. Then when the operator leaves the cab with the mobile device 1720, he or she can use the mobile device 1720 to request control, knowing the request will be approved (and that no other device can "jump in front" of the operator's device before the operator makes the request).

The fourth type of control scheme is "manual approval security." Under this scheme, the hard-wired display 1710 stays in control as the primary display, but allows the secondary displays to request the ability to do things, each of these requests requiring approval by someone at the primary display in the cab. This mode might be useful for allowing two people (one in the cab and one external with a mobile device) to work in conjunction while preventing dangerous situations in which two displays are trying to control the same subsystem.

Finally, the fifth example of a control scheme or security mode is "shared operations security," in which two or more separate displays share access simultaneously to the vehicle subsystems, but each separate display has access to and control of a different, mutually exclusive set of subsystems/features. That is, if two displays are used simultaneously, display 1 may control system features A and B, and display 2 may control system features C and D. Each system feature would only be controlled by a single display at any given time.

It would be obvious to one skilled in the art that there are other types of control schemes that are enabled based on the system architecture of the present invention, and that the examples in FIG. 17E are not intended to be limiting.

Finally, although the examples provided in this document describe the hand-off between a "hard-wired display" and one or more "mobile devices", it should be noted that this invention could be implemented with any of the following permutations without deviating from the intent of the present invention. These permutations are as follows:

All of the "primary display(s)" and the "secondary display(s)" are hard-wired into the vehicle.

All of the "primary display(s)" and the "secondary display(s)" are wireless.

The default "primary display(s)" are hard-wired and the "secondary display(s)" are wireless.

The default "primary display(s)" are wireless and the "secondary display(s)" are hard-wired.

Other external applications that might take advantage of the present invention may be suggested through the description of an example operational scenario, which will be done through the description of FIGS. 18-23. The remaining figures show example embodiments of applications or application interfaces as they might appear on a mobile computing device when used with the vehicle control and gateway module of the present invention. These images and the corresponding descriptions are not meant to be limiting in any way, but show only potential embodiments of application menus and screens that the use of the present invention would enable.

Figure 18:
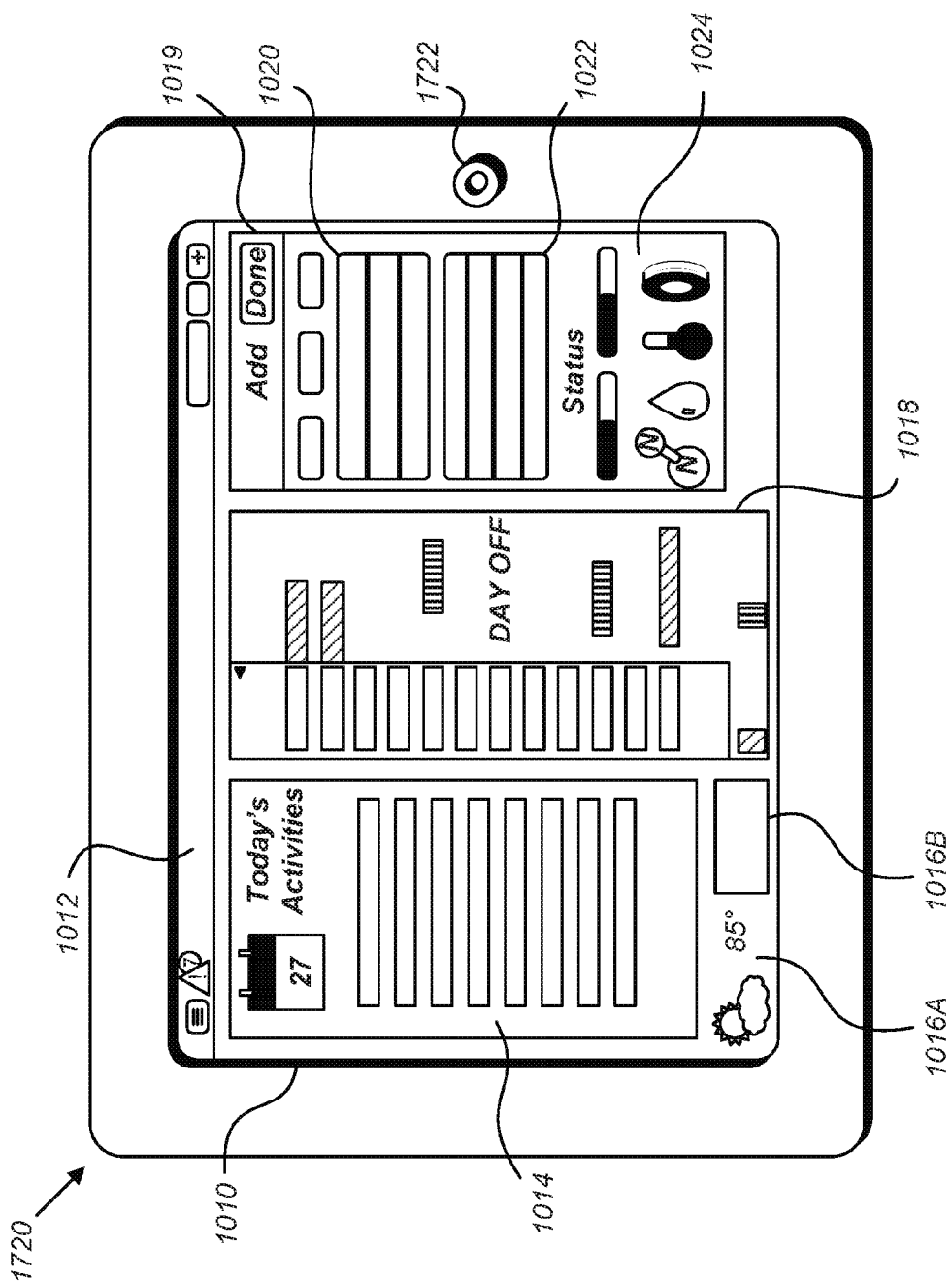
FIG. 18 is an example embodiment of an application interface for an operations scheduling tool for use with the vehicle control and gateway module of the present invention.

FIG. 18 is an example embodiment of an application interface for an operations scheduling tool for use with the vehicle control and gateway module of the present invention. A mobile computing device 1720 offers a display screen 1010 which may be the primary interface to the user, displaying graphical and textual information and providing a touch screen input interface. The mobile computing device 1720 has a power switch 1722. The top of the display screen 1010 typically has an optional information bar 1012, which is a displayed graphical banner which helps describe the current window or information being shown in the display screen 1010. This operations scheduling tool embodiment would allow an operator to access information related to available workers, vehicle status, and project completion percentages. A list 1014 of scheduled activities for the day is displayed. This list of scheduled activities 1014 would display items that have been accessed from the cloud server 1730 as described in FIG. 17.

Similarly, the application could remotely access weather conditions and other information at 1016A, 1016B, and access a schedule 1018 of available workers to see who is available, who is currently working on a job, and who is on vacation or otherwise not available. An add menu 1019 allows the user to schedule new operations to the schedule. The add menu 1019 consists of an operations submenu 1020, a vehicle/implement submenu 1022, and an operational status submenu 1024. The operations submenu 1020 allows the user to enter information on the new operation being scheduled, such as type of seed, name and location of the field, and date and time of the operation. The vehicle/implement submenu 1022 allows the user to choose the vehicle and the implements to be used. The operator assigns the operation using the submenu 1022. The operational status submenu 1024 accesses information on the vehicle and/or implements through direct communications with the vehicle and implements (or indirectly through the cloud server) and displays it to the user, such that the user knows if maintenance is required before a task can be started, or if there are any existing issues with the vehicle or implement.

Figure 19:
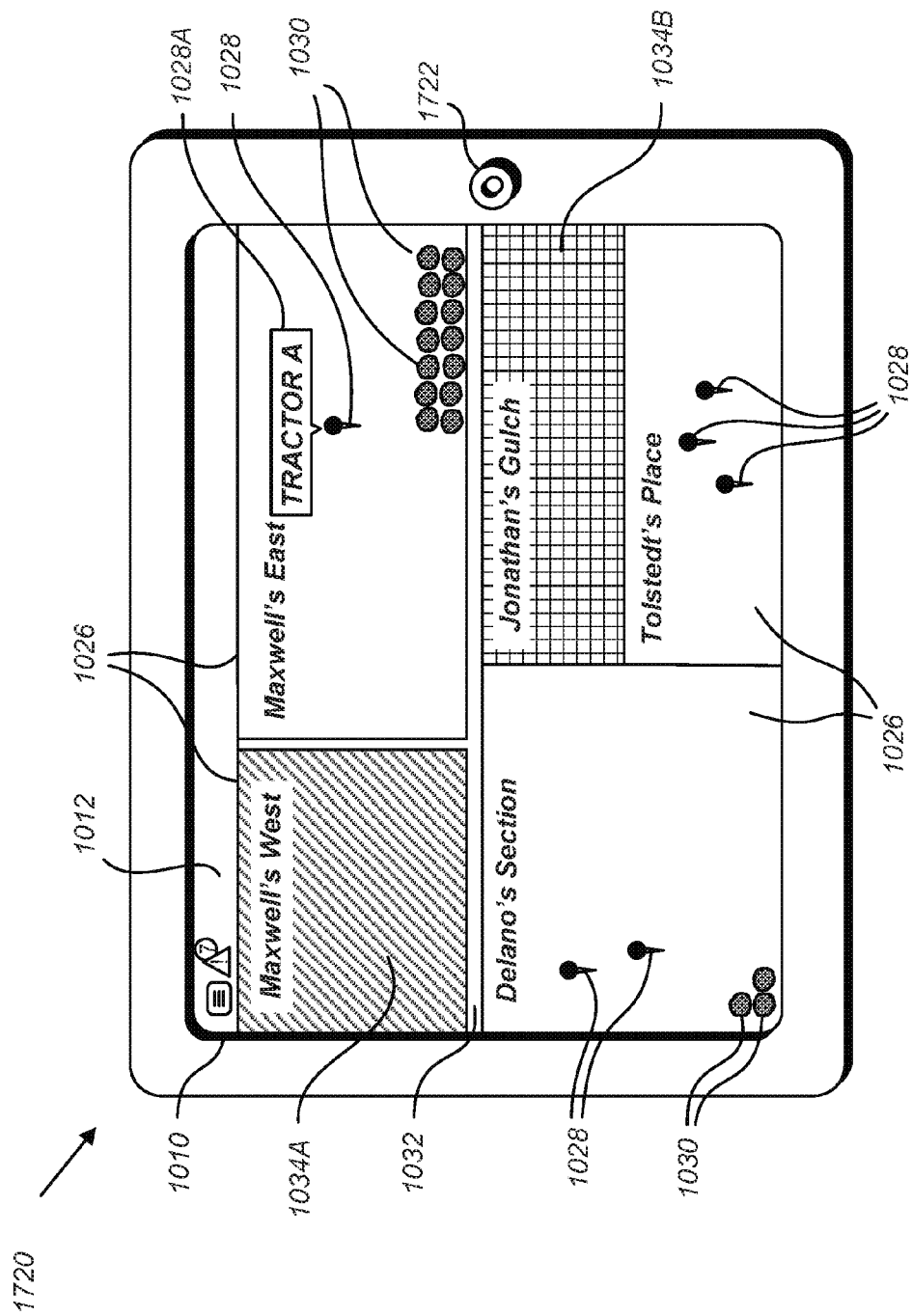
FIG. 19 is an example embodiment of an application interface for an operations map tool for use with the vehicle control and gateway module of the present invention.

FIG. 19 shows an exemplary embodiment of an application interface for an operations map tool for use with the vehicle control and gateway module of the present invention. A mobile computing device 1720 offers a display screen 1010 which may be the primary interface to the user, displaying graphical and textual information and providing a touch screen input interface. The mobile computing device 1720 has a power switch 1722. The top of the display screen 1010 typically has an optional information bar 1012, which is displayed as a graphical banner which helps describe the current window or information being shown in the display screen 1010. The display screen 1010 on the operations map tool will typically show a map or satellite image of an area containing farm land, buildings, roads, and other objects related to the operations of a farm. It should be noted at this point that, although the examples included in this patent specification primarily describe an agricultural operations scenario, the concepts captured in this specification could be applied equally well to other applications, such as the operation of a truck fleet, or maintenance operations at a large outdoor park.

The map or image displayed on the display screen 1010 may show one or more active fields 1026, where agricultural or other operations may be scheduled. These fields 1026 may be shaded in different textures or colors such as 1034A and 1034B, where a certain texture or color 1034A/1034B may indicate a status of an operation on that field 1026. For example, a field 1026 displayed with color 1034A may indicate that the operation scheduled for this particular field 1026 is completed, while a field 1026 displayed with color 1034B may indicate the operation scheduled in that field is currently underway or partially complete.

The image may also display real objects in or near the fields 1026, such as trees 1030 and roads 1032. Superimposed on top of the image are small location indicators 1028 which denote the location of actual vehicles or implements that are currently deployed in the fields 1026. By hovering over or clicking on one of these location indicators 1028, an information tag 1028A may be displayed, offering additional information on the vehicle or implement at that specific location.

Figure 20:
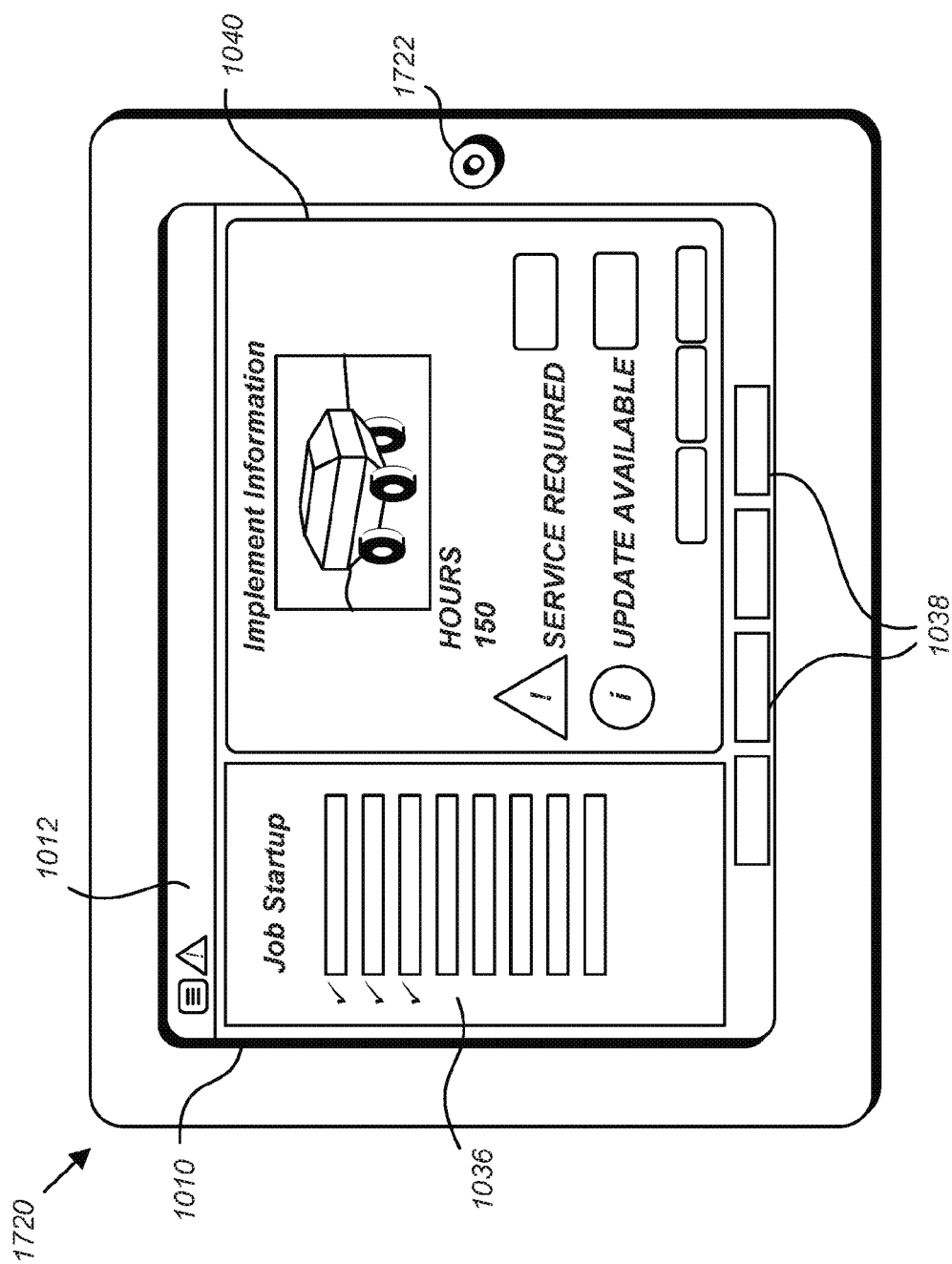
FIG. 20 is an example embodiment of an application interface for an implement information tool for use with the vehicle control and gateway module of the present invention.

FIG. 20 is an example embodiment of an application interface for an implement information tool for use with the vehicle control and gateway module of the present invention. A mobile computing device 1720 offers a display screen 1010 which may be the primary interface to the user, displaying graphical and textual information and providing a touch screen input interface. The mobile computing device 1720 has a power switch 1722. The top of the display screen 1010 typically has an optional information bar 1012, which is a displayed graphical banner which helps describe the current window or information being shown in the display screen 1010. The display screen 1010 on the implement information tool may provide a job startup checklist 1036 to allow the user to step through a series of screens to set the vehicle for a specific operation. The display screen 1010 for the implement information tool may also provide an implement information window 1040 which provides status information obtained from a live connection to the implement (which could also be done with a vehicle). Virtual controls 1038 along the bottom of the screen allow a user to jump to other windows or applications quickly. These virtual controls 1038 can be displayed on any application to allow a means of jumping between application pages.

Figure 21:
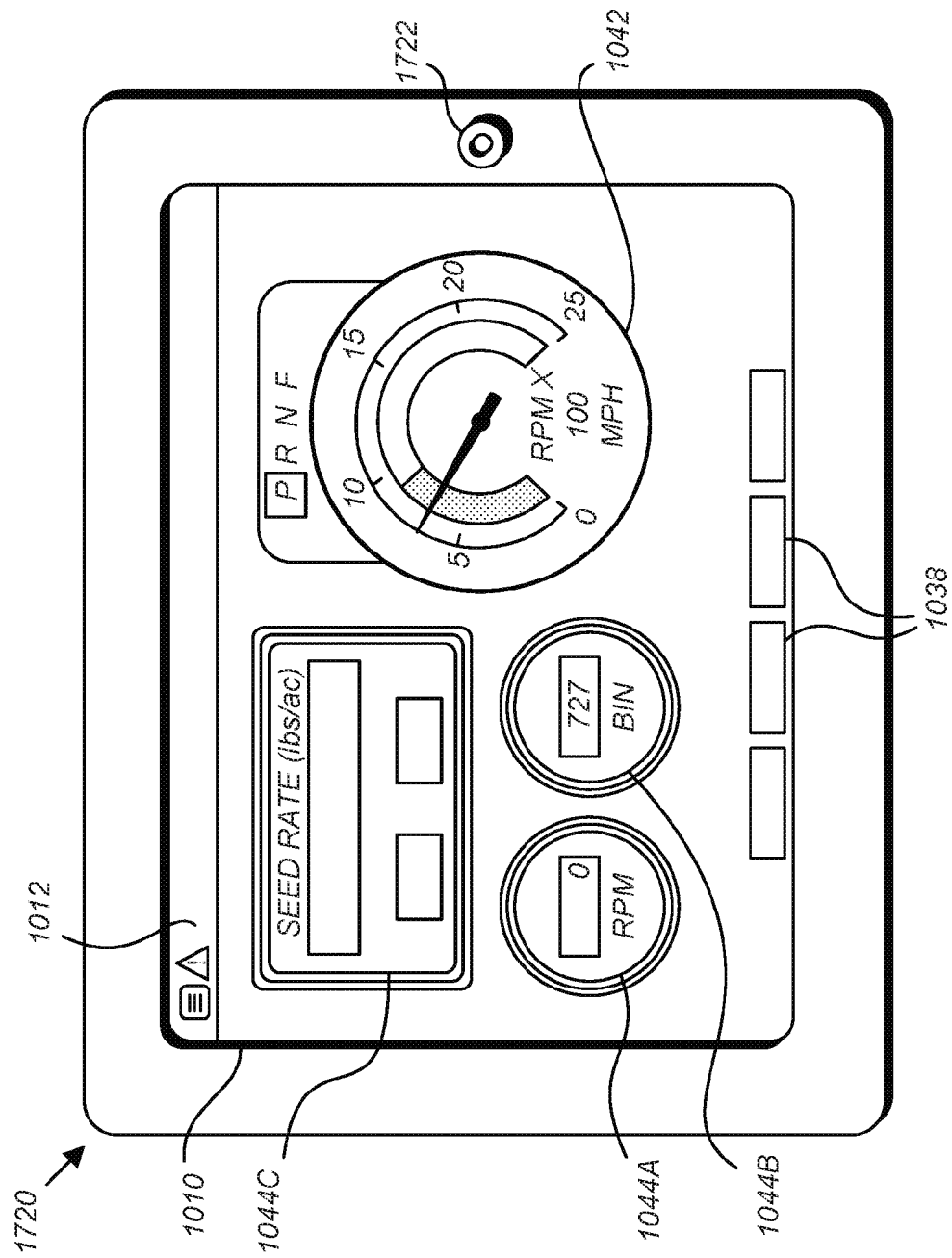
FIG. 21 is an example embodiment of an application interface for a virtual dashboard display for use with the vehicle control and gateway module of the present invention.

FIG. 21 is an example embodiment of an application interface for a virtual dashboard display for use with the vehicle control and gateway module of the present invention. A mobile computing device 1720 offers a display screen 1010 which may be the primary interface to the user, displaying graphical and textual information and providing a touch screen input interface. The mobile computing device 1720 has a power switch 1722. The top of the display screen 1010 typically has an optional information bar 1012, which is a displayed graphical banner which helps describe the current window or information being shown in the display screen 1010. The display screen 1010 on the virtual dashboard display can be used to display information received from the tractor, from the implement, or from an external application, either as standard protocol messages as described in FIG. 17 or through a wireless or wired interface available to the mobile device 1720. As it is a virtual display, the information received can be displayed in virtually any appropriate format, which may include a vehicle speedometer/tachometer 1042, or any of a number of possible gauge types, such as those shown in FIG. 21 at 1044A, 1044B, and 1044C. The application can allow an operator to define how their personal virtual dashboard will look by adding, deleting, and moving gauges, readouts, and controls to their liking. Virtual controls 1038 may be offered to allow the user to jump to another screen or application quickly.

Figure 22:
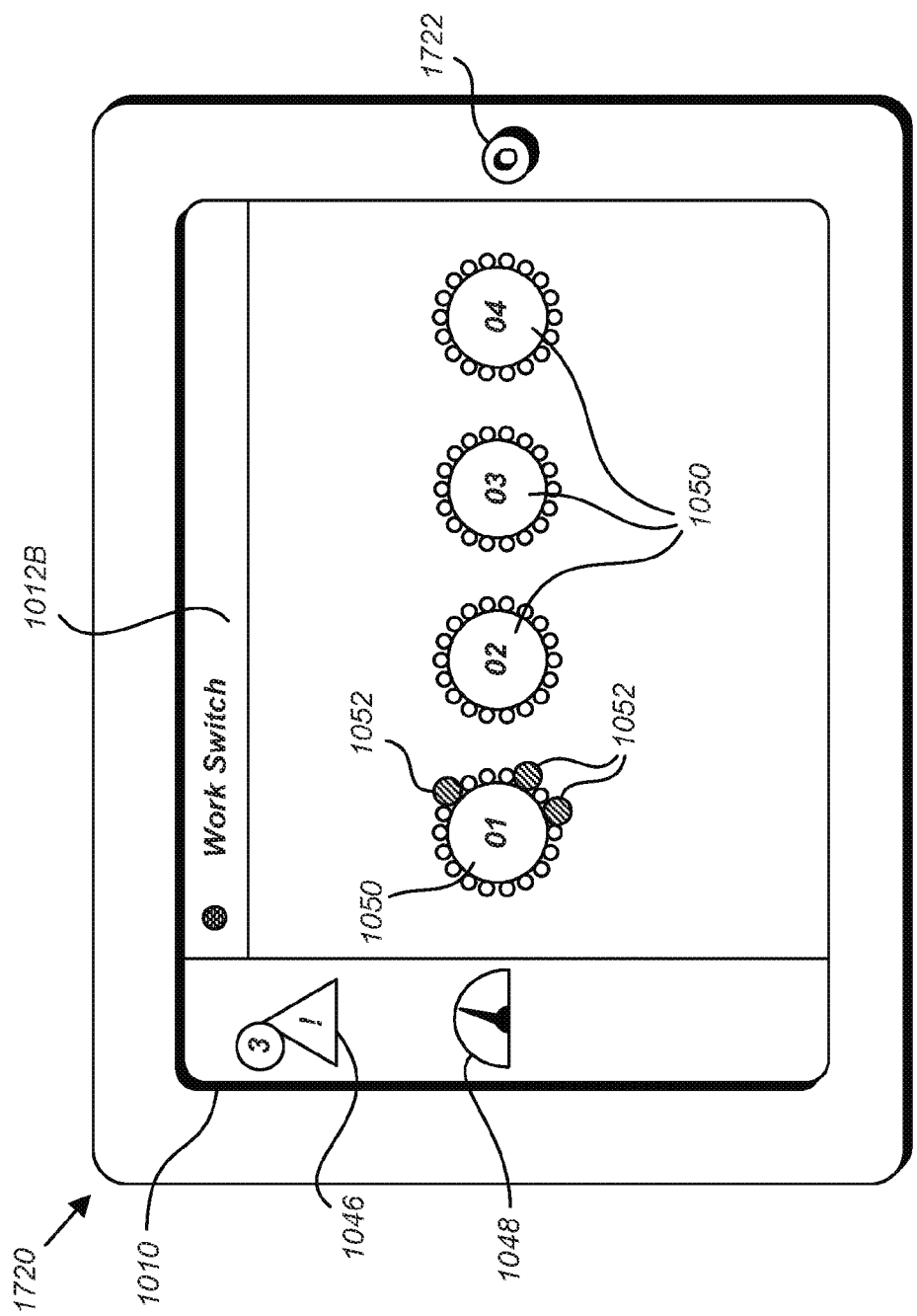
FIG. 22 is an example embodiment of an application interface for a blockage monitor tool for use with the vehicle control and gateway module of the present invention.

FIG. 22 is an example embodiment of an application interface for a blockage monitor. A mobile computing device 1720 offers a display screen 1010 which may be the primary interface to the user, displaying graphical and textual information and providing a touch screen input interface. The mobile computing device 1720 has a power switch 1722. The top of the display screen 1010 typically has an optional information bar 1012B (similar to information bar 1012 shown in FIGS. 18-21, but with different display and functional aspects presented on the screen shown in FIG. 22), which is a displayed graphical banner associated with the current window or information being shown in the display screen 1010. The display screen 1010 on the blockage monitor displays a warning icon 1046 when a blockage occurs (such as an air seeding machine blockage on an implement). The warning icon 1046 may indicate the number of seed tubes blocked and other conditions, and can display a number associated with the graphical warning image. In addition to the warning icon 1046, the display screen 1010 may offer icons which link to other tools which may help with the blockage situation, such as a meter roll tool 1048. In the main area of the display screen 1010, a graphical image representing the manifolds 1050 of an air seeder is displayed. Additional blockage indicators 1052 show which of the displayed tubes on the manifolds 1050 are currently showing blockages.

Figure 23:
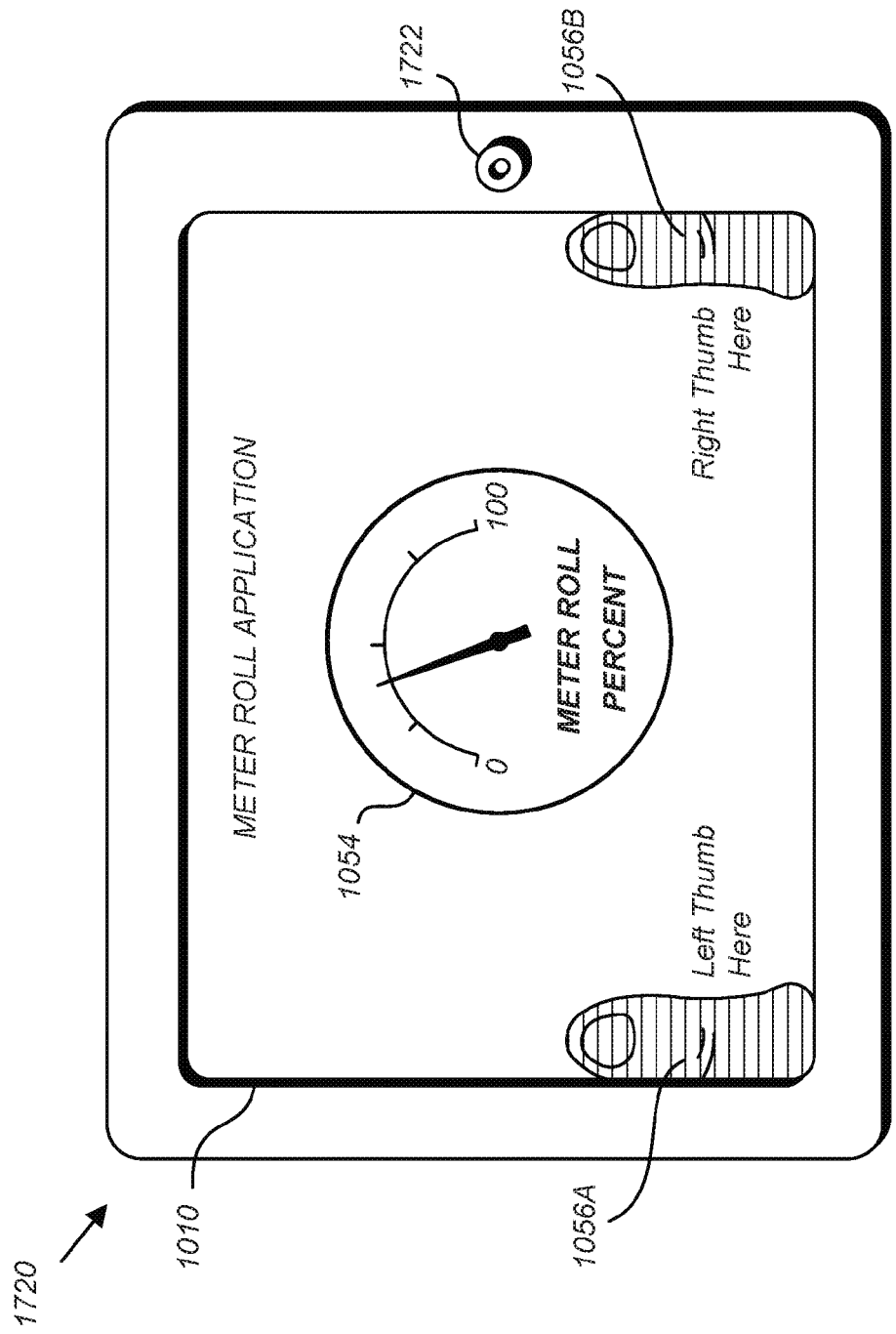
FIG. 23 is an example embodiment of an application interface for a meter roll application for use with the vehicle control and gateway module of the present invention, demonstrating the incorporation of an operator safety feature into the application.

When a blockage actually occurs on an air seeding machine using the current invention, the user can stop the vehicle, undock the mobile device 1720 from the vehicle cab, and carry it with them to the implement. The mobile device 1720 can then be used to execute diagnostic tests on the implement, access schematics of the implement or vehicle through the connection to the cloud server, make a request for a part or service to an online provider, or even have a live chat with someone who can assist in the repair. FIG. 23 shows one example of an application that can be used to test the functionality of the implement attached to the vehicle while standing next to the implement, holding the mobile device and using it to execute a diagnostic test on the implement.

FIG. 23 is an exemplary embodiment of an application interface for a meter roll application for use with the vehicle control and gateway module of the present invention, demonstrating the incorporation of an operator safety feature into the system. The application shown in FIG. 23, like those shown in the preceding figures, is one of many similar applications that can be executed using the mobile device to access the vehicle control and gateway module over a wireless connection.

A mobile computing device 1720 includes a display screen 1010 which may be the primary interface to the user, displaying graphical and textual information and providing a touch screen input interface. The mobile computing device 1720 has a power switch 1722. In this exemplary application, the operator can stand outside of an air cart (an implement consisting of a hopper which can drop seed and other material from the hopper down through a "meter roll" into an air stream for seeding or into an unloading auger), and can use the mobile computing device 1720 to calibrate the meter roll. The application on the display screen 1010 offers a meter roll gauge 1054 which shows the percent to which the meter roll has been engaged. It is typical in these systems that, in order to calibrate the meter roll, the meter must first be "primed", which means it must be full of seed or other material. The application shown in FIG. 23 provides an interface to the vehicle control and gateway module that allows the meter roll to be spun a few times to ensure that it is filled with seed. In the application shown in FIG. 23, the meter roll is engaged when the operator pushes the screen 1010 on the point marked 1056A and the point marked 1056B. By requiring the operator to engage opposite sides of the display screen 1010 to engage the meter roll, a safety feature is provided preventing the operator from accidentally engaging the meter roll. Operators are thus prevented from activating the meter roll while accessing the internal workings of the meter roll mechanism.

Figure 24A:
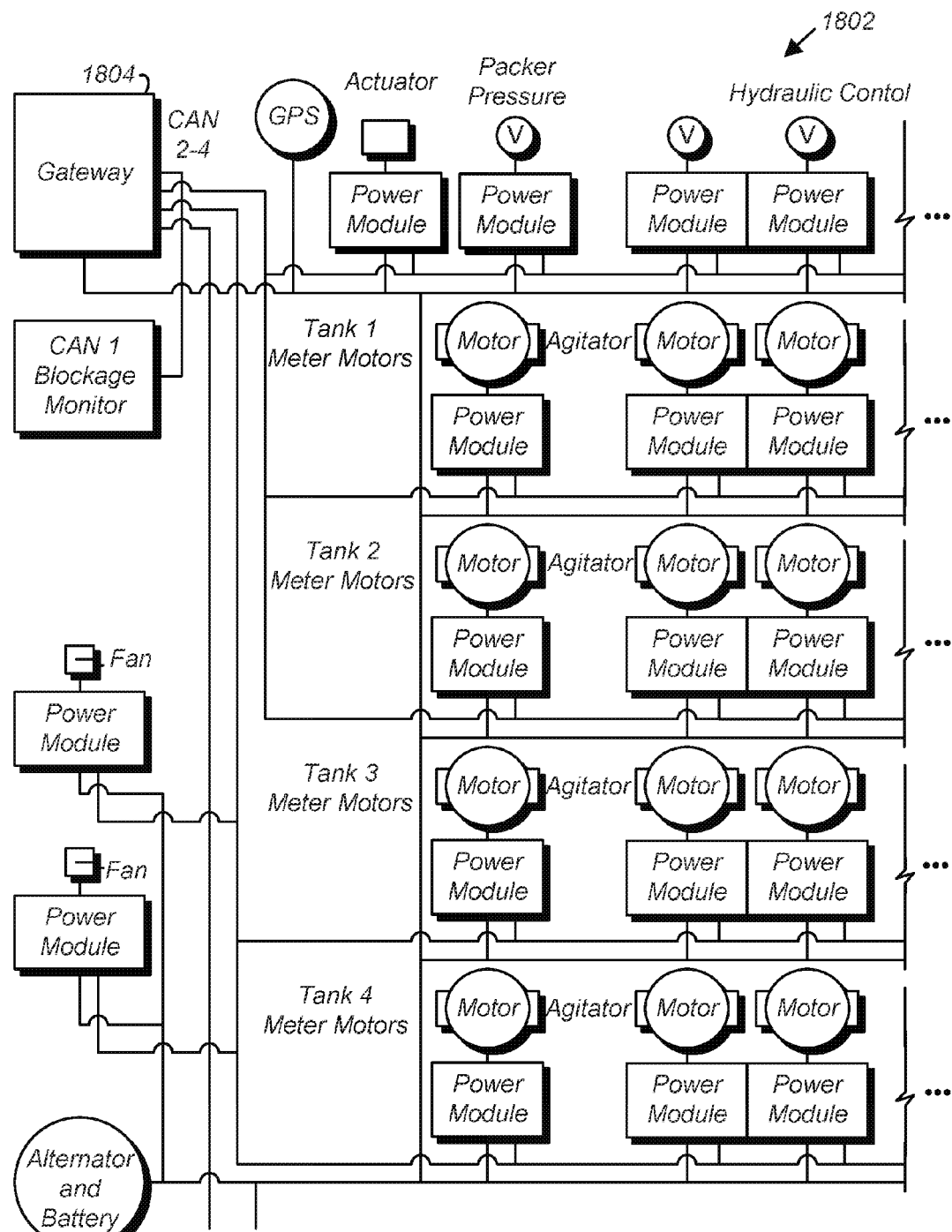
FIGS. 24A and 24B are a schematic diagram of an air seeder and liquid applicator control system embodying an alternative embodiment or aspect of the present invention.
Figure 24B:
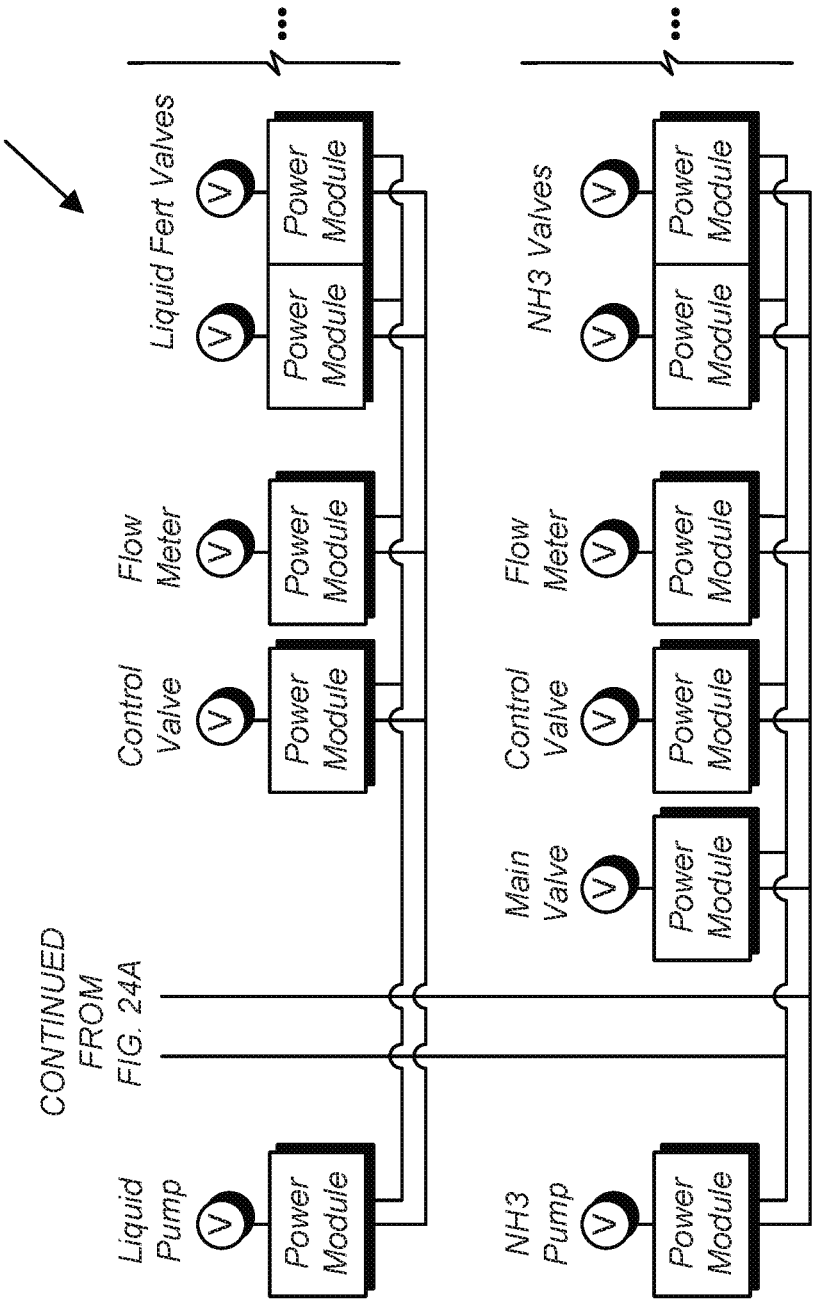

FIGS. 24A and 24B show a vehicle control system 1802 with a gateway module 1804 embodying another aspect of the present invention, which can be installed on a vehicle configured as a seeder, sprayer or other liquid dispensing equipment. The vehicle can be a self-propelled vehicle or a towed implement.

IV. Use Case Examples

Use Case 1: Implement/attachment with ECUs that have never been "paired" to a Gateway.
Step 1: The operator initiates the pairing mode on the Gateway (Access Point) from the display terminal.
Step 2: The Gateway changes its normal SSID (for example: GW_FF21, where FF21 is the serial number) to the specially coded SSID GW_FF21_XXXX_YYYYYY_############ where ############ is the security key of the network, XXXX is the implement/attachment manufacturer ID and YYYYYY is the implement/attachment serial number.
Step 3: The Wi-Fi ECUs on the implement/attachment are actively looking for a Gateway to pair with (since they are unpaired) find the specially code SSID being broadcast and request to join the Gateway using the SSID and security key.
Step 4: Once the Wi-Fi ECUs have joined the Gateway and gained network level access they send the Gateway messages requesting application level access.
Step 5: The operator is notified that Wi-Fi ECUs would like to pair and they can accept or deny. The list of ECUs could be checked against what is known to be registered on a particular implement/attachment.
Step 6: The operator accepts the pairing request.
Step 7: The Gateway sends a notification to each ECU that its request for application level access has been granted.
Step 8: The Wi-Fi ECU stores the "paired" SSID into its non-volatile memory.
Step 9: The operator leaves pairing mode and returns to broadcasting its normal SSID.
Step 10: The Wi-Fi ECU connects to the network broadcasting the stored "paired" SSID.
Alternative Path:
Step 6: The operator denies the pairing request.
Step 7: The Gateway sends a notification to each ECU that its request for application level access has been denied.
Step 8: The Wi-Fi ECU will not try to pair with the SSID again until power it is power cycled.
Use Case 2: Implement/attachment with ECUs that have been "paired" to a different Gateway.
Step 1: The operator initiates the pairing mode on the Gateway from the display terminal.
Step 2: The Gateway changes its normal SSID (for example: GW_FF21, where FF21 is the serial number) to the specially coded SSID GW_FF21_XXXX_YYYYYY_############ where ############ is the security key of the network, XXXX is the implement manufacturer ID and YYYYYY is the implement/attachment serial number.
Step 3: The Wi-Fi ECUs scan for available SSIDs.
Step 4: The Wi-Fi ECUs see the specially coded SSID being broadcast and request to join the AP using the SSID and security key.
Step 5: Once the Wi-Fi ECUs have joined the AP and gained network level access they send the gateway messages requesting application level access.
Step 6: The operator is notified that Wi-Fi ECUs would like to pair and they can accept or deny. The list of ECUs could be checked against what is known to be registered on a particular implement/attachment.
Step 7: The operator accepts the pairing request.
Step 8: The Gateway sends a notification to each ECU that its request for application level access has been granted.
Step 9: The Wi-Fi ECU stores the new "paired" SSID into its non-volatile memory.
Step 10: The operator leaves pairing mode and returns to broadcasting its normal SSID.
Step 11: The Wi-Fi ECU connects to the network broadcasting the stored "paired" SSID.

Alternative Path:
Step 7: The operator denies the pairing request.
Step 8: The Gateway sends a notification to each ECU that its request for application level access has been denied.
Step 9: The Wi-Fi ECU will not try to pair with the SSID again until power it is power cycled.
Step 10: The Wi-Fi ECU attempts to join the network with its previously stored SSID if it is being broadcast.

Use Case 3: Equipment wishes to use an implement/attachment that it is "paired" to.
Step 1: Gateway begins broadcasting its normal SSID.
Step 2: The Wi-Fi ECUs scan for available SSIDs.
Step 3: The Wi-Fi ECUs see the SSID of the Gateway they are paired to.
Step 4: The Wi-Fi ECUs request to join the SSID with the stored security key.
Step 5: The Gateway accepts the request.

Use Case 4: ECU needs to be re-registered (i.e. moved from one implement to another or installing a replacement).
Step 1: The operator installs the ECU onto the implement/attachment.
Step 2: The operator powers up the equipment and implement/attachment.
Step 3: The operator enters the implement/attachment manufacturer ID, implement/attachment serial and ECU serial number/network ID into the re-registration interface.
Step 4: The operator initiates re-registration mode for an ECU with serial number or network ID XXXX.
Step 5: The Gateway changes its normal SSID (for example: GW_FF21, where FF21 is the serial number) to a the specially code SSID GW_FF21_XXXX_############ where ############ is the security key of the network and XXXX is the serial number or network ID of the ECU as shown on its label, enclosure etc.
Step 6: The Wi-Fi ECUs on the implement/attachment scan for available SSIDs.
Step 7: The Wi-Fi ECU with the serial number or network ID XXXX sees the special re-registration SSID and joins the AP. All other Wi-Fi ECUs ignore it.
Step 8: The Wi-Fi ECU sends a request to the Gateway for the manufacturing ID and serial number of the implement/attachment it is being registered on.
Step 9: The Gateway sends the manufacturer ID and serial number that the operator entered for re-registration mode. (This information could potentially be sent up to the cloud).
Step 10: The Wi-Fi ECU receives the manufacturer ID and serial number and stores them in non-volatile memory as well as the SSID of the Gateway for pairing.
Step 11: The operator powers off the implement and tractor.

V. Alternative Embodiment Air Seeder Manifold System 2002 with Automated Diverter Cone Subassembly 2004

Figure 25:
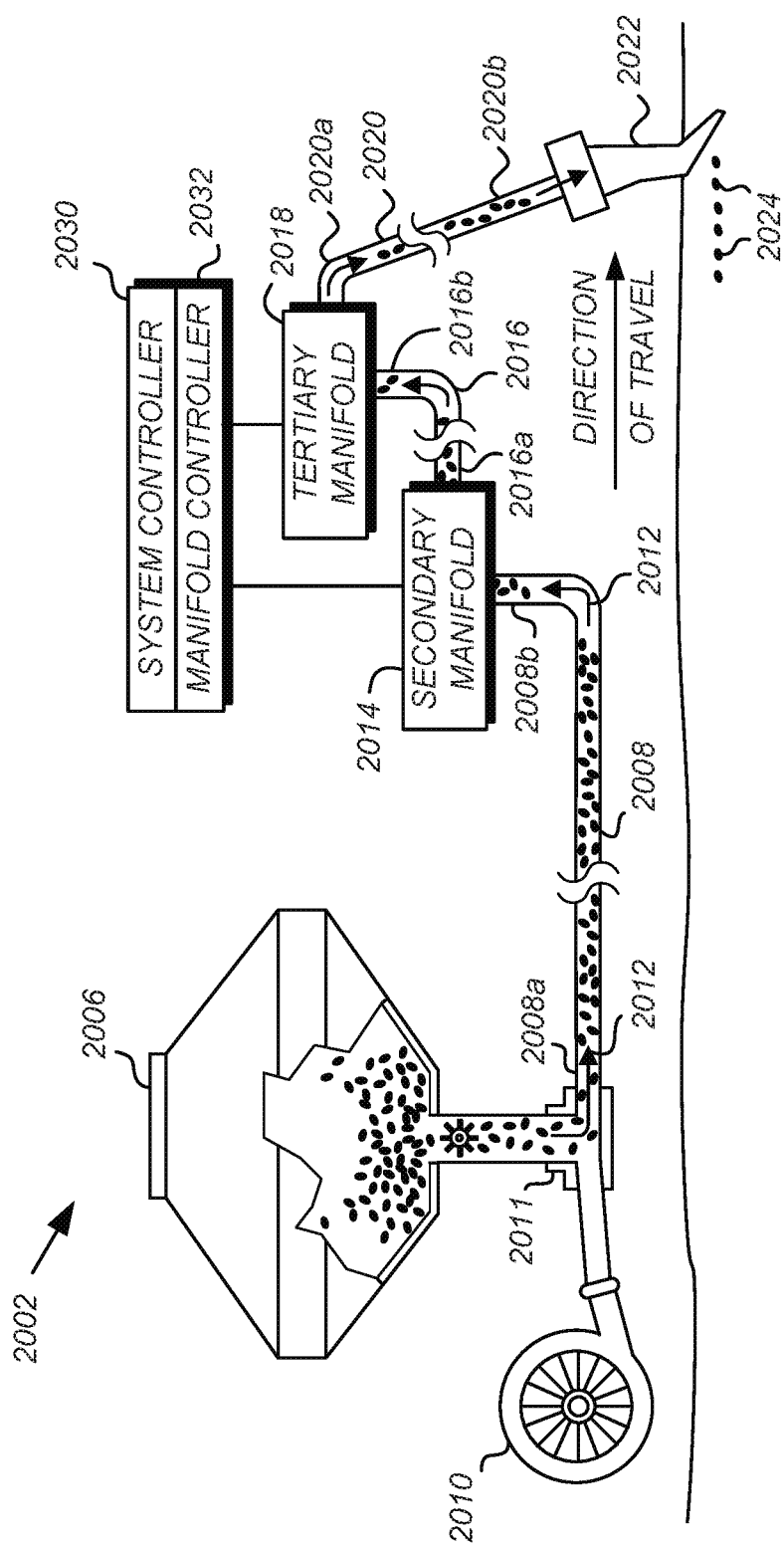
FIG. 25 is a side diagram of an air seeder manifold system embodying an alternative aspect or embodiment of the present invention with primary, secondary and tertiary manifolds for distributing seed from a seed hopper to seed depositing tools, shown mounted on an agricultural tillage and planting implement towed by a tractor.

FIGS. 25-33 show an automated, flow-adjustable air seeder manifold system 2002 embodying a modified or alternative aspect of the present invention with a flow-adjusting diverter cone subassembly 2004 which may be mounted to the primary, secondary or tertiary manifolds, as exemplified in and by FIGS. 26 to 33. As shown in FIG. 25, the system 2002 can be used in conjunction with an air seeder system as described above and including a hopper 2006, which feeds a primary seed tube 2008 with a proximate end 2008a connected to a primary manifold 2011. A blower 2010 provides an airflow through the primary manifold 2011 and is mounted generally behind and below the hopper 2006. A primary seed tube distal end 2008b is connected to a secondary manifold 2014.

As shown by the flow arrows 2012 (FIG. 25), seed enters the secondary manifold 2014 from underneath for distribution (e.g., laterally and radially) to secondary seed tubes 2016 at proximate seed tube ends 2016a. The secondary tubes include distal ends 2016b which are connected to corresponding tertiary or final manifolds 2018. Final seed tubes 2020 with proximate and distal ends 2020a, 2020b are connected to and distribute seeds from the tertiary manifolds 2018 to seed-depositing tools, such as knives 2022. Such knives are commonly used for tillage, and can inject liquid nutrients, herbicides, etc. into the soil, in addition to planting seeds 2024 at spaced, subsurface locations. Alternatively, seed placement could occur behind other tillage tools, such as disks, etc.

The exemplary air seeder manifold system 2002 shown is configured for distributing seeds in four stages: 1) hopper 2006 to primary manifold 2011; 2) primary manifold 2011 to secondary manifolds 2014; 3) secondary manifolds 2014 to tertiary manifolds 2018; and 4) tertiary manifolds 2018 to seed-depositing tools 2022. Other numbers and configurations of distribution stages, manifolds and seed tubes could be accommodated with the present invention. Moreover, the manifolds 2011, 2014, 2018 can be configured with different numbers of discharge outlets. For example, the tertiary manifolds 2018 are shown with 16 discharge outlets 2026. Unused outlets 2026 can be capped or closed off. The manifolds 2011, 2014, 2018 can have similar components and can be custom-configured as appropriate for particular seeder applications.

Figure 26:
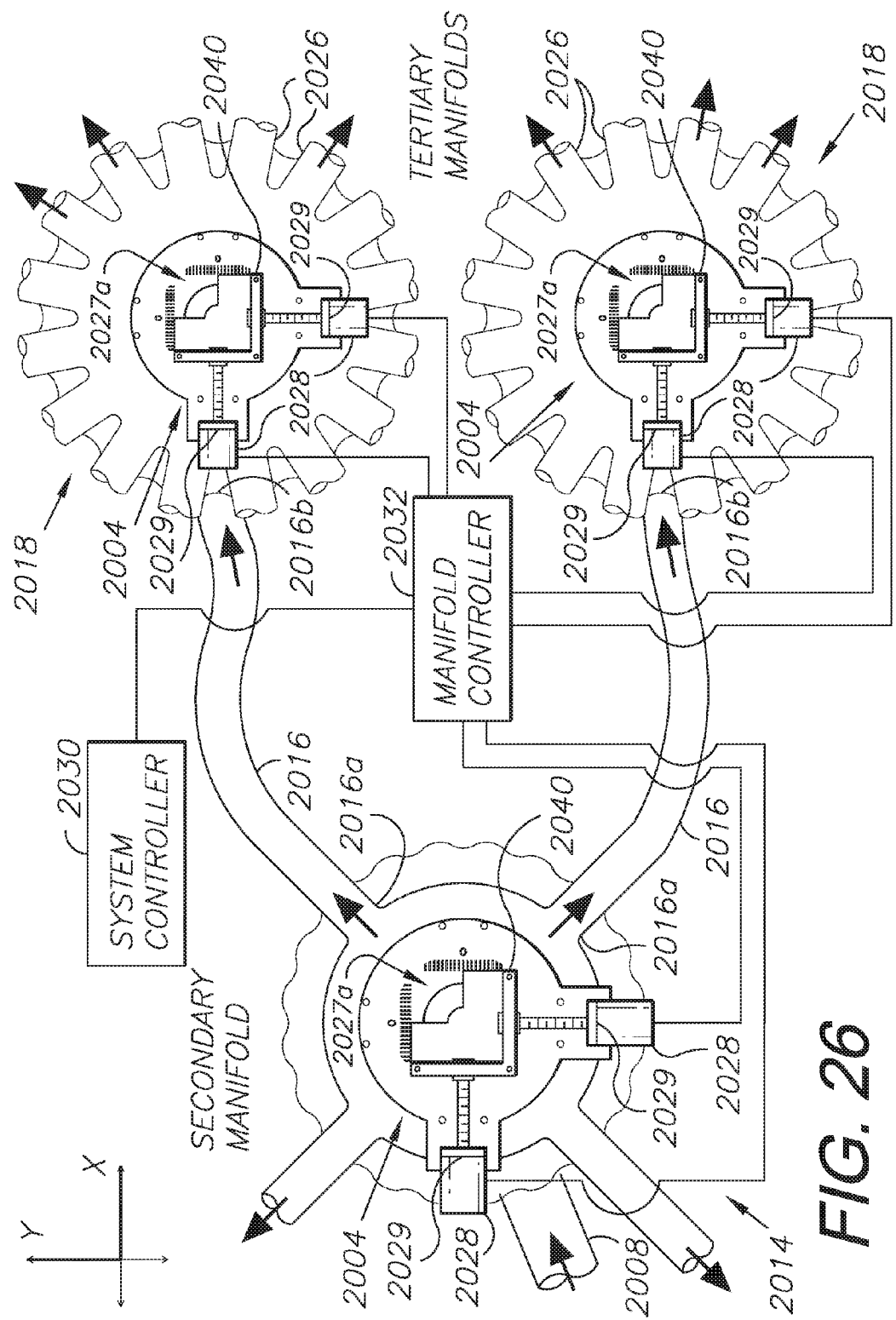
FIG. 26 is a top plan view thereof, particularly showing secondary and tertiary manifolds.
Figure 27:
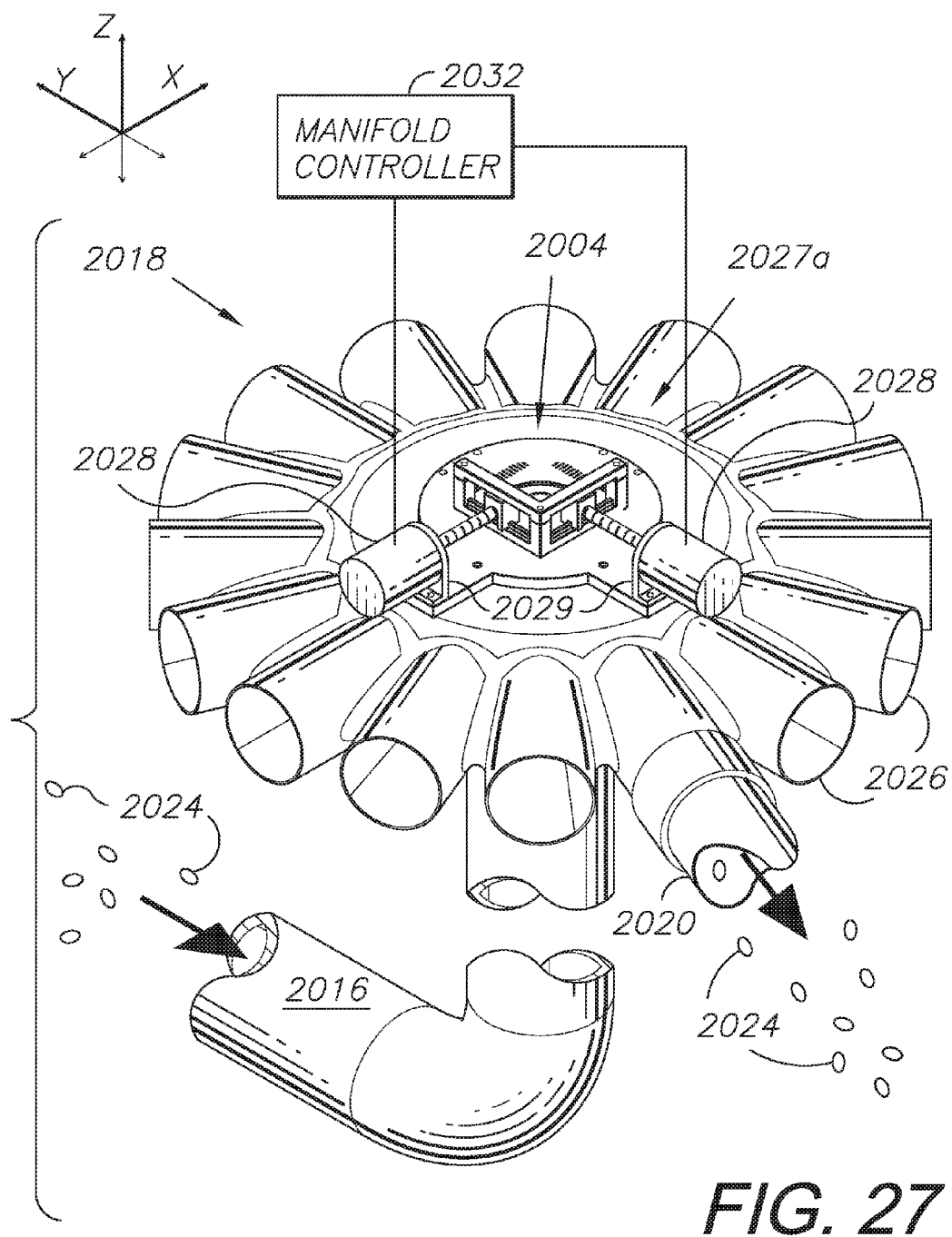
FIG. 27 is an upper perspective view of a tertiary manifold, particularly showing an automated diverter cone subassembly thereof.
Figure 28:
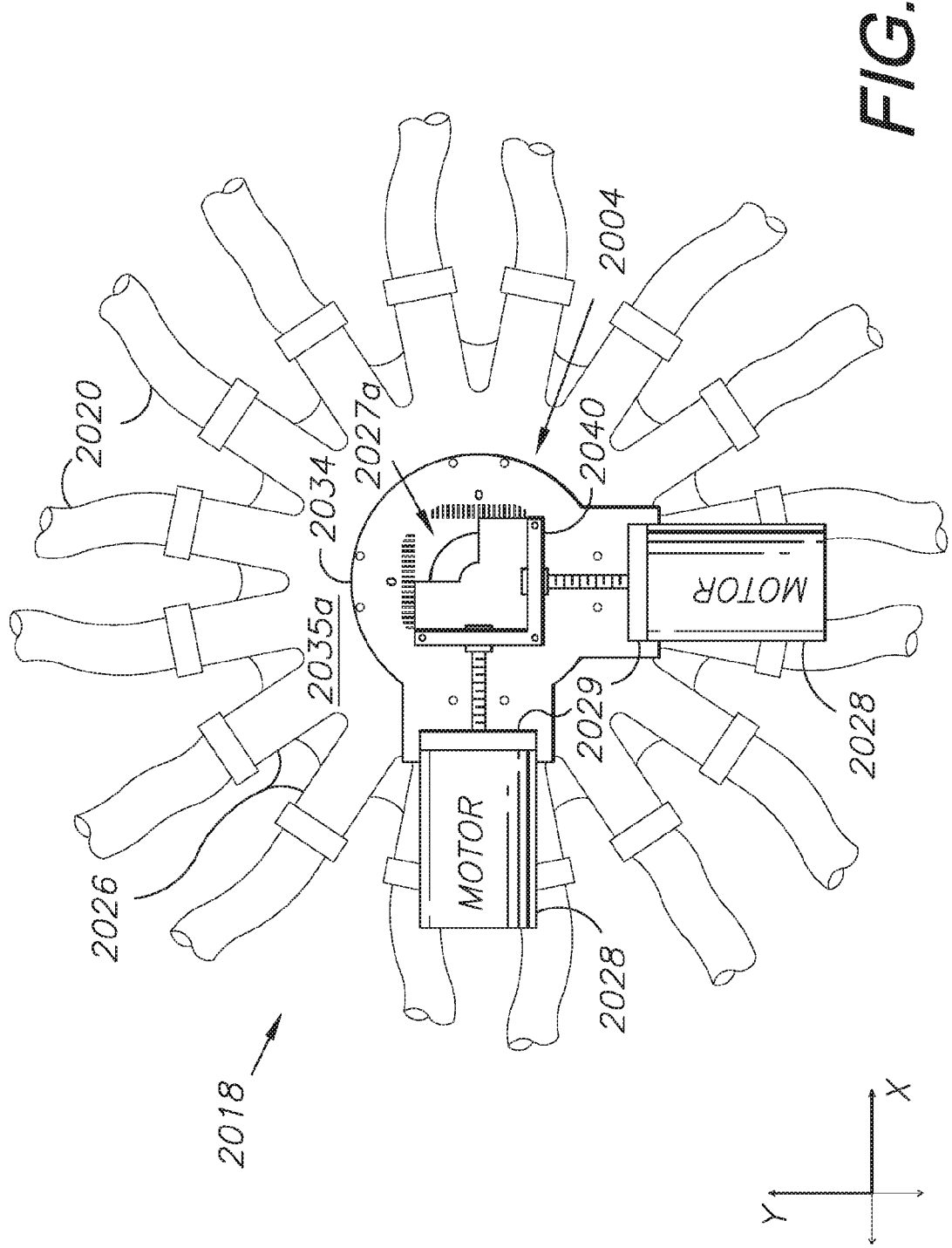
FIG. 28 is an enlarged top plan view thereof.
Figure 29:
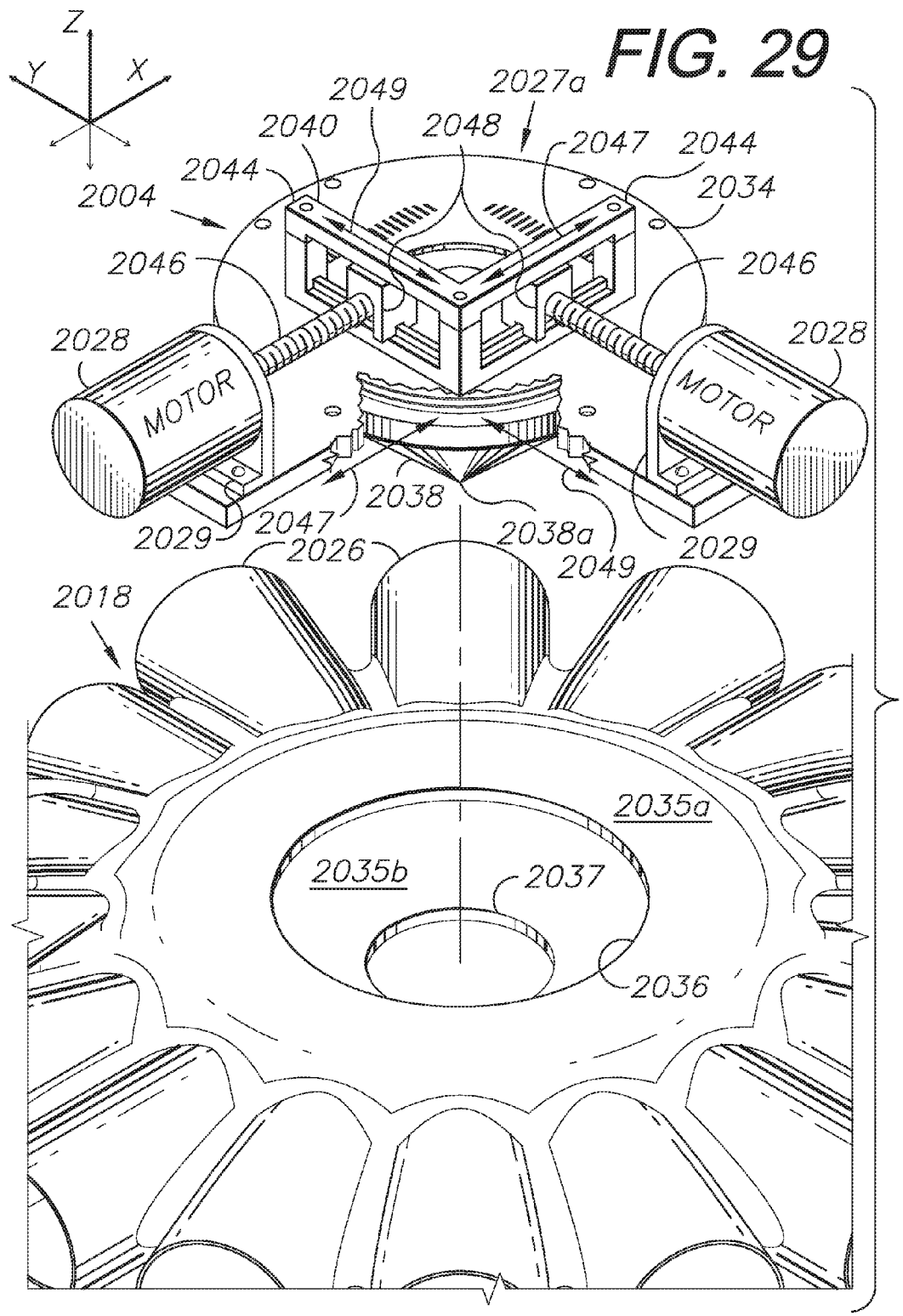
FIG. 29 is an exploded, perspective view of the tertiary manifold and the automated diverter cone subassembly.
Figure 30:
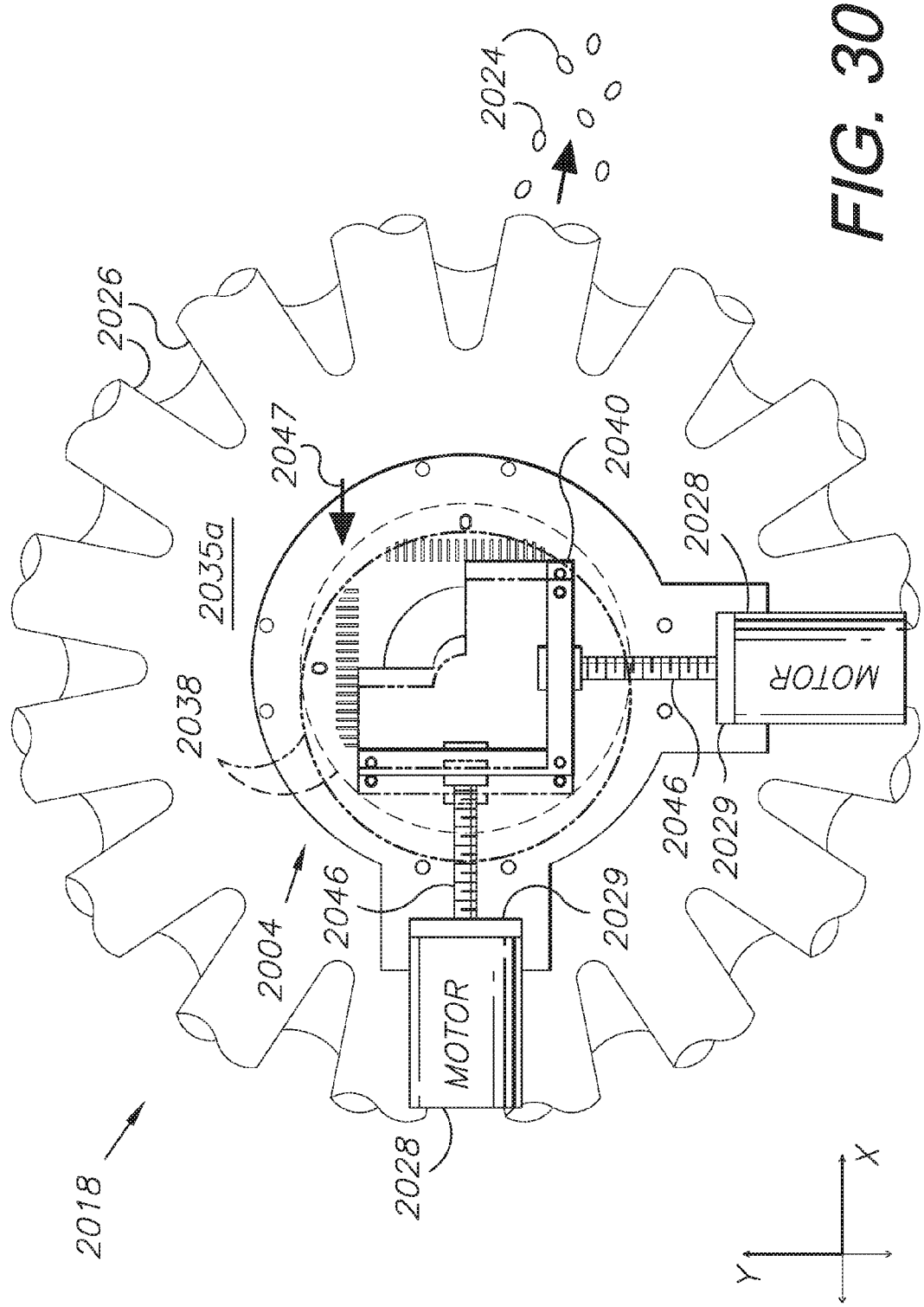
FIG. 30 is a top plan view thereof, with the diverter cone subassembly shown in an alternative position in phantom lines.
Figure 31:
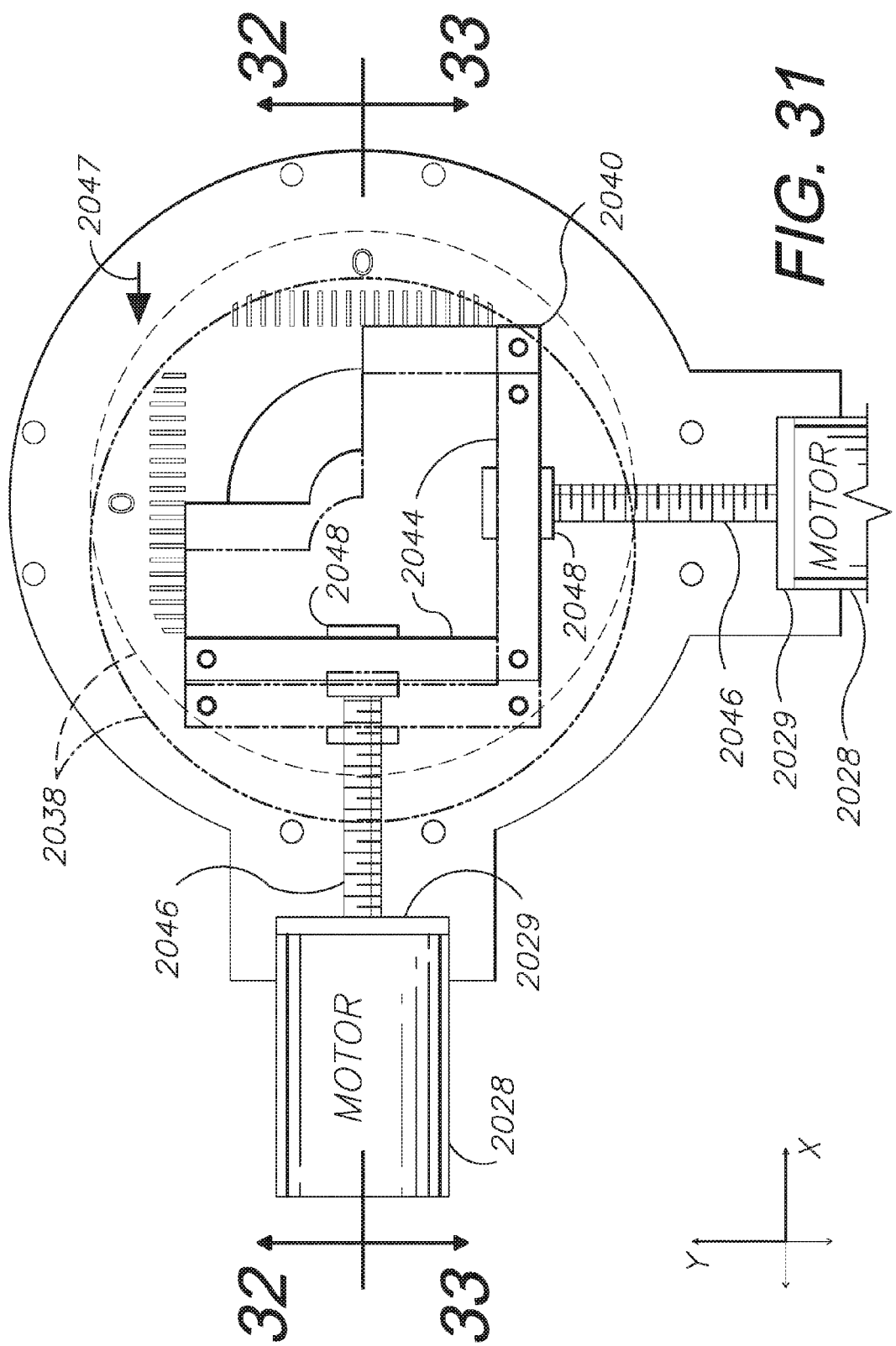
FIG. 31 is a top plan view thereof.
Figure 32:
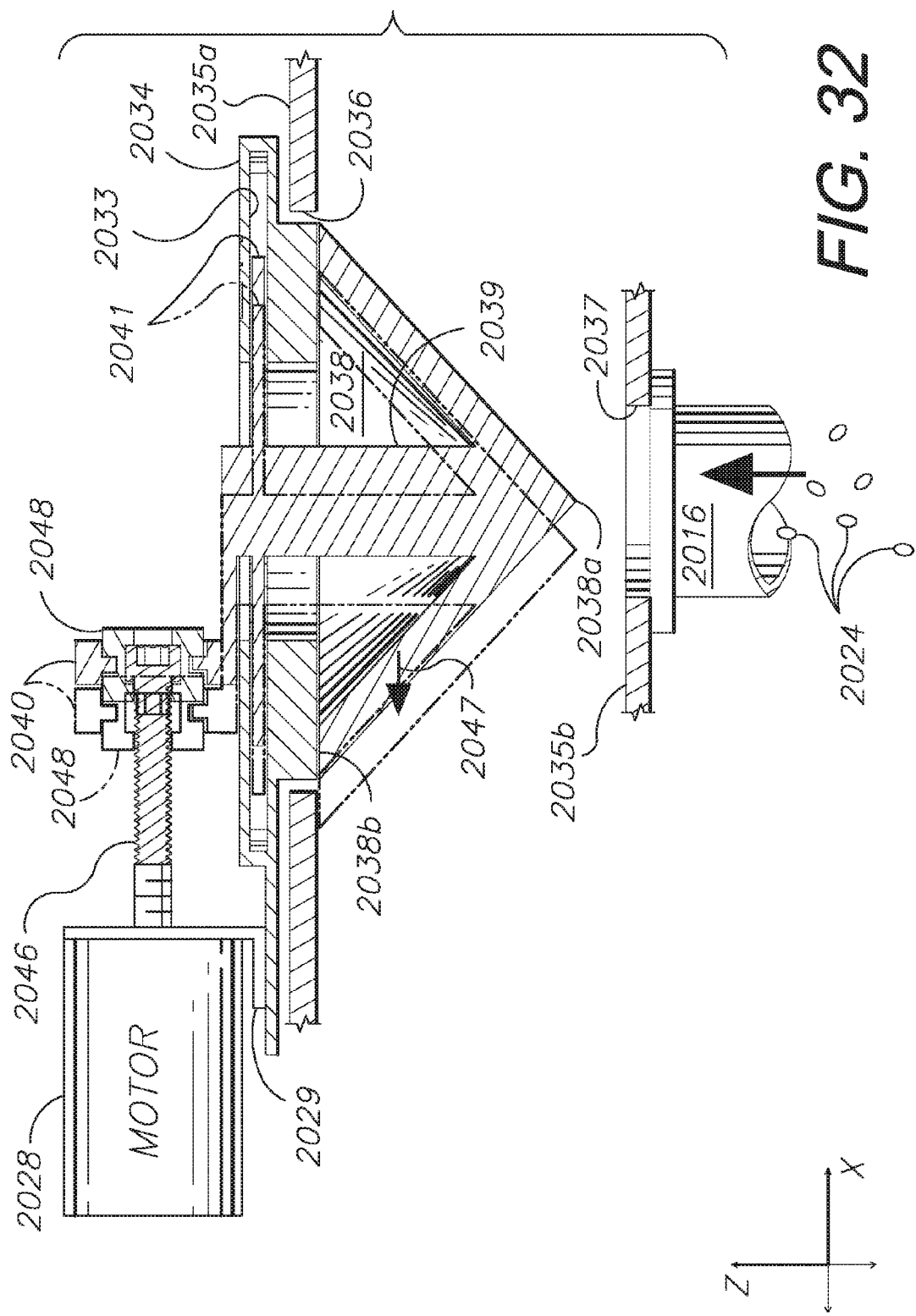
FIG. 32 is a cross-sectional view taken generally along a line 32-32 in FIG. 31, particularly showing the diverter cone subassembly in an alternative position in phantom lines.
Figure 33:
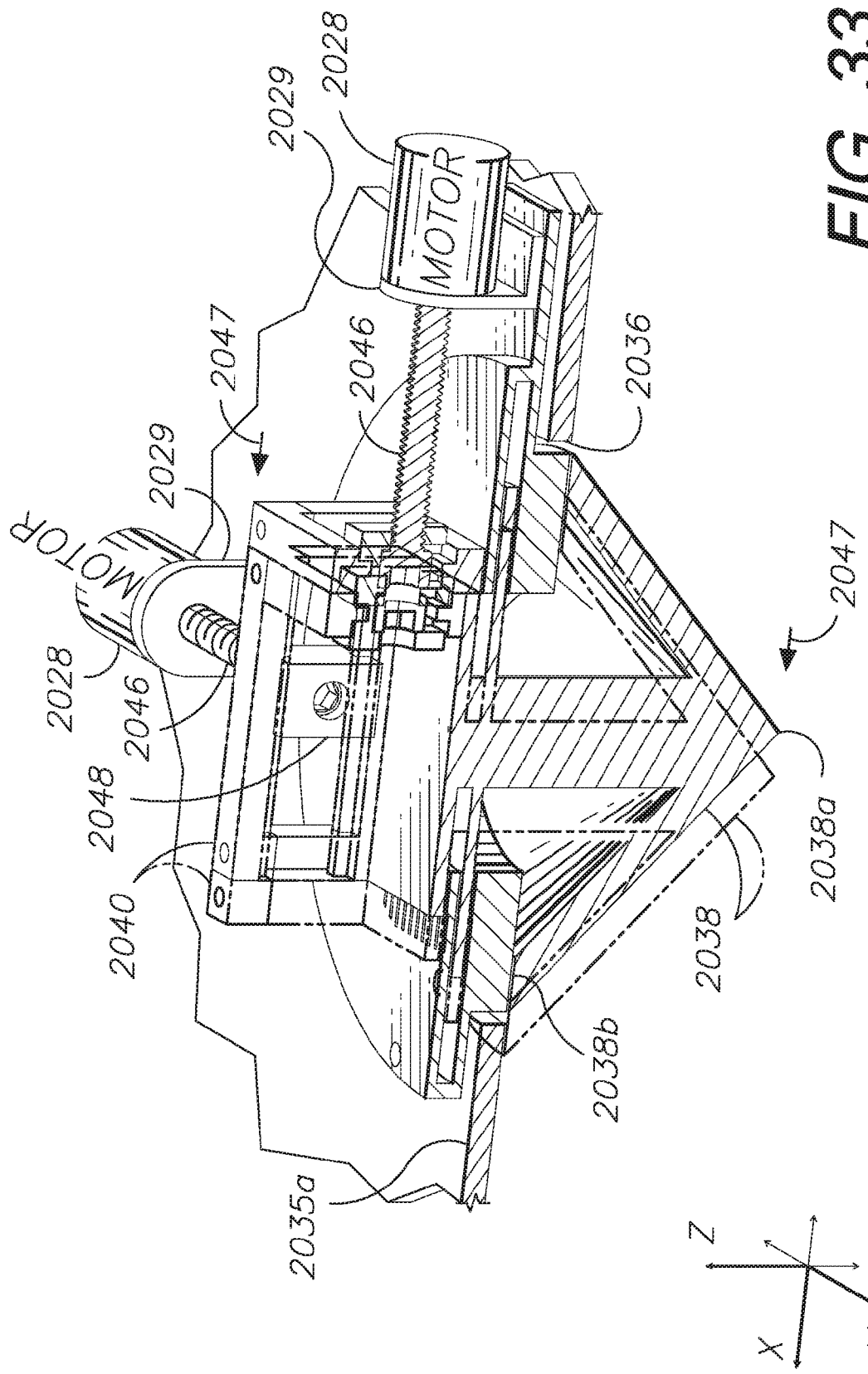
FIG. 33 is a cross-sectional, upper perspective view thereof taken generally along line 33-33 in FIG. 31, particularly showing the diverter cone subassembly in an alternative position in phantom lines.
Figure 34:
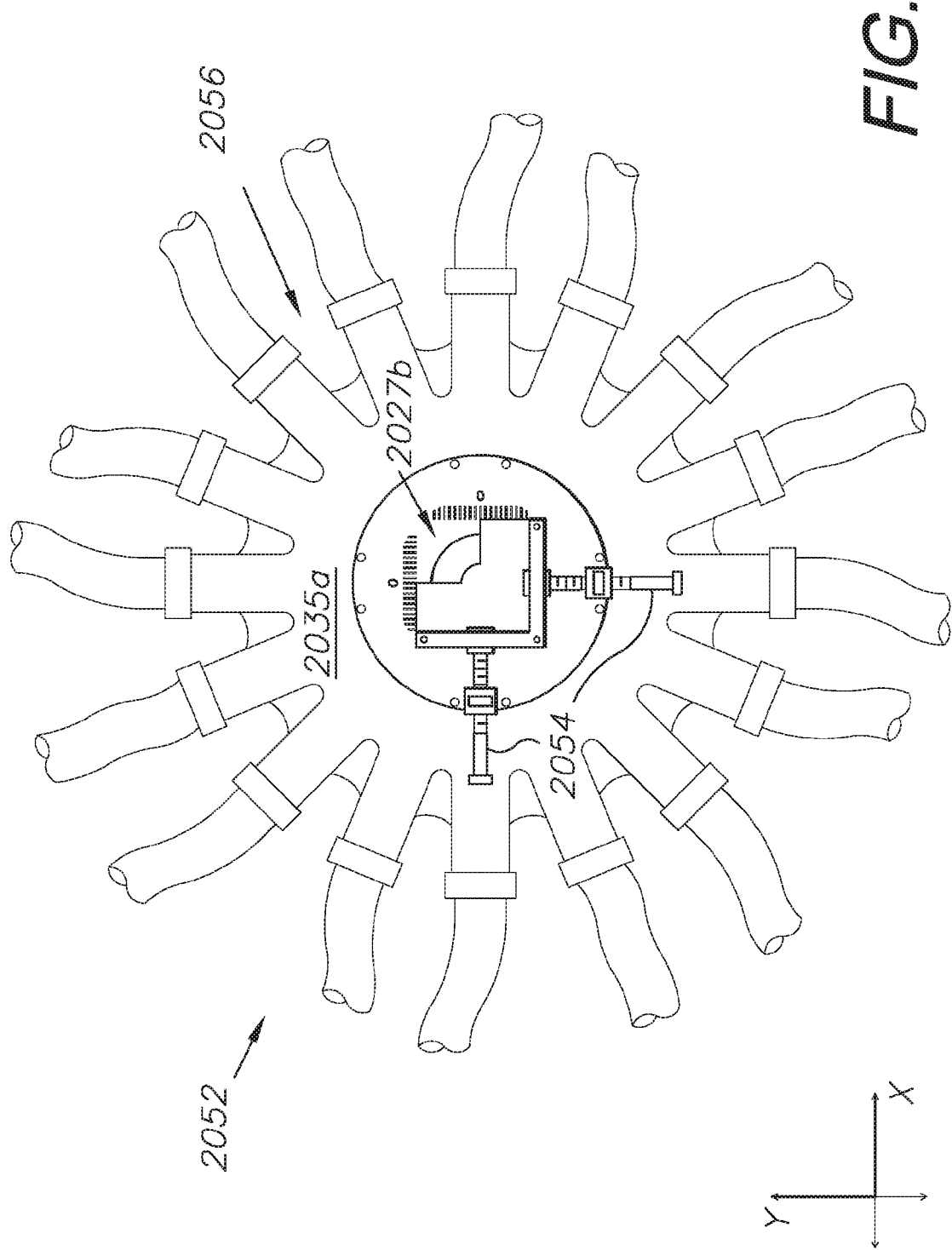
FIG. 34 is a top plan view of yet another alternative aspect or embodiment of the present invention with manual adjusting screws connected to the diverter cone subassembly.
Figure 35:
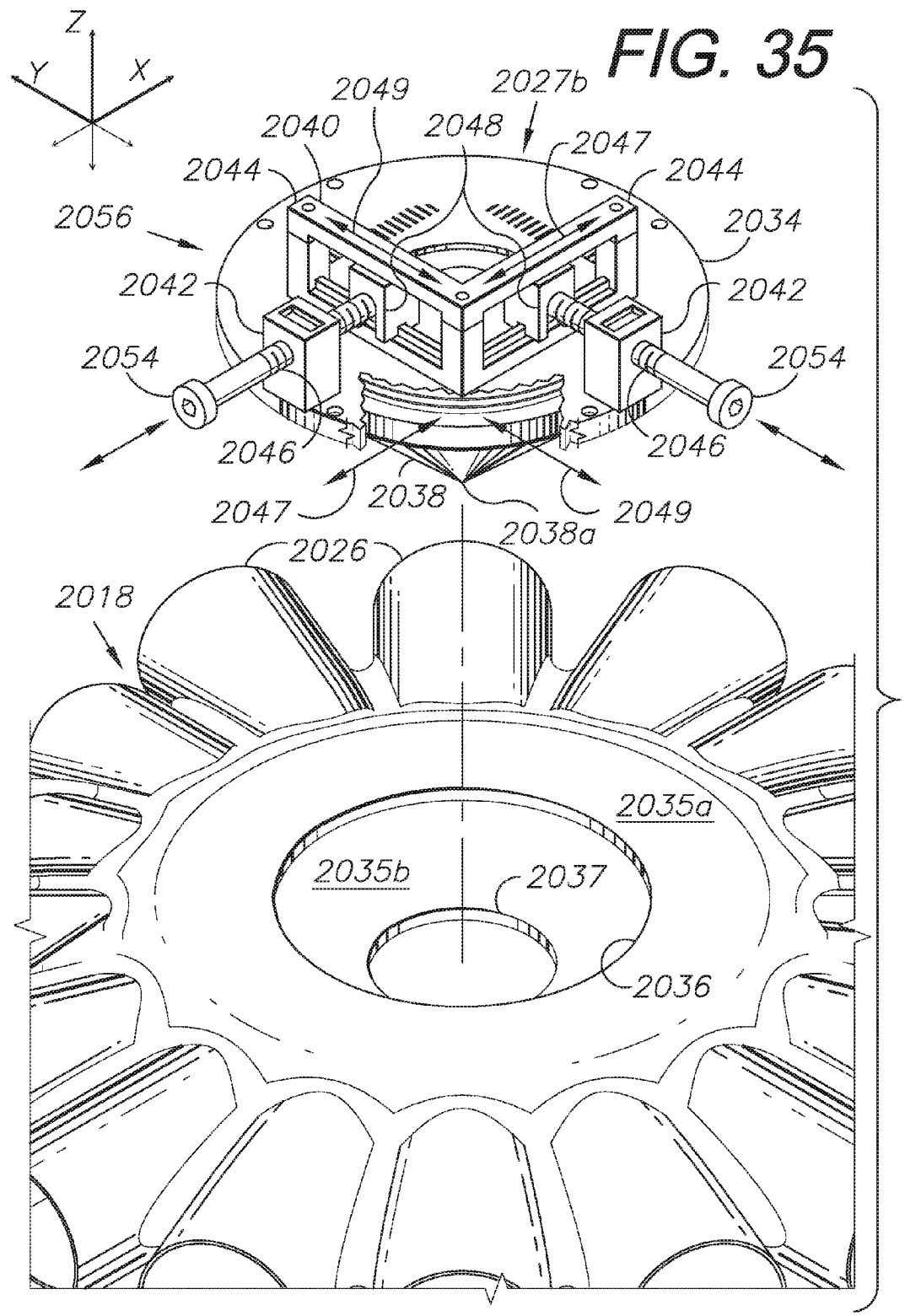
FIG. 35 is an exploded, perspective view of the tertiary manifold and the screw-adjusted diverter cone subassembly.
Figure 36:
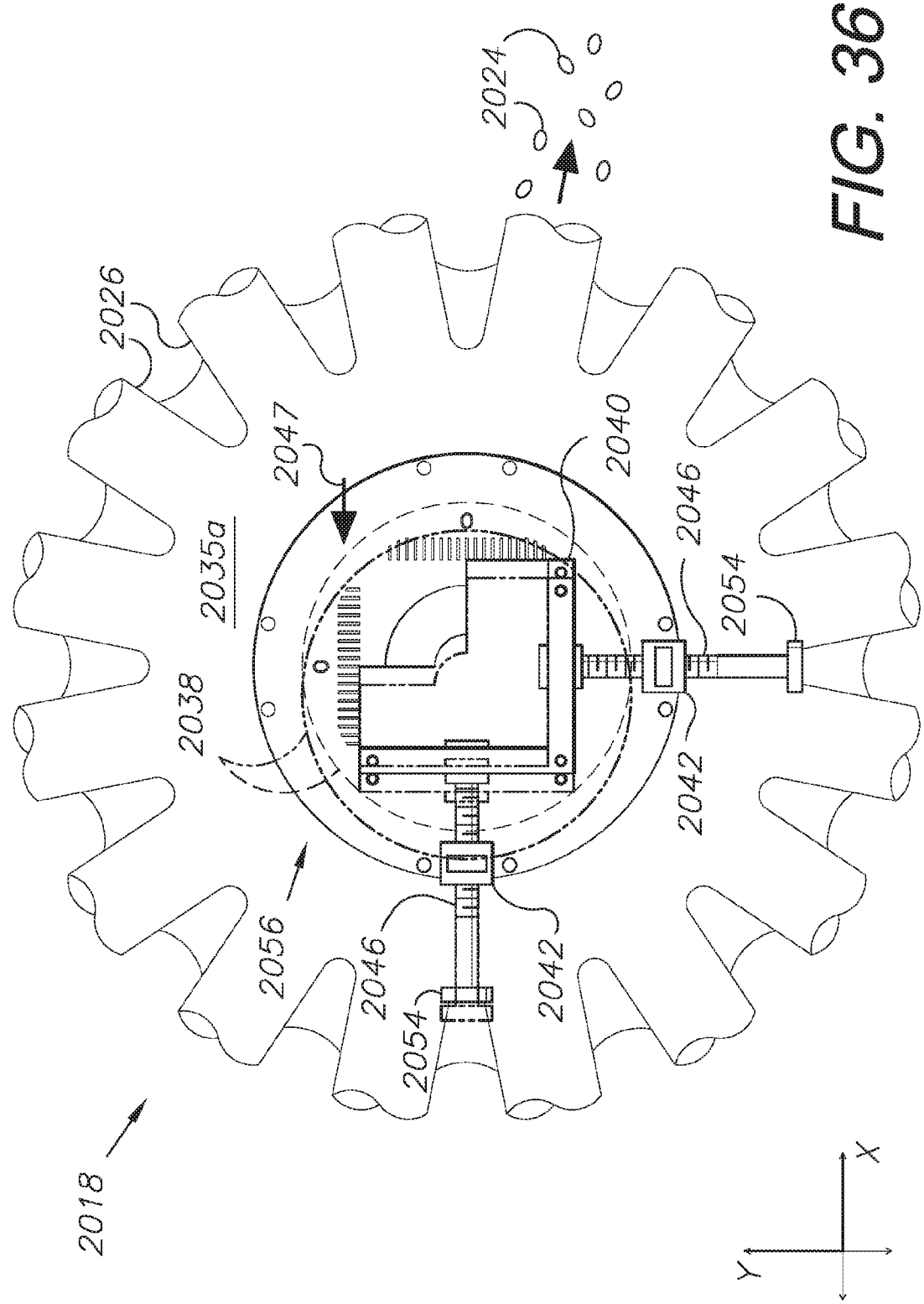
FIG. 36 is a top plan view thereof, with the diverter cone subassembly shown in an alternative position in phantom lines.
Figure 37:
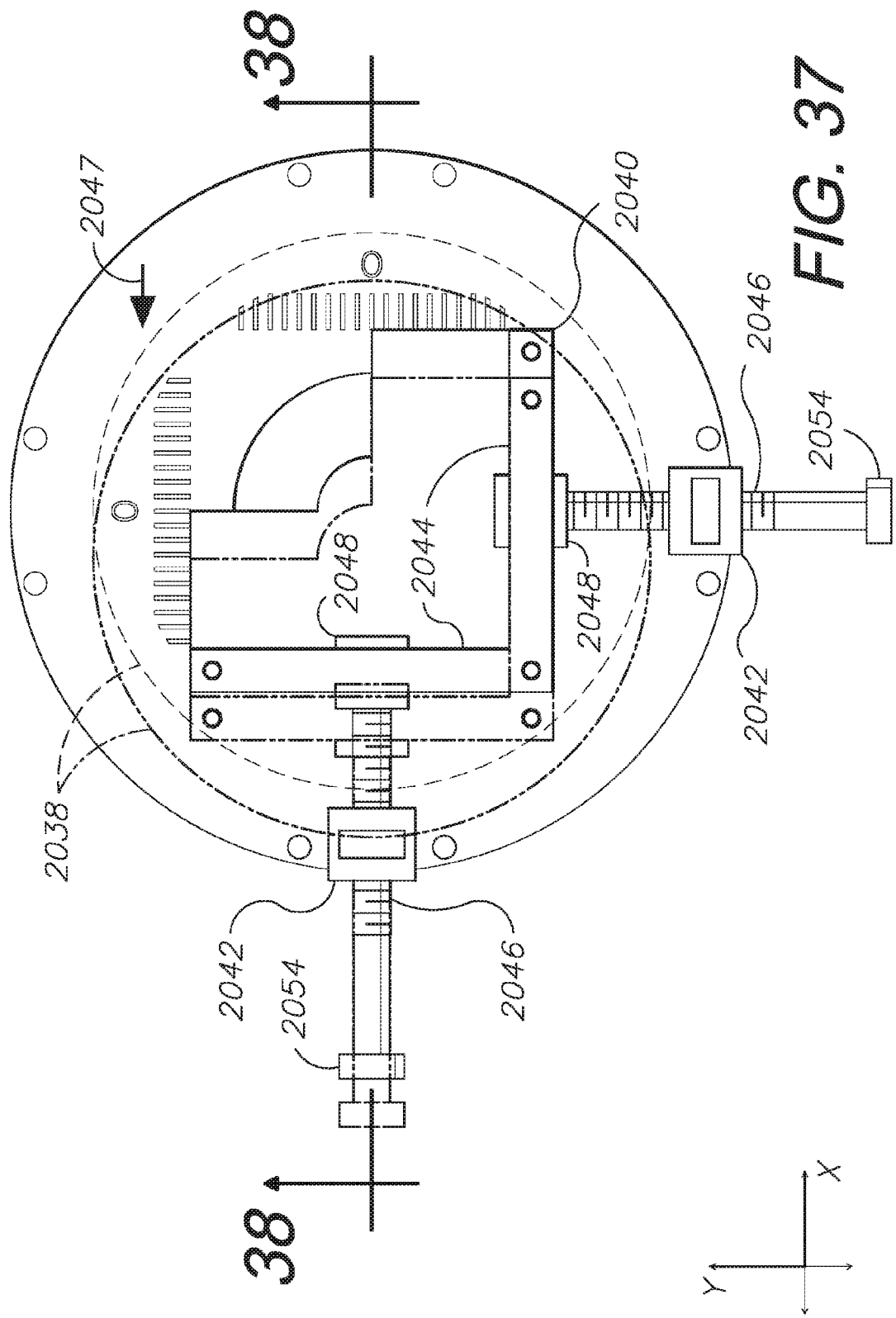
FIG. 37 is an enlarged, top plan view thereof, with the diverter cone subassembly shown in an alternative position in phantom lines.
Figure 38:
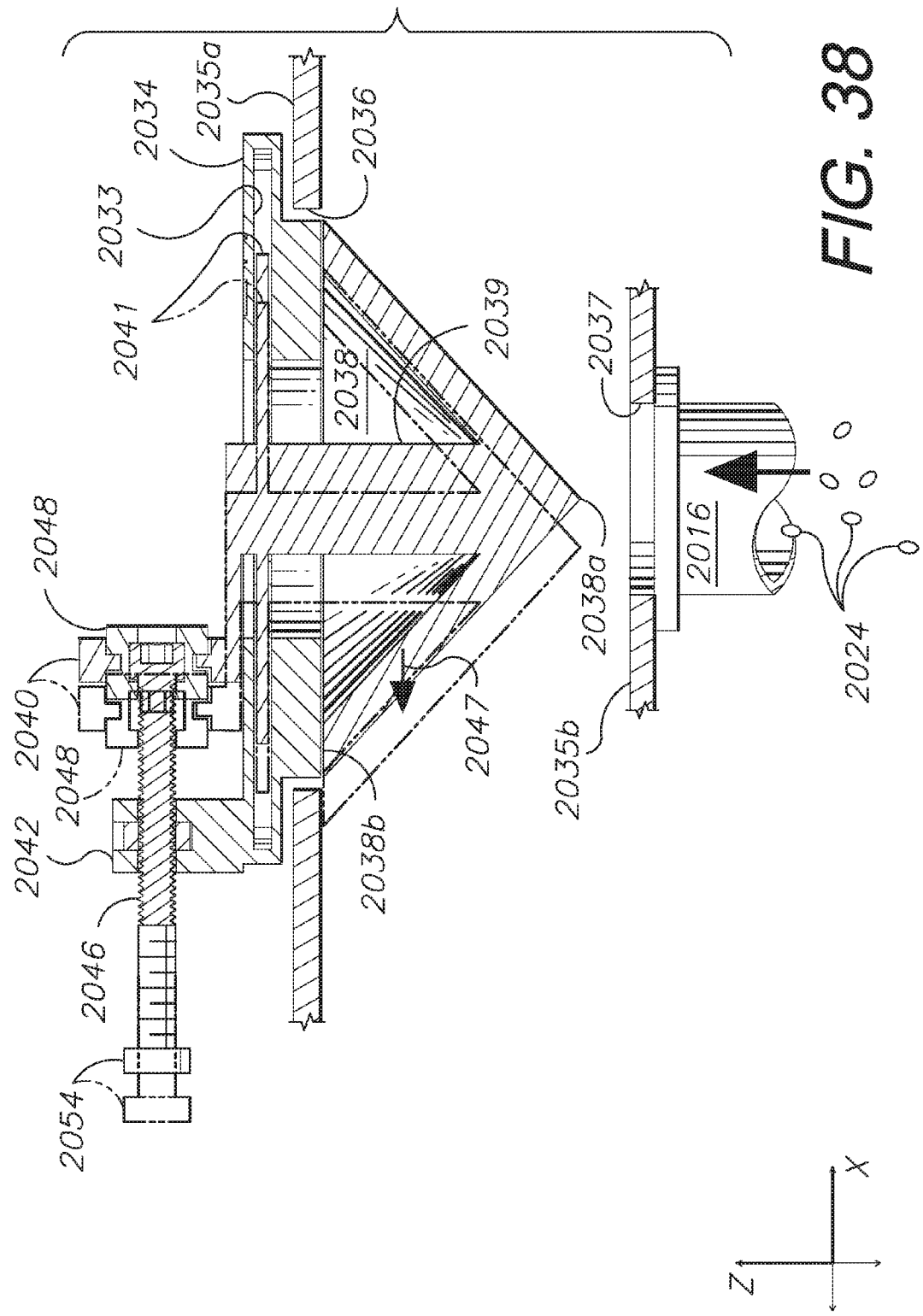
FIG. 38 is a cross-sectional view of the diverter cone subassembly and a portion of the manifold, taken generally along the line 38-38 in FIG. 37.

The automated system 2002 includes servo motors 2028 mounted on respective manifold upper panels 2035a by motor mounts 2029. Each motor 2028 is connected to and controlled by a manifold controller 2032, which in turn is connected to a system controller 2030 (FIG. 26). Alternatively, the system and manifold controllers 2030, 2032 can be combined in a master controller, which can control various functions of the system 2002. As shown, each auto-adjusting manifold 2014, 2018 can include a diverter cone automated actuator 2027a with two servo motors 2028 connected to a respective diverter cone subassembly 2004 for affecting movements in a generally horizontal (X-Y) plane. X-axis and Y-axis movements are shown by directional arrows 2047, 2049 respectively (FIG. 29). Diverter cone subassembly 2004 movements in vertical directions (Z-axis) could be accomplished with another servo motor, which could operationally control a rate of seed discharge. Moreover, continuously-adjustable servo motors could be replaced by stepper motors configured for rotating in predetermined angular rotational increments, which would correspondingly move the subassemblies 2004 in predetermined linear increments.

VI. Diverter Cone Subassembly 2004

Diverter cone subassemblies 2004 and corresponding actuators 2027a can be positioned within any or all of the manifolds, e.g., the primary, secondary and/or tertiary manifolds 2011, 2014, 2018 respectively.

Each diverter cone subassembly 2004 includes a plate 2034 mounted on an upper panel 2035a of a respective manifold 2014, 2018 generally over an upper opening 2036 in the manifold upper panel 2035a. Each manifold 2014, 2018 also includes a lower panel 2035b with an opening 2037. A cone 2038 with an apex 2038a and a base 2038b is movably located in the manifold interior and is connected through the opening 2036 with an L-shaped bracket 2040 extending upwardly from the plate 2034. The cone apex 2038a extends into the manifold interior. The cone 2038 includes a coaxial, internal stem 2039, which mounts a radially-extending flange 2041. The flange 2041 is slidably received in a flange receiver 2033 formed in the plate 2034. This construction enables repositioning the cone 2038 relative to the manifold discharge outlets 2026 with incremental movements affected by the cone actuator 2027a, with the flange 2041 sliding in a generally horizontal X-Y planar range of movement and the cone 2038 maintaining a generally vertical orientation with its axis generally aligned with the Z axis. Other configurations and alternative material constructions of the diverter cone subassembly 2004 and the plate 2034 could be utilized within the scope of the present invention.

Each servo motor 2028 mounts a threaded actuating rod 2046 threadably extending through a respective female-threaded anchor 2048 slidably received in a respective leg 2044. The manifolds and their respective diverter cone subassemblies can be suitably enclosed in housings for protection from the elements and ambient conditions.

In operation, energizing a bi-directional servo (or stepper) motor 2028 rotates and extends or retracts a respective male-threaded actuating rod 2046, thereby pushing or pulling the interconnected diverter cone 2038 and bracket 2040 along the top surface of the plate 2034. The cone 2038 is thus repositionable through a generally planar (e.g., in an X-Y plane) range of movement for adjusting the internal geometry and air-blown seed flow characteristics within the manifolds 2014, 2018. Such adjustments are commonly made for the purpose of balancing seed flow among multiple planting tools 2022 for uniform crop yields. However, seed discharge rates can be varied across the implement (e.g., a tillage planter) to accommodate different soil conditions, nutrient levels, etc. Such procedures are commonly referred to as "Prescription Farming," and utilize significant amounts of data and projections for maximizing crop yields and revenue.

VII. Alternative Embodiment Air Seeder Manifold System 2052 with Manually-Adjustable Diverter Cone Subassembly 2056

FIGS. 34-38 show yet another alternative embodiment air seeder manifold system 2052 of the present invention. The automated diverter cone actuator 2027a of the system 2002 is replaced by an alternative embodiment manual diverter cone actuator 2027b in the system 2052, wherein the servo motors 2028 described above are replaced by set screws 2054, which can be turned with an Allen wrench, or with another suitable hand tool, and threadably extend through respective guide blocks 2042. Parts of the manual system 2052 which are similar to the corresponding parts of the automated system 2002 described above are designated with the same reference numerals.

VIII. Alternative Embodiment Air Seeder Manifold System 2062 with Elastomeric Cone 2064

FIG. 39 shows yet another alternative embodiment air seeder manifold system 2062 with an elastomeric (e.g., rubber) diverter member or cone 2064 with a cone apex 2064a, a cone base 2064b and a cone shell 2064c. The cone shell 2064c can comprise an elastomeric or rubber material, which is preferably chosen for its ability to resist repeated impacts from the seeds 2024 streaming through the manifolds 2014, 2018. Parts of the system 2062 which are similar to the corresponding parts of the system 2002 and the system 2052 described above are designated with the same reference numerals.

The wireless connections to the vehicle, implement, cloud server, smart devices, and other wireless devices and services enable the systems embodying the present invention to completely integrate operations with online schedule and status information, and to provide access to appropriate parties through external application interfaces.

While the invention has been described with reference to exemplary embodiments, it will be understood by those of ordinary skill in the pertinent art that various changes may be made and equivalents may be substituted for the elements thereof without departing from the scope of the disclosure. In addition, numerous modifications may be made to adapt the teachings of the disclosure to a particular object or situation without departing from the essential scope thereof. Therefore, it is intended that the claims not be limited to the particular embodiments disclosed as the currently preferred best modes contemplated for carrying out the teachings herein, but that the claims shall cover all embodiments falling within the true scope and spirit of the disclosure.

It is to be understood that the invention can be embodied in various forms, and is not to be limited to the examples discussed above. The range of components and configurations which can be utilized in the practice of the present invention is virtually unlimited.

Having thus described the disclosed subject matter, what is claimed as new and desired to be secured by Letters Patent is:

1. An air seeder system, which comprises:
an agricultural vehicle including a tillage implement;
a seed hopper mounted on the agricultural vehicle;
a primary seed tube with a proximate end connected to the seed hopper and a distal end;
a primary manifold including an inlet connected to the primary seed tube distal end and multiple seed discharge outlets;
said primary seed tube conveying seed from the hopper to the manifold;
a seed flow diverter subassembly mounted on said primary manifold and including: a generally conical diverter member adjustably positioned within said manifold; and a diverter actuator connected to said diverter member and configured for repositioning said diverter member by movement of said diverter member generally in a plane to an alternative position within said manifold relative to said seed discharge outlets; and
said diverter actuator including a servo motor mounted on said manifold and including an actuator rod connected to said diverter member, said actuator rod being configured for repositioning said diverter member in said manifold relative to said manifold outlets.

2. The air seeder system according to claim 1, which includes:
said servo motor comprising a first servo motor; and
a second servo motor mounted on said manifold and including an actuator rod connected to said diverter member.

3. The air seeder system according to claim 2, which includes:

said diverter subassembly including first and second anchors each slidably mounted on said manifold and threadably receiving a respective actuator rod; and each said actuator rod being threadably extendable and retractable through a respective anchor for repositioning said diverter member in a respective first or second direction.

4. The air seeder system according to claim 1, which includes:

multiple secondary seed tubes each including a secondary seed tube proximate end connected to a respective primary manifold discharge outlet and a secondary seed tube distal end;

multiple secondary manifolds mounted on said implement and each including an inlet connected to a respective secondary seed tube distal end and multiple secondary manifold discharge outlets; and said system distributing seed from said hopper to said primary manifold in a first distribution stage and further distributing seed from said primary manifold to said secondary manifold via said secondary seed tubes in a second distribution stage.

5. The air seeder system according to claim 4, which includes:

multiple final seed tubes each including a proximate end connected to a respective secondary manifold discharge outlet and a distal end;

multiple seed-depositing tools each mounted on said implement and connected to a respective final seed tube distal end; and each said seed-depositing tool configured for planting seeds subsurface in a crop field.

6. The air seeder system according to claim 1, which includes:

a system controller including a microprocessor and connected to said vehicle and said implement, said system controller programmed for controlling operating parameters of said vehicle and said implement;

a manifold controller including a microprocessor and connected to said system controller and said air seeder manifold; and said manifold controller programmed for operating said diverter actuator to balance seed discharge among said multiple seed discharge outlets.

7. The air seeder system according to claim 1 wherein said diverter actuator includes:

first and second adjusting screws each connected to said diverter member and configured for repositioning said diverter member in said manifold relative to said manifold outlets;

said diverter subassembly including a plate forming a flange receiver;

said diverter member including: a generally conical configuration with an apex located in said manifold; a coaxial internal stem; a diverter member flange extending radially outwardly from said stem and received in said flange receiver; and a generally conical elastomeric or rubber shell positioned in said manifold and receiving said internal stem coaxially positioned therein; and said manifold being configured for seed flow therethrough impacting said diverter member shell.

8. An air seeder system, which comprises:

an agricultural vehicle including a tillage implement;

a seed hopper mounted on the agricultural vehicle;

a primary seed tube with a proximate end connected to the hopper and a distal end;

a secondary manifold including an inlet connected to the primary seed tube distal end and multiple seed discharge outlets;

said primary seed tube conveying seed from the hopper to the secondary manifold;

a seed flow diverter subassembly mounted on said secondary manifold and including: a diverter member adjustably positioned within said secondary manifold; and a diverter actuator connected to said diverter member and configured for repositioning said diverter member within said secondary manifold relative to said seed discharge outlets;

multiple secondary seed tubes each including a secondary seed tube proximate end connected to a respective secondary manifold discharge outlet and a secondary seed tube distal end;

multiple tertiary manifolds mounted on said implement and each including an inlet connected to a respective secondary seed tube distal end and multiple tertiary manifold discharge outlets;

said system distributing seeds from said hopper to said secondary manifold in a first distribution stage and further distributing seed from said secondary manifold to said tertiary manifolds via said secondary seed tubes in a second distribution stage;

a system controller including a microprocessor and connected to said vehicle and said implement, said system controller programmed for controlling operating parameters of said vehicle and said implement;

a manifold controller including a microprocessor and connected to said system controller and said secondary manifold; and said manifold controller programmed for operating said diverter actuator to balance seed discharge among said manifolds.

9. The air seeder system according to claim 8, which includes:

said diverter actuator including a servo motor mounted on said secondary manifold and including an actuator rod connected to said diverter member, said actuator rod being configured for repositioning said diverter member in said secondary manifold relative to said manifold outlets.

10. The air seeder system according to claim 9, which includes:

said servo motor comprising a first servo motor; and a second servo motor mounted on said secondary manifold and including an actuator rod connected to said diverter member.

11. The air seeder system according to claim 10, which includes:

multiple final seed tubes each including a proximate end connected to a respective tertiary manifold discharge outlet and a distal end;

multiple seed-depositing tools each mounted on said implement and connected to a respective final seed tube distal end; and each said seed-depositing tool configured for planting seeds subsurface in a crop field.

12. The air seeder system according to claim 8, which includes:

a primary manifold;

multiple secondary manifolds mounted on said implement and each including an inlet connected to the primary manifold and multiple secondary manifold discharge outlets; and said system distributing seed from said hopper to said primary manifold in a first distribution stage and further distributing seed from said primary manifold to said secondary manifolds in a second distribution stage.

13. The air seeder system according to claim 8, which includes:
said diverter subassembly including first and second anchors each slidably mounted on said secondary manifold and threadably receiving a respective actuator rod; and
each said actuator rod being extendable and retractable through a respective anchor for repositioning said diverter member in a respective first or second direction.

14. The air seeder system according to claim 8 wherein said diverter actuator includes:
first and second adjusting screws each connected to said diverter member and configured for repositioning said diverter member in said secondary manifold relative to said manifold outlets;
said diverter subassembly including a plate forming a flange receiver;
said diverter member including: a generally conical configuration with an apex located in said secondary manifold; a coaxial internal stem; a diverter member flange extending radially outwardly from said stem and received in said flange receiver; and a generally conical elastomeric or rubber shell positioned in said secondary manifold and receiving said internal stem coaxially positioned therein; and
said secondary manifold being configured for seed flow therethrough impacting said diverter member shell.

15. An air seeder system which comprises:
an agricultural vehicle including a tillage implement;
a seed hopper mounted on the agricultural vehicle;
a primary seed tube with a proximate end connected to the hopper and a distal end;
a secondary manifold including an inlet connected to the primary seed tube distal end and multiple seed discharge outlets;
said primary seed tube conveying seed from the hopper to the secondary manifold;
a seed flow diverter subassembly mounted on said secondary manifold and including a diverter member adjustably positioned within said secondary manifold, said diverter member having: a generally conical configuration with an apex located in said manifold; a coaxial internal stem; and a diverter member flange extending radially outwardly from said stem;
a diverter actuator connected to said diverter member and configured for repositioning said diverter member within said secondary manifold relative to said seed discharge outlets;
said diverter subassembly having a plate mounted on said manifold and movably mounting said diverter member, said diverter subassembly plate forming a flange receiver configured for slidably receiving said diverter member flange for generally planar movement therein;
multiple secondary seed tubes each including a secondary seed tube proximate end connected to a respective secondary manifold discharge outlet and a secondary seed tube distal end;
multiple tertiary manifolds mounted on said implement and each including an inlet connected to a respective secondary seed tube distal end and multiple tertiary manifold discharge outlets; and
said system distributing seeds from said hopper to said secondary manifold in a first distribution stage and further distributing seed from said secondary manifold to said tertiary manifolds via said secondary seed tubes in a second distribution stage.

16. The air seeder system according to claim 15, which includes:
a generally conical-shaped elastomeric or rubber shell positioned in said secondary manifold and receiving said internal stem coaxially positioned therein; and
said secondary manifold being configured for seed flow therethrough impacting said diverter member shell.

17. The air seeder system according to claim 16, which includes:
a first servo motor; and
a second servo motor mounted on said secondary manifold and including an actuator rod connected to said diverter member.

18. The air seeder system according to claim 15, which includes:
a primary manifold;
multiple secondary manifolds mounted on said implement and each including an inlet connected to the primary manifold and multiple secondary manifold discharge outlets;
said system distributing seed from said hopper to said primary manifold in a first distribution stage and further distributing seed from said primary manifold to said secondary manifolds in a second distribution stage;
multiple final seed tubes each including a proximate end connected to a respective tertiary manifold discharge outlet and a distal end;
multiple seed-depositing tools each mounted on said implement and connected to a respective final seed tube distal end; and
each said seed-depositing tool configured for planting seeds subsurface in a crop field.

19. The air seeder system according to claim 15, which includes:
said diverter subassembly including first and second anchors each slidably mounted on a mounting bracket and threadably receiving a respective actuator rod;
each said actuator rod being extendable and retractable through a respective anchor for repositioning said diverter member in a respective first or second direction; and
said diverter actuator including first and second adjusting screws each connected to said diverter member and configured for repositioning said diverter member in said secondary manifold relative to said manifold outlets.

20. The air seeder system according to claim 15, which includes:
a system controller including a microprocessor and connected to said vehicle and said implement, said system controller programmed for controlling operating parameters of said vehicle and said implement;
a manifold controller including a microprocessor and connected to said system controller and said secondary manifold; and
said manifold controller programmed for operating said diverter actuator to balance seed discharge among said manifolds.

* * * * *